(12) United States Patent
Nakashima et al.

(10) Patent No.: US 8,551,590 B2
(45) Date of Patent: Oct. 8, 2013

(54) MULTILAYER FILM AND PACKAGING MATERIAL

(75) Inventors: Yohei Nakashima, Tokyo (JP); Shinichi Maesowa, Tokyo (JP)

(73) Assignee: Sumitomo Bakelite Co., Ltd, Tokyo (JP)

( * ) Notice: Subject to any disclaimer, the term of this patent is extended or adjusted under 35 U.S.C. 154(b) by 0 days.

(21) Appl. No.: 13/696,604

(22) PCT Filed: May 30, 2011

(86) PCT No.: PCT/JP2011/002994
§ 371 (c)(1),
(2), (4) Date: Nov. 7, 2012

(87) PCT Pub. No.: WO2011/152015
PCT Pub. Date: Dec. 8, 2011

(65) Prior Publication Data
US 2013/0065002 A1    Mar. 14, 2013

(30) Foreign Application Priority Data

May 31, 2010   (JP) ................................ 2010-123828
Oct. 12, 2010   (JP) ................................ 2010-230081

(51) Int. Cl.
*B29D 22/00*   (2006.01)
(52) U.S. Cl.
USPC ........................................ 428/35.7; 220/276
(58) Field of Classification Search
USPC ........................................ 428/35.7; 220/276
See application file for complete search history.

(56) References Cited

U.S. PATENT DOCUMENTS 4,913,307 A * 4/1990 Takata et al. .................. 220/276

FOREIGN PATENT DOCUMENTS

| JP | 11-042744 | 2/1999 |
| JP | 2005-289399 | 10/2005 |
| JP | 2008-080509 | 4/2008 |
| WO | 2008062811 | 5/2008 |

OTHER PUBLICATIONS

Written Opinion for International Application No. PCT/JP2011/002994 mailed on Jun. 21, 2011.
International Search Report for International Application No. PCT/JP2011/002994 mailed on Jun. 21, 2011.

* cited by examiner

Primary Examiner — Newton Edwards
(74) Attorney, Agent, or Firm — Turocy & Watson, LLP

(57) ABSTRACT

An object of the present invention is to provide a multilayer film and a package body of which the thickness can be reduced than that of a conventional multilayer film, by having a good impact resistance, flex resistance, and anti-pinhole property. A multilayer film 100 according to the present invention includes a repeatedly laminated part 130. The repeatedly laminated part 130 is formed by alternately and repeatedly laminating a first layer 131 and a second layer 132. The first layer 131 consists mainly of a polyamide resin (excluding elastomers). The second layer 132 consists mainly of a copolymer of an olefin-based hydrocarbon having carbon number of 2 to 4 and a vinyl group-containing monomer.

11 Claims, 23 Drawing Sheets

MULTILAYER FILM AND PACKAGING MATERIAL

TECHNICAL FIELD

The present invention relates to a multilayer film and a package body.

BACKGROUND ART

A composite multilayer film is frequently used in order to satisfy the various performances required for a packaging bag and a packaging container used to pack foods, medicinal products, and the like. The aforementioned packaging bag is a bag-like product which is obtained by heat-sealing the side surfaces of a folded or layered multilayer film. Furthermore, the aforementioned packaging container is a container-like product which is obtained by heat-sealing a bottom member and a lid member, said bottom member being formed in a shape suitable to the contents through vacuum forming or pressure forming of a multilayer film, said lid member being an unformed film.

The multilayer film used for a package body, such as a packaging bag and a packaging container, is required to have an impact resistance, flex resistance, and anti-pinhole property. The anti-pinhole property is necessary for preventing the occurrence of pinholes in a package body, said occurrence being caused due to the external stress exerted on the package body as a result of vibrations or falls, for example, during the distribution process. Additionally, when a package body is used as an inner bag of a bag-in-box in which mostly a substance with a high flowability, such as a fluid, is filled in, or when contents having an unfixed shape or a sharp part are to be packed in a package body, the package body is often required of an anti-pinhole property higher than usual. A multilayer film including various stretched films or a polyamide resin is used favorably as a multilayer film having an anti-pinhole property (for example, see Patent Literature 1).

Furthermore, in a package body, the impact resistance, flex resistance, and anti-pinhole property required depending on the contents to be packed differ. Therefore, among the multilayer films used for a package body for packing heavy objects and the like, those within the range of a thickness belonging to the sheet category according to the JIS classification may be used.

Recently, in order to reduce the environmental burden, it is desired to decrease the thickness of the multilayer films used for package bodies than the thickness of conventional multilayer films. Therefore, various attempts are being made to reduce the thickness than the conventional multilayer films by changing the configuration of the multilayer films (for example, see Patent Literature 2).

CITATION LIST

Patent Literature

[PTL 1] Japanese Unexamined Patent Application Publication No. 2005-289399
[PTL 2] Japanese Unexamined Patent Application Publication No. 2008-80509

SUMMARY OF INVENTION

Technical Problem

However, there were limitations on the reduction of the thickness of multilayer films while retaining the same performance as that achieved by multilayer films having the conventional thickness.

An object of the present invention is to provide a multilayer film and a package body with which it is possible to reduce the thickness than that of a conventional multilayer film, by having a good impact resistance, flex resistance, and anti-pinhole property.

Solution to Problem (1)

The multilayer film according to the present invention has a repeatedly laminated part. The repeatedly laminated part is formed by alternately and repeatedly laminating a first layer and a second layer. The first layer consists mainly of a polyamide resin (excluding elastomers). The second layer consists mainly of a copolymer of an olefin-based hydrocarbon having carbon number of 2 to 4 and a vinyl group-containing monomer (for example, the copolymer includes saponified substances). Olefin-based hydrocarbons having carbon number of 2 to 4 include ethylene, propylene, 1-butene, 2-butene, 2-methyl propene, and the like.

The multilayer film comprising the repeatedly laminated part formed by alternately and repeatedly laminating the first layer that consists mainly of a polyamide resin (excluding elastomers), and the second layer that consists mainly of a copolymer of an olefin-based hydrocarbon having carbon number of 2 to 4 and a vinyl group-containing monomer, has a good impact resistance, flex resistance, and anti-pinhole property. Thus, the thickness of the multilayer film can be reduced than that of the conventional multilayer film, while retaining the same performance as the conventional multilayer film.

(2)

In the multilayer film in (1), which was described above, the total number of laminations of the first layers and the second layers in the repeatedly laminated part preferably is not less than 7 and not more than 999.

A multilayer film having a total number of laminations of the first layers and the second layers in the repeatedly laminated part of not less than 7 and not more than 999, has a good impact resistance, flex resistance, and anti-pinhole property. Thus, the thickness of the multilayer film can be reduced than that of the conventional multilayer film, while retaining the same performance as the conventional multilayer film.

(3)

In the multilayer film in (1) or (2), which was described above, the copolymer of an olefin-based hydrocarbon and a vinyl group-containing monomer of the second layer preferably is at least one of a maleic anhydride grafted linear low density polyethylene, a maleic anhydride grafted polypropylene, an ethylene-methacrylic acid copolymer, and an ionomer.

A multilayer film in which the copolymer of an olefin-based hydrocarbon and a vinyl group-containing monomer of the second layer is at least one of a maleic anhydride grafted linear low density polyethylene, a maleic anhydride grafted polypropylene, an ethylene-methacrylic acid copolymer, and an ionomer, has a good impact resistance, flex resistance, and anti-pinhole property. Thus, the thickness of the multilayer film can be reduced than that of the conventional multilayer film, while retaining the same performance as the conventional multilayer film.

(4)

In the multilayer film in either (1) or (2), which was described above, the copolymer of an olefin-based hydrocarbon and a vinyl group-containing monomer of the second layer preferably is an ethylene-vinylalcohol copolymer.

A multilayer film in which the copolymer of an olefin-based hydrocarbon and a vinyl group-containing monomer of the second layer is an ethylene-vinylalcohol copolymer, has a good impact resistance, flex resistance, anti-pinhole property, and oxygen barrier property. Thus, the thickness of the multilayer film can be reduced than that of the conventional multilayer film, while retaining the same impact resistance, flex resistance, and anti-pinhole property as those of the conventional multilayer film, and the oxygen barrier property can be exhibited as well.

(5)

It is preferable that the multilayer film in any of (1) through (4), which was described above, further has an outer layer and a sealing layer. The repeatedly laminated part is arranged between the outer layer and the sealing layer. At least one of: a layer of the repeatedly laminated part, said layer being closest to the outer layer; and a layer of the repeatedly laminated part, said layer being closest to the sealing layer, is a first layer.

A multilayer film is such that at least one of: a layer of the repeatedly laminated part, said layer being closest to the outer layer; and a layer of the repeatedly laminated part, said layer being closest to the sealing layer, is the first layer, and has a good impact resistance, flex resistance, and anti-pinhole property. Thus, the thickness of the multilayer film can be reduced than that of the conventional multilayer film, while retaining the same performance as the conventional multilayer film.

(6)

It is preferable that the multilayer film in (5), which was described above, further has an oxygen barrier layer.

By having an oxygen barrier layer, the multilayer film has the oxygen barrier property.

(7)

It is preferable that the multilayer film in any of (1) through (4), which was described above, further has an outer layer, a sealing layer, and an oxygen barrier layer. The repeatedly laminated part is arranged between the outer layer and the sealing layer. The oxygen barrier layer is arranged between the repeatedly laminated part and the sealing layer.

Generally, a resin having a high oxygen barrier property is a rigid resin in which a brittle fracture occurs easily due to an impact. When a brittle fracture occurs in the oxygen barrier layer, stress concentration triggered by the fractured part can occur easily in the multilayer film. When stress concentration occurs, the relaxation effect of the impact to the repeatedly laminated part reduces.

In contrast, for example, when the multilayer film is used for a package body that easily receives an impact from the outer-layer side during transport, the arrangement of the oxygen barrier layer between the repeatedly laminated part and the sealing layer impedes the impact from reaching the oxygen barrier layer. As a result, even if the multilayer film receives an impact from the outer-layer side, a brittle fracture of the oxygen barrier layer is less likely to occur, and the relaxation effect of the impact to the repeatedly laminated part can be maintained.

(8)

It is preferable that the multilayer film in any of (1) through (4), which was described above, further has an outer layer, a sealing layer, and an oxygen barrier layer. The repeatedly laminated part is arranged between the outer layer and the sealing layer. The oxygen barrier layer is arranged between the repeatedly laminated part and the outer layer.

Generally, a resin having a high oxygen barrier property is a rigid resin in which a brittle fracture occurs easily due to an impact. When a brittle fracture occurs in the oxygen barrier layer, stress concentration triggered by the fractured part can occur easily in the multilayer film. When stress concentration occurs, the relaxation effect of the impact to the repeatedly laminated part reduces.

In contrast, for example, when the multilayer film is used for a package body which packs a hard and sharp content, and which easily receives an impact from the sealing-layer side during packaging or transport, the arrangement of the oxygen barrier layer between the repeatedly laminated part and the outer layer impedes the impact from reaching the oxygen barrier layer. As a result, even if the multilayer film receives an impact from the sealing-layer side, a brittle fracture of the oxygen barrier layer is less likely to occur, and the relaxation effect of the impact to the repeatedly laminated part can be maintained.

(9)

It is preferable that the multilayer film in any of (1) through (4), which was described above, includes a plurality of repeatedly laminated parts. It is preferable that the multilayer film further has an outer layer, a sealing layer, and an oxygen barrier layer. The plurality of repeatedly laminated parts is arranged between the outer layer and the sealing layer. The oxygen barrier layer is arranged between the repeatedly laminated parts.

Generally, a resin having a high oxygen barrier property is a rigid resin in which a brittle fracture occurs easily due to an impact. When a brittle fracture occurs in the oxygen barrier layer, stress concentration triggered by the fractured part can occur easily in the multilayer film. When stress concentration occurs, the relaxation effect of the impact to the repeatedly laminated part reduces.

In contrast, for example, when the multilayer film is used for a package body which packs a hard and sharp content, which easily receives an impact from the outer-layer side and the sealing-layer side during transport, and which easily receives an impact from the sealing-layer side during packaging, the arrangement of the oxygen barrier layer between the repeatedly laminated parts impedes the impact from reaching the oxygen barrier layer. As a result, even if the multilayer film receives an impact from the outer-layer side and the sealing-layer side, a brittle fracture of the oxygen barrier layer is less likely to occur, and the relaxation effect of the impact to the repeatedly laminated part can be maintained.

(10)

It is preferable that in the multilayer film in any of (5) through (9), which was described above, the outer layer includes at least one of a polypropylene-based resin, a polyester-based resin, a polyamide resin, and an ethylene-vinylalcohol copolymer.

A multilayer film in which the outer layer includes at least one of a polypropylene-based resin, a polyester-based resin, a polyamide resin, and an ethylene-vinylalcohol copolymer, has a good impact resistance, flex resistance, and anti-pinhole property. Thus, the thickness of the multilayer film can be reduced than that of the conventional multilayer film, while retaining the same performance as the conventional multilayer film.

(11)

It is preferable that in the multilayer film in any of (5) through (10), which was described above, the sealing layer includes an easy peeling function.

As a result of the multilayer film including the sealing layer having an easy peeling function, the multilayer film can be unsealed easily when used for the package body.

(12)

The package body according to the present invention is manufactured by using the multilayer film in any of (1) through (11), which was described above.

The package body is manufactured by using the aforementioned multilayer film which has a good impact resistance, flex resistance, and anti-pinhole property, and of which the thickness can be reduced than that of the conventional multilayer film. Thus, during use, the package body exhibits a good impact resistance, flex resistance, and anti-pinhole property, and after use, the amount of the multilayer film, which is a waste, can be reduced. Additionally, because the package body has a good impact resistance, flex resistance, and anti-pinhole property, the occurrence of pinholes can be reduced remarkably. Furthermore, because of the reduction in the occurrence of pinholes, the disposal amount of the product (package body containing the contents) can be reduced.

Advantageous Effects of Invention

The multilayer film of the present invention has a good impact resistance, flex resistance, as well as a good anti-pinhole property. Therefore, the thickness of the multilayer film according to the present invention can be reduced than that of the conventional multilayer film, while retaining the same performance as the conventional multilayer film. Furthermore, the package body according to the present invention, during use, exhibits a good impact resistance, flex resistance, and anti-pinhole property, and after use, the amount of the multilayer film, which is a waste, can be reduced. Additionally, because the package body has a good impact resistance, flex resistance, and anti-pinhole property, the occurrence of pinholes can be reduced remarkably. Furthermore, because of the reduction in the occurrence of pinholes, the disposal amount of the product (package body containing the contents) can be reduced.

BRIEF DESCRIPTION OF DRAWINGS

FIG. 9 is a cross-sectional view of a multilayer film according to a modification (G) of the first embodiment of the present invention.

FIG. 10 is a cross-sectional view of a multilayer film according to a second embodiment of the present invention.

FIG. 14 is a cross-sectional view of a multilayer film according to a modification (D) of the second embodiment of the present invention.

REFERENCE SIGN LIST

Figure 1:
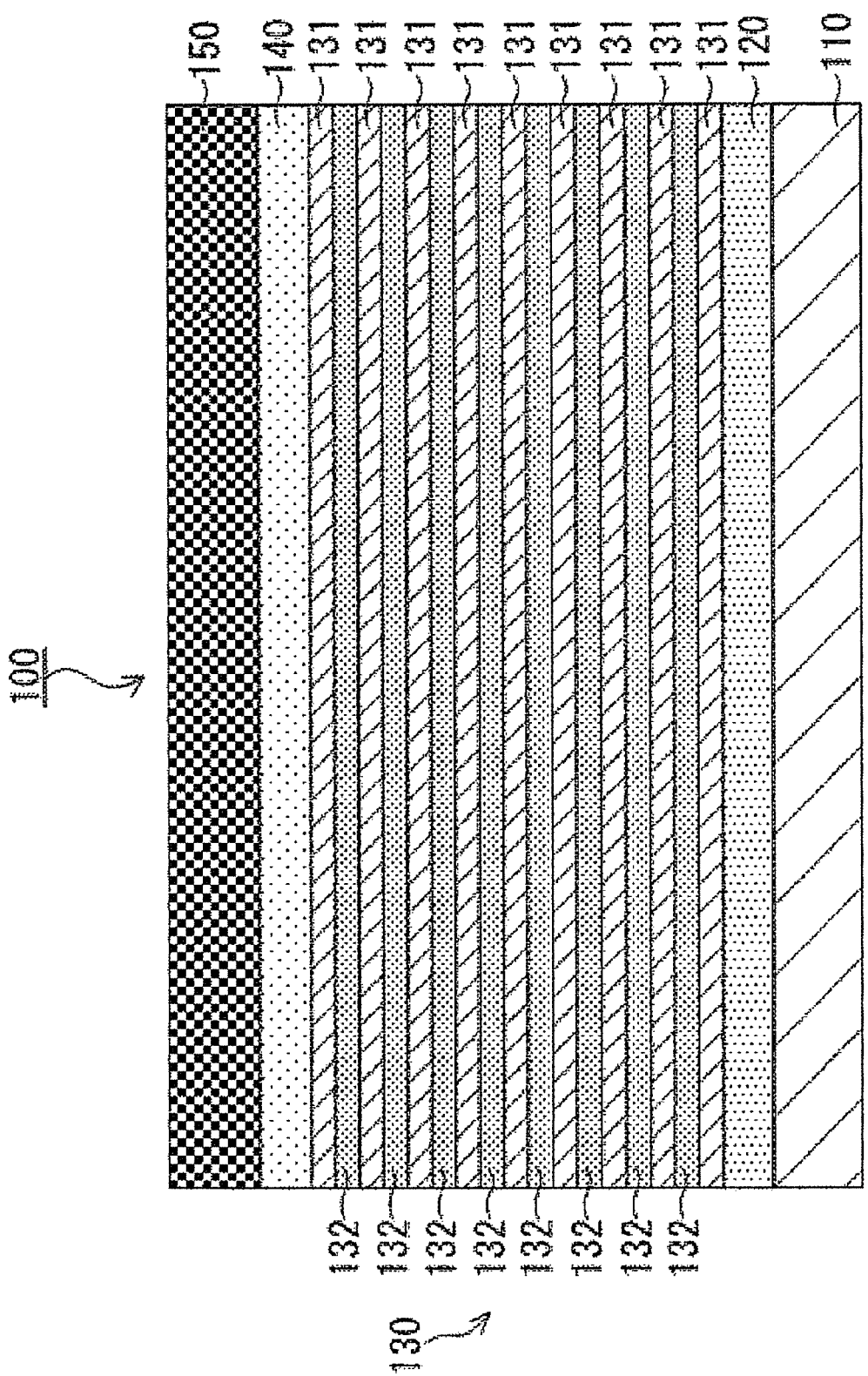
FIG. 1 is a cross-sectional view of a multilayer film according to a first embodiment of the present invention.

100, 100a, 100b, 100c, 100d, 100e, 100f, 100g, 100h, 100i, 100j, 100k, 100m, 100n Multilayer film
110 Outer layer
130, 130a, 130b, 134, 134k Repeatedly laminated part
131 First layer
132, 133 Second layer
150 Sealing layer
160 Oxygen barrier layer
200 Package body

DESCRIPTION OF EMBODIMENTS

First Embodiment

Figure 2:
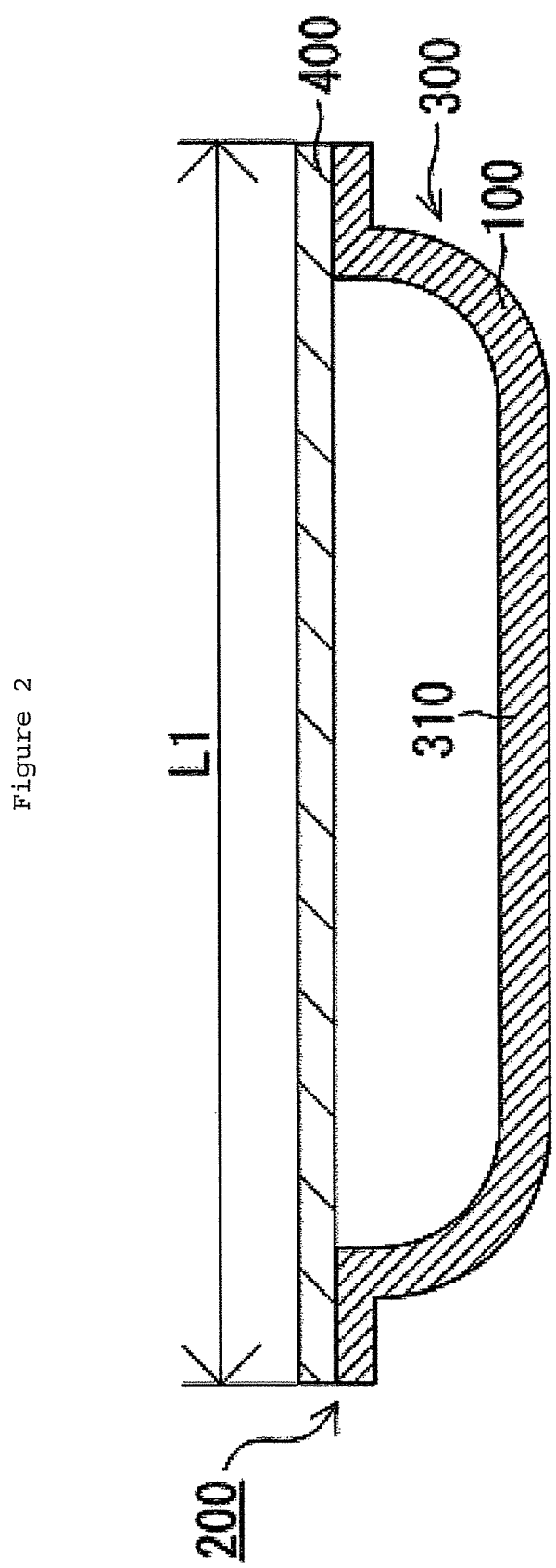
FIG. 2 is a cross-sectional view of a package body having the multilayer film.

As illustrated in FIG. 1, a multilayer film 100 according to a first embodiment of the present invention is primarily configured from an outer layer 110, a first adhesion layer 120, a repeatedly laminated part 130, a second adhesion layer 140, and a sealing layer 150. Furthermore, the outer layer 110, the first adhesion layer 120, the repeatedly laminated part 130, the second adhesion layer 140, and the sealing layer 150 are arranged in this order. As illustrated in FIG. 2, the multilayer film 100 is used for a bottom member 300 of a package body 200. The bottom member 300 is formed such that the outer layer 110 of the multilayer film 100 is on an outer side and the sealing layer 150 thereof is on an inner side. Each configuration of the multilayer film 100 will be described below in detail.

<Outer Layer>

At least one of a polypropylene-based resin, a polyester-based resin, a polyamide resin, and an ethylene-vinylalcohol copolymer (hereinafter, called the "EVOH resin") may be used as the material of the outer layer 110. Specifically, when a heat sterilization process is to be performed for the package body 200 after contents such as foods, beverages, or industrial parts have been packed, the outer layer 110 is exposed to hot water and high-temperature steam. Therefore, a polypropylene-based resin or a polyamide resin having a high heat resistance, or a polyester-based resin, for example, a polyhexamethylene terephthalate resin, having a high melting point, may be used as the material of the outer layer 110.

When a low-temperature boiling process, for example, a heat sterilization process at approximately not less than 60° C. and not more than 65° C., is to be performed for the package body 200 after packing the contents, similarly to the above, a polypropylene-based resin or a polyamide resin having a high heat resistance, a polyester-based resin having a high melting point, and the like, may be used as the material of the outer layer 110. Additionally, an amorphous polyester-based resin may be used as the material of the outer layer 110.

When the heat sterilization process is not to be performed for the package body 200 after packing the contents, a polyester-based resin having a good glossiness and rigidity, or a polyamide resin or an EVOH resin having a good labeling property and rigidity or the like may be used in order to improve at least one of the appearance of the package body 200 and the textural quality obtained when the package body 200 is held in the hand. The labeling property indicates the characteristic that when a label specifying the product name is affixed on the bottom part of the bottom member 300, the label can be affixed along the curved surface, and does not peel or fall off easily even after a long time has passed since affixing the label.

A crystalline polypropylene-based resin, for example, may be used as the polypropylene-based resin of the material of the outer layer 110. Specifically, a crystalline polypropylene homopolymer, a crystalline propylene-ethylene random copolymer, a crystalline propylene-α-olefin random copolymer, and a crystalline block copolymer of propylene and at least one of ethylene and α-olefin, for example, may be used as the crystalline polypropylene-based resin. An α-olefin having carbon number of 4 to 10, such as 1-butene, 1-pentene, 1-hexene, 1-octene, and 1-decene may be used as the aforementioned α-olefin. These α-olefins may be copolymerized at any ratio.

A saturated polyester resin or the like obtained by using a bivalent acid such as a terephthalic acid, or its derivative having an ester-forming ability, as the acid component, and a glycol having carbon number of 2 to 10, or other bivalent alcohols or their derivatives or the like having an ester-forming ability, as the glycol component, for example, may be used as the polyester-based resin of the material of the outer layer 110. Specifically, a polyalkylene terephthalate resin or the like, such as a polyethylene terephthalate resin, a polytrimethylene terephthalate resin, a polytetramethylene terephthalate resin, and a polyhexamethylene terephthalate resin may be used as the saturated polyester-based resin. By using these polyester-based resins, at least one of the appearance and the textural quality of the package body 200 may be improved.

Furthermore, other components may be copolymerized with the polyester-based resin. Well-known acid components, alcohol components, phenol components, or their derivatives having an ester-forming ability, polyalkylene glycol components, and the like may be used as the component to be copolymerization.

An aromatic carboxylic acid having a valence of not less than 2 and having carbon number of 8 to 22, an aliphatic carboxylic acid having a valence of not less than 2 and having carbon number of 4 to 12, an alicyclic carboxylic acid having a valence of not less than 2 and having carbon number of 8 to 15, their derivatives having an ester-forming ability, and the like may be used as the acid component to be copolymerized. Specifically, for example, terephthalic acid, isophthalic acid, naphthalenedicarboxylic acid, bis(p-carboxyphenyl) methane anthracene dicarboxylic acid, 4,4'-diphenyl carboxylic acid, 1,2-bis(phenoxy)ethane-4,4'-dicarboxylic acid, 5-sodium sulfoisophthalic acid, adipic acid, sebacic acid, azelaic acid, dodecanedioic acid, maleic acid, trimesic acid, trimellitic acid, pyromellitic acid, 1,3-cyclohexanedicarboxylic acid, 1,4-cyclohexanedicarboxylic acid, and their derivatives having an ester-forming ability, may be used as the acid component to be copolymerized. These acid components may be used either separately or by combining not less than two types.

An aliphatic alcohol having a valence of not less than 2 and having carbon number of 2 to 15, an alicyclic alcohol having a valence of not less than 2 and having a carbon number of 6 to 20, an aromatic alcohol having a valence of not less than 2 and having carbon number of 6 to 40, a phenol having a valence of not less than 2, or their derivatives having an ester-forming ability, for example, may be used as the alcohol component and phenol component to be copolymerized. Specifically, compounds such as an ethylene glycol, a propanediol, a butanediol, a hexanediol, a decanediol, a neopentyl glycol, a cyclohexanedimethanol, a cyclohexanediol, 2,2'-bis(4-hydroxyphenyl)propane, 2,2'-bis(4-hydroxy cyclohexyl)propane, hydroquinone, glycerin, pentaerythritol, and their derivates or the like having an ester-forming ability may be used as the alcohol component and phenol component to be copolymerized.

Modified polyoxyalkylene glycols and the like, such as polyethylene glycol, polypropylene glycol, polytetramethylene glycol, their random or block copolymers, and alkylene glycol (polyethylene glycol, polypropylene glycol, polytetramethylene glycol, their random or block copolymers, or the like) adducts of bisphenol compounds, may be used as the polyalkylene glycol component to be copolymerized.

As the polyamide resin, for example, the following may be used: crystalline polyamide, such as polycapramide (nylon-6), poly-ω-aminoheptanoic acid (nylon-7), poly-ω-aminononanoic acid (nylon-9), polyundecanoamide (nylon-11), poly (lauryl lactam) (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,8), copolymer resins such as caprolactam/lauryl lactam copolymer (nylon-6/12), caprolactam/ω-aminononanoic acid copolymer (nylon-6/9), caprolactam/hexamethylene diammonium adipate copolymer (nylon-6/6,6), lauryl lactam/hexamethylene diammonium adipate copolymer (nylon-12/6,6), ethylenediamine adipamide/hexamethylene diammonium adipate copolymer (nylon-2,6/6,6), caprolactam/hexamethylene diammonium adipate/hexamethylene diammonium sebacate copolymer (nylon-6/6,6/6,12), and ethylene ammonium adipate/hexamethylene diammonium adipate/hexamethylene diammonium sebacate copolymer (nylon-6/6,6/6,10); and amorphous polyamide resins, such as a polymer in which its main framework is obtained by the polymerization between hexamethylene diamine and at least one of: terephthalic acid and isophthalic acid, specifically, a polymer of hexamethylenediamine-isophthalic acid, a polymer of hexamethylenediamine-terephthalic acid, and a copolymer of hexamethylenediamine-terephthalic acid-hexamethylenediamineisophthalic acid. These resins may be used either separately or by combining not less than two types.

The rate of copolymerization of ethylene in the EVOH resin used for the outer layer 110 is not less than 24 mol % and not more than 44 mol %. An EVOH resin having the rate of copolymerization of ethylene of not less than 24 mol % exhibits a good processability of the multilayer film 100 in to the shape of a container, and a decline in oxygen barrier property due to the effect of the hot water or steam can be controlled. An EVOH resin having the rate of copolymerization of ethylene of not more than 44 mol % exhibits a good oxygen barrier property in the drying state, and as a result, the qualities of the contents are less likely to change.

Although not particularly limited, the thickness of the outer layer 110 preferably is not less than 5 μm and not more than 100 μm, more preferably not less than 10 μm and not more than 50 μm, and further preferably not less than 20 μm and not more than 30 μm. When the thickness of the outer layer 110 is not less than 5 μm and not more than 100 μm, the multilayer film 100 with a good appearance can be obtained at a relatively low price.

<First Adhesion Layer and Second Adhesion Layer>

The first adhesion layer 120 improves the adhesion strength between the outer layer 110 and the repeatedly laminated part 130, the stiffness of the multilayer film 100, the anti-pinhole property, the flexibility, the formability, and the like. The second adhesion layer 140 improves the adhesion strength between the repeatedly laminated part 130 and the sealing layer 150, the stiffness of the multilayer film 100, the anti-pinhole property, the flexibility, the formability, and the like. Well-known adhesive resins, for example, an adhesive polyolefin-based resin may be used as the material of the first adhesion layer 120 and the second adhesion layer 140. Specifically, for example, an ethylene-methacrylate-glycidyl acrylate terpolymer, or a graft copolymer obtained by grafting a monobasic unsaturated fatty acid, a dibasic unsaturated fatty acid, or an anhydride thereof in various polyolefins (such as a maleic acid grafted ethylene-vinyl acetate copolymer, and a maleic acid grafted ethylene-α-olefin copolymer) may be used as the material of the first adhesion layer 120 and the second adhesion layer 140. Acrylic acid, methacrylic acid, or the like may be used as the monobasic unsaturated fatty acid. Maleic acid, fumaric acid, itaconic acid, or the like may be used as the dibasic unsaturated fatty acid.

<Repeatedly Laminated Part>

The repeatedly laminated part 130 is formed by alternately and repeatedly laminating a first layer 131 and a second layer 132. The total number of laminations of the first layer 131 and the second layer 132 of the repeatedly laminated part 130 preferably is not less than 7 and not more than 999, more preferably not less than 11 and not more than 499, and further preferably not less than 17 and not more than 65. For example, in the case of the multilayer film 100 illustrated in FIG. 1, the total number of laminations of the first layer 131 and the second layer 132 of the repeatedly laminated part 130 is seventeen layers, where the number of laminations of the first layer 131 is nine layers, and that of the second layer 132 is eight layers.

The repeatedly laminated part 130 is arranged between the outer layer 110 and the sealing layer 150, via the first adhesion layer 120 and the second adhesion layer 140. Both a layer of the repeatedly laminated part 130, said layer being closest to the outer layer 110, and a layer of the repeatedly laminated part 130, said layer being closest to the sealing layer 150, are the first layer 131. Note that only either one of a layer of the repeatedly laminated part 130, said layer being closest to the outer layer 110, and a layer of the repeatedly laminated part 130, said layer being closest to the sealing layer 150, may also be the first layer 131.

The first layer 131 consists mainly of a polyamide resin. In fact, if the first layer that consists mainly of a polyamide-based elastomer, and the second layer, described later, which consists mainly of a copolymer of an olefin-based hydrocarbon having carbon number of 2 to 4 and a vinyl group-containing monomer are laminated alternately, then depending on the condition, the interface between the layers might become rough, and the appearance of the multilayer film 100 might deteriorate. Therefore, a material that is not an elastomer is used as the polyamide resin of the first layer 131, and specifically, nylon-6,6, nylon-6,10, nylon-6T made up of hexamethylene diamine and terephthalic acid, nylon-6I made up of hexamethylene diamine and isophthalic acid, nylon-9T made up of nonanediamine and terephthalic acid, nylon-M5T made up of methylpentadiamine and terephthalic acid, nylon-6,12 made up of caprolactam and lauryl lactam, and the like may be used. Additionally, a copolymer of the aforementioned resins and at least one type from among nylon-6, nylon-11, and nylon-12 may be used. These resins may be used either separately or by combining not less than two types. Furthermore, an amorphous aromatic polyamide (amorphous nylon) obtained by performing a polycondensation reaction of an aliphatic diamine such as hexamethylene diamine and a dicarboxylic acid such as terephthalic acid and isophthalic acid, or its derivative might be used. When a polyamide resin is used as the material of the outer layer 110, the same polyamide resin as the outer layer 110 may be used as the material of the first layer 131.

The second layer 132 consists mainly of a copolymer of an olefin-based hydrocarbon having carbon number of 2 to 4 and a vinyl group-containing monomer. Olefin-based hydrocarbons having carbon number of 2 to 4 include ethylene, propylene, 1-butene, 2-butene, 2-methyl propene, and the like. Examples of the copolymer of the olefin-based hydrocarbon and the vinyl group-containing monomer include a random copolymer, a graft copolymer, a block copolymer, and a graft copolymer, and particularly, a random copolymer is preferred. Furthermore, the copolymer of the olefin-based hydrocarbon and the vinyl group-containing monomer may be at least one of, for example, a maleic anhydride grafted modified linear low density polyethylene (hereinafter, called "LLDPE-g-MAH"), a maleic anhydride grafted modified polypropylene (hereinafter, called "PP-g-MAH"), an ethylene-vinyl acetate copolymer (hereinafter, called "EVA resin"), an ethylene-methyl methacrylate copolymer (hereinafter, called "EMMA resin"), an ethylene-ethyl acrylate copolymer (hereinafter, called "EEA" resin"), an ethylene-methyl acrylate copolymer (hereinafter, called "EMA resin"), an ethylene-ethyl acrylate-maleic anhydride copolymer (hereinafter, called "E-EA-MAH resin"), an ethylene-acrylic acid copolymer (hereinafter, called "EAA resin"), an ethylene-methacrylic acid copolymer (hereinafter, called "EMAA resin"), and an ionomer (hereinafter, called "ION resin"). The rate of copolymerization of methacrylic acid in the EMAA resin preferably is not less than 5 wt % and not less than 20 wt %, more preferably not less than 5 wt % and not more than 10 wt %, further preferably not less than 8 wt % and not more than 10 wt %, and most preferably 9 wt %. Particularly, the copolymer of the olefin-based hydrocarbon and the vinyl group-containing monomer preferably is at least one of an LLDPE-g-MAH, a PP-g-MAH, an EMAA resin, and an ION resin. The ION resin indicates a structure formed by changing the copolymer of the olefin-based hydrocarbon and a small amount of acrylic acid or methacrylic acid into an ion bridge structure resulting from salt formation of the acid part and the metallic ion.

When the total number of laminations of the repeatedly laminated part 130 using the aforementioned resin is not less than seven, the multilayer film 100 has a good anti-pinhole property, and the thickness can be reduced than that of a conventional multilayer film. When the total number of laminations of the repeatedly laminated part 130 using the aforementioned resin is not more than 999, the thickness of each layer of the first layer 131 and the second layer 132 of the multilayer film 100 does not become too less, and the multilayer film has a good appearance.

Although not particularly limited, the thickness of each layer of the first layer 131 and the second layer 132 preferably is not less than 0.05 μm and not more than 20 μm, more preferably not less than 0.1 μm and not more than 10 μm, and further preferably not less than 0.4 μm and not more than 6 μm. When the thickness of each layer of the first layer 131 and the second layer 132 is not less than 0.05 μm and not more than 20 μm, the multilayer film 100 has a good appearance and a good anti-pinhole property, and the thickness can be reduced than that of a conventional multilayer film.

Furthermore, when the main component of the second layer 132 is an LLDPE-g-MAH or PP-g-MAH, the thickness of each layer of the second layer 132 preferably is not less than 0.4 μm. By having a thickness of not less than 0.4 μm for each layer of the second layer 132, the occurrence of delamination during peeling the seal when the easy peeling function has been provided to the sealing layer 150 is controlled.

Although not particularly limited, the ratio of the thickness of the repeatedly laminated part 130 relative to the thickness of the entire film preferably is not less than 15% and not more than 60%, more preferably not less than 20% and not more than 55%, and further preferably not less than 25% and not more than 50%. When the ratio of the repeatedly laminated part 130 with respect to the entire film is not less than 15% and not more than 60%, the multilayer film 100 has a good appearance and a good anti-pinhole property, and the thickness can be reduced than that of a conventional multilayer film.

<Sealing Layer>

The sealing layer 150 has a function of a resistance to packaged contents and a function of sealability with the corresponding member to be sealed. The above-described packaged-contents resistance indicates a property that the sealing layer 150 does not lose a function relating to sealability with the corresponding member due to the chemicals or oil, when the contents are, for example, chemicals or foods that contain a large amount of oil. Resins such as a low-density polyethylene resin (hereinafter, called "LDPE resin"), a linear low-density polyethylene resin (hereinafter, called "LLDPE resin"), a medium-density polyethylene resin (hereinafter, called "MDPE resin"), a high-density polyethylene resin (hereinafter, called "HDPE resin"), a polypropylene resin (hereinafter, called "PP resin"), an EVA rein, an EMMA resin, an EEA resin, an EMA resin, an E-EA-MAH resin, an EAA resin, an EMAA resin, and an ION resin may be used as the material of the sealing layer 150. These resins may be used either separately or by combining not less than two types. An LLDPE resin and an EVA resin are preferable, as the material of the sealing layer 150, because these have, for example, a good transparency and sealing strength.

The sealing layer 150 has the easy peeling function. In order to provide the easy peeling function, a material obtained by including not less than 10 parts by weight and not more than 90 parts by weight of a PP resin in not less than 10 parts by weight and not more than 90 parts by weight of an ethylene copolymer, such as an EMAA resin or an EMMA resin, may be used as the material the sealing layer 150. When having not less than 10 parts by weight of an ethylene copolymer, the sealing layer 150 has a good easy peeling property. When having not more than 90 parts by weight of an ethylene copolymer, the variation in the peeling strength of the sealing layer 150 is reduced. The sealing layer 150 may not necessarily have the easy peeling function.

As long as the main point of the present invention is not lost, additives, such as antioxidants, slip agents, anti-blocking agents, antistatic agents, ultraviolet ray absorbing agents, resin modifiers, colorants including dyes, pigments and the like, and stabilizers, impact resistance imparting agents, such as fluorocarbon resins and silicon rubber, and inorganic fillers, such as titanium dioxide, calcium carbonate, and talc may be included in the material of each layer. Furthermore, if necessary, an adhesion layer including an adhesive resin may be provided between each resin layer, in addition to the first adhesion layer 120 and the second adhesion layer 140.

<Method of Manufacturing the Multilayer Film>

The multilayer film 100, for example, is obtained by separately manufacturing the outer layer 110, the repeatedly laminated part 130, and the sealing layer 150, and then joining them by a laminator or the like. The multilayer film 100 is obtained by forming a film of the outer layer 110, the repeatedly laminated part 130, and the sealing layer 150 either by the air-cooled or water-cooled coextrusion inflation method or the coextrusion T-die method. The method of forming films by the coextrusion T-die method is preferable from the viewpoint of controlling the thickness of the multilayer film 100 and the transparency, and the films can be manufactured by using the appropriate feed block and die.

<Package Body>

The package body 200 illustrated in FIG. 2 is configured from the bottom member 300 and a lid member 400. The bottom member 300 is obtained by forming a pocket 310 in the multilayer film 100. Contents, such as foods, beverages, medicinal products, or industrial parts are stored in the pocket 310. After the contents have been stored in the pocket 310, the lid member 400 is sealed with the bottom member 300, and the pocket 310 of the bottom member 300 is sealed up.

A film obtained by laminating a biaxially oriented polypropylene film (OPP film), a biaxially oriented polyethylene terephthalate film on which a metal oxide has been deposited (VM-PET film), and a polyethylene resin, for example, may be used as the material of the lid member 400.

<Effect of the Present Embodiment>

It was clear that the multilayer film 100 had a good impact resistance, flex resistance, and anti-pinhole property. Thus, the thickness of the multilayer film 100 can be reduced than the conventional multilayer film, while retaining the same performance as the conventional multilayer film.

The multilayer film including the repeatedly laminated part formed by alternately and repeatedly laminating the first layer that consists mainly of a polyamide resin (excluding elastomers), and the second layer that consists mainly of a copolymer of an olefin-based hydrocarbon having carbon number of 2 to 4 and a vinyl group-containing monomer, has a good impact resistance, flex resistance, and anti-pinhole property. Thus, the thickness of the multilayer film can be reduced than that of the conventional multilayer film, while retaining the same performance as the conventional multilayer film.

The multilayer film 100 of which the total number of laminations of the first layer 131 and the second layer 132 of the repeatedly laminated part 130 is not less than 7 and not more than 999, has a good impact resistance, flex resistance, and anti-pinhole property. Thus, the thickness of the multilayer film 100 can be reduced than the conventional multilayer film, while retaining the same performance as the conventional multilayer film.

The multilayer film 100 in which the copolymer of the olefin-based hydrocarbon and the vinyl group-containing monomer of the second layer 132 is at least one of an LLDPE-g-MAH, a PP-g-MAH, an EMAA resin, and an ION resin, has a good impact resistance, flex resistance, and anti-pinhole property. Thus, the thickness of the multilayer film 100 can be reduced than the conventional multilayer film, while retaining the same performance as the conventional multilayer film.

The multilayer film 100 in which at least one of a layer of the repeatedly laminated part 130, said layer being closest to the outer layer 110, and a layer of the repeatedly laminated part 130, said layer being closest to the sealing layer 150, is the first layer 131, has a good impact resistance, flex resistance, and anti-pinhole property. Thus, the thickness of the multilayer film 100 can be reduced than the conventional multilayer film, while retaining the same performance as the conventional multilayer film.

The multilayer film 100 in which the outer layer 110 includes at least one of a polypropylene-based resin, a polyester-based resin, a polyamide resin, and an EVOH resin, has a good impact resistance, flex resistance, and anti-pinhole property. Thus, the thickness of the multilayer film 100 can be reduced than the conventional multilayer film, while retaining the same performance as the conventional multilayer film.

As a result of the multilayer film 100 including the sealing layer 150 imparted with an easy peeling function, the multilayer film 100 can be unsealed easily when used for the package body 200.

The bottom member 300 of the package body 200 is manufactured by using the aforementioned multilayer film 100 which has a good impact resistance, flex resistance, and anti-pinhole property, and of which the thickness can be reduced as compared to that of the conventional multilayer film. Thus, during use, the package body 200 exhibits a good impact resistance, flex resistance, and anti-pinhole property, and after use, the amount of the multilayer film 100, which is a waste, can be reduced. Additionally, because the package body 200 has a good impact resistance, flex resistance, and anti-pinhole property, the risk of disposal of the product (package body 200 containing the contents) due to the formation of pinholes can be reduced.

<Modification>

(A)

Figure 3:
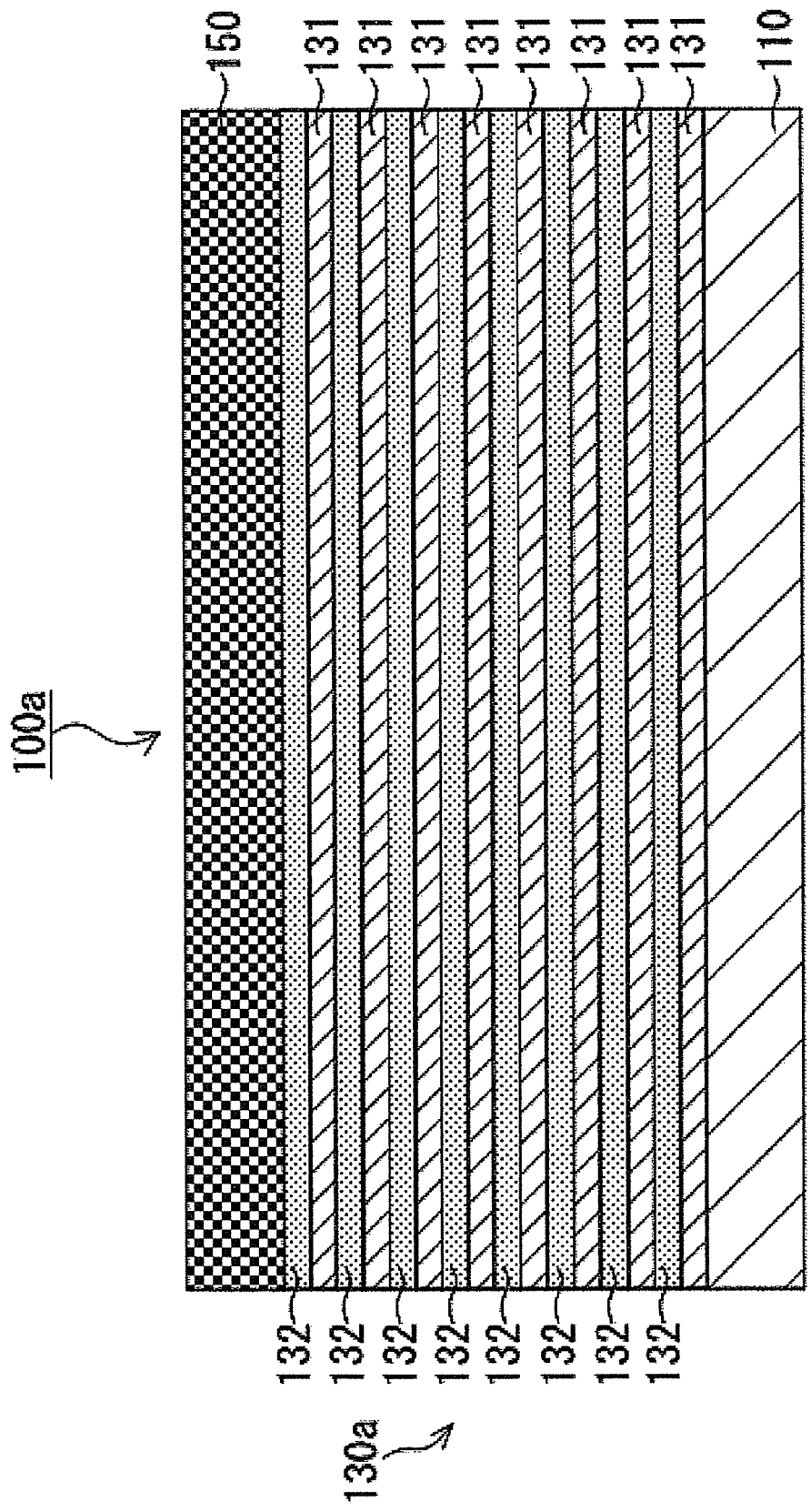
FIG. 3 is a cross-sectional view of a multilayer film according to a modification (A) of the first embodiment of the present invention.

In a multilayer film 100a illustrated in FIG. 3, it may be possible that the first adhesion layer 120 and the second adhesion layer 140 are not provided, and total number of laminations of the first layer 131 and the second layer 132 of a repeatedly laminated part 130a is sixteen layers, where the number of laminations of the first layer 131 is eight layers, and that of the second layer 132 is eight layers. In such a case, while the first layer 131 and the outer layer 110 of the repeatedly laminated part 130a are in contact, the second layer 132 and the sealing layer 150 of the repeatedly laminated part 130a are in contact. As a result of the second layer 132 and the sealing layer 150 of the repeatedly laminated part 130a being in contact, the second layer 132 functions as an adhesion layer. Therefore, the adhesion strength between the repeatedly laminated part 130a and the sealing layer 150 improves in the multilayer film 100a. At least one of the outer layer 110, the first adhesion layer 120, the second adhesion layer 140, and the sealing layer 150 may not be provided. Furthermore, the repeatedly laminated part 130a may be configured such that the second layer 132 and the outer layer 110 of the repeatedly laminated part 130a are in contact.

(B)

Figure 4:
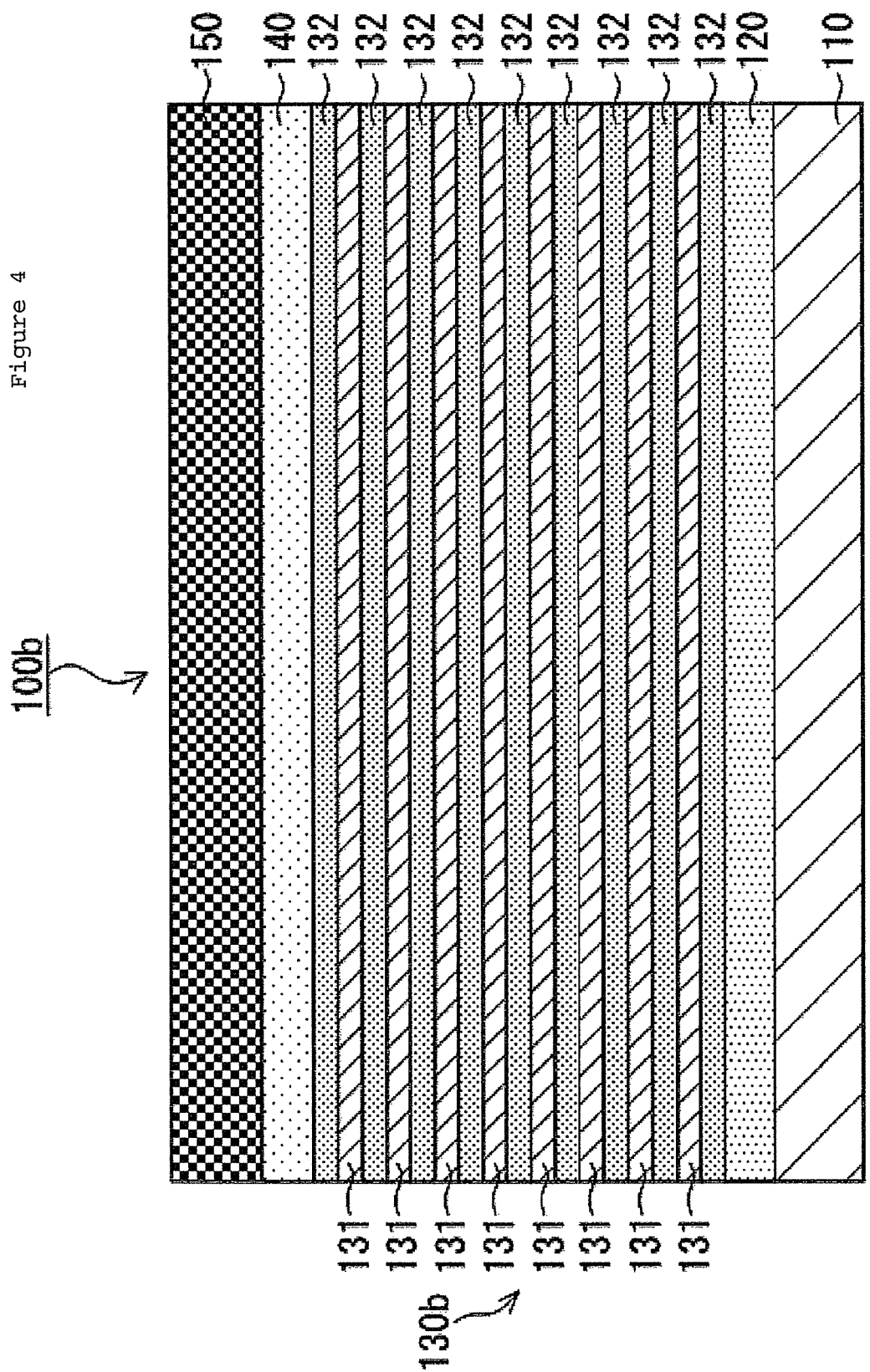
FIG. 4 is a cross-sectional view of a multilayer film according to a modification (B) of the first embodiment of the present invention.

In a multilayer film 100b illustrated in FIG. 4, it may be possible that the total number of laminations of the first layer 131 and the second layer 132 of a repeatedly laminated part 130b is seventeen layers, where the number of laminations of the first layer 131 is eight layers, and that of the second layer 132 is nine layers. In this case, both the layer of the repeatedly laminated part 130b, said layer being closest to the outer layer 110, and the layer of the repeatedly laminated part 130b, said layer being closest to the sealing layer 150, are the second layer 132.

(C)

Figure 5:
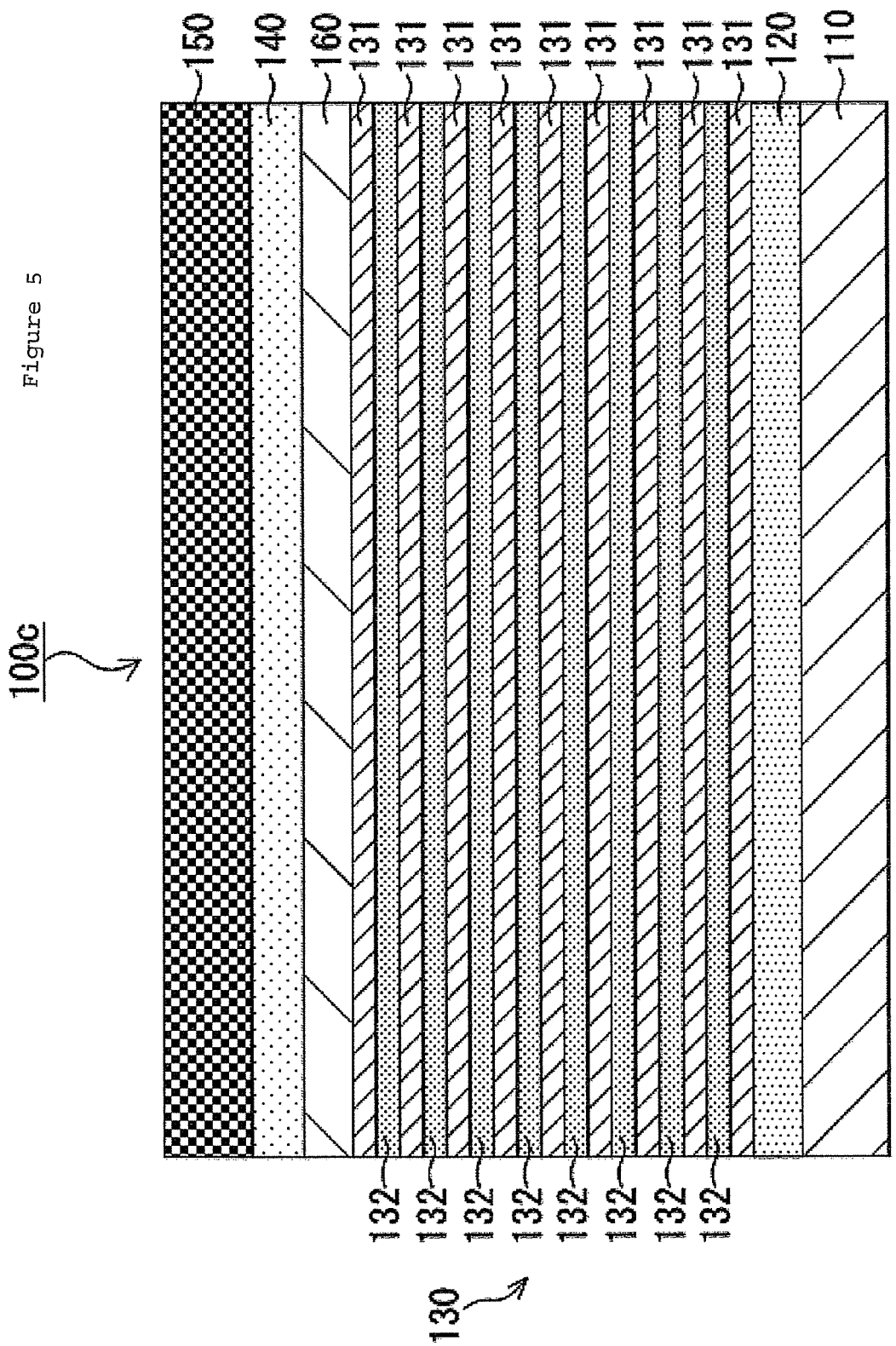
FIG. 5 is a cross-sectional view of a multilayer film according to a modification (C) of the first embodiment of the present invention.

A multilayer film 100c illustrated in FIG. 5 may include an oxygen barrier layer 160 arranged between the repeatedly laminated part 130 and the sealing layer 150. In such a case, the second adhesion layer 140 is arranged between the oxygen barrier layer 160 and the sealing layer 150. The second adhesion layer 140 may also be arranged between the repeatedly laminated part 130 and the oxygen barrier layer 160.

Well-known materials having an oxygen barrier property, for example, a polyvinyl alcohol resin, an EVOH resin, a vinylidene chloride resin, or a polyamide resin having an aromatic ring in the diamine component may be used as the material of the oxygen barrier layer 160. By having the oxygen barrier layer 160, the multilayer film 100c is imparted with the oxygen barrier property.

Generally, a resin having a high oxygen barrier property is a rigid resin in which a brittle fracture occurs easily due to an impact. When a brittle fracture occurs in the oxygen barrier layer 160, stress concentration triggered by the fractured part can occur easily in multilayer film 100c. When stress concentration occurs, the relaxation effect of the impact to the repeatedly laminated part 130 reduces.

Thus, when the multilayer film 100c is used for the package body 200 that easily receives an impact from the outer layer 110 side during transport, the impact is prevented from reaching the oxygen barrier layer 160 by arranging the oxygen barrier layer 160 between the repeatedly laminated part 130 and the sealing layer 150. As a result, even if the multilayer film 100c receives an impact from the outer layer 110 side, a brittle fracture of the oxygen barrier layer 160 is less likely to occur, and the relaxation effect of the impact to the repeatedly laminated part 130 is easy to maintain.

(D)

Figure 6:
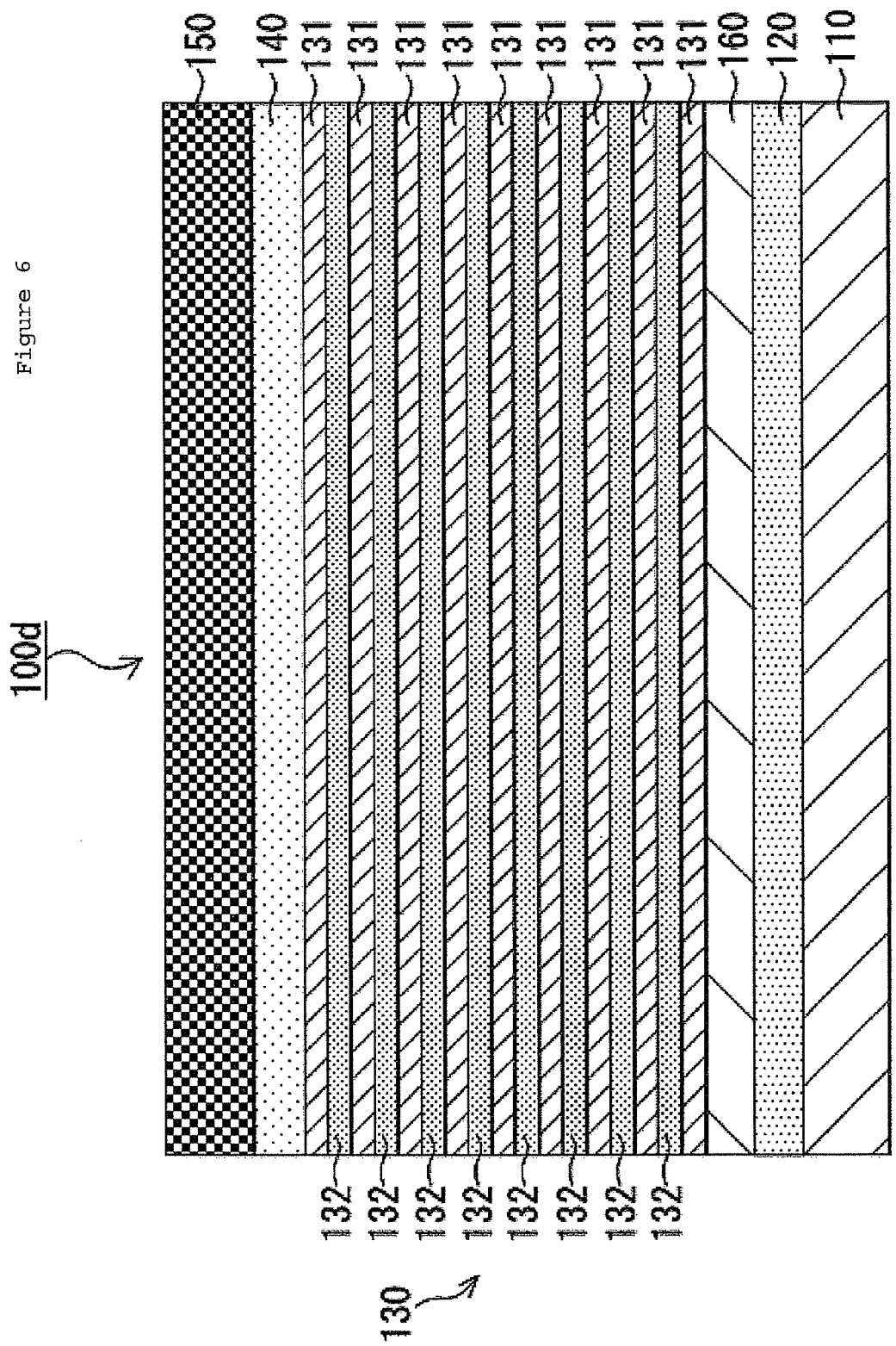
FIG. 6 is a cross-sectional view of a multilayer film according to a modification (D) of the first embodiment of the present invention.

A multilayer film 100d illustrated in FIG. 6 may include the oxygen barrier layer 160 arranged between the outer layer 110 and the repeatedly laminated part 130. In such a case, the first adhesion layer 120 is arranged between the outer layer 110 and the oxygen barrier layer 160. The first adhesion layer 120 may also be arranged between the repeatedly laminated part 130 and the oxygen barrier layer 160.

When the multilayer film 100d is used for the package body 200, for example, which packs a hard and sharp content, and which easily receives an impact from the sealing layer 150 side during packaging or transport, the impact is prevented from reaching the oxygen barrier layer 160 by arranging the oxygen barrier layer 160 between the repeatedly laminated part 130 and the outer layer 110. As a result, even if the multilayer film 100d receives an impact from the sealing layer 150 side, a brittle fracture of the oxygen barrier layer 160 is less likely to occur, and the relaxation effect of the impact to the repeatedly laminated part 130 is easy to maintain.

(E)

Figure 7:
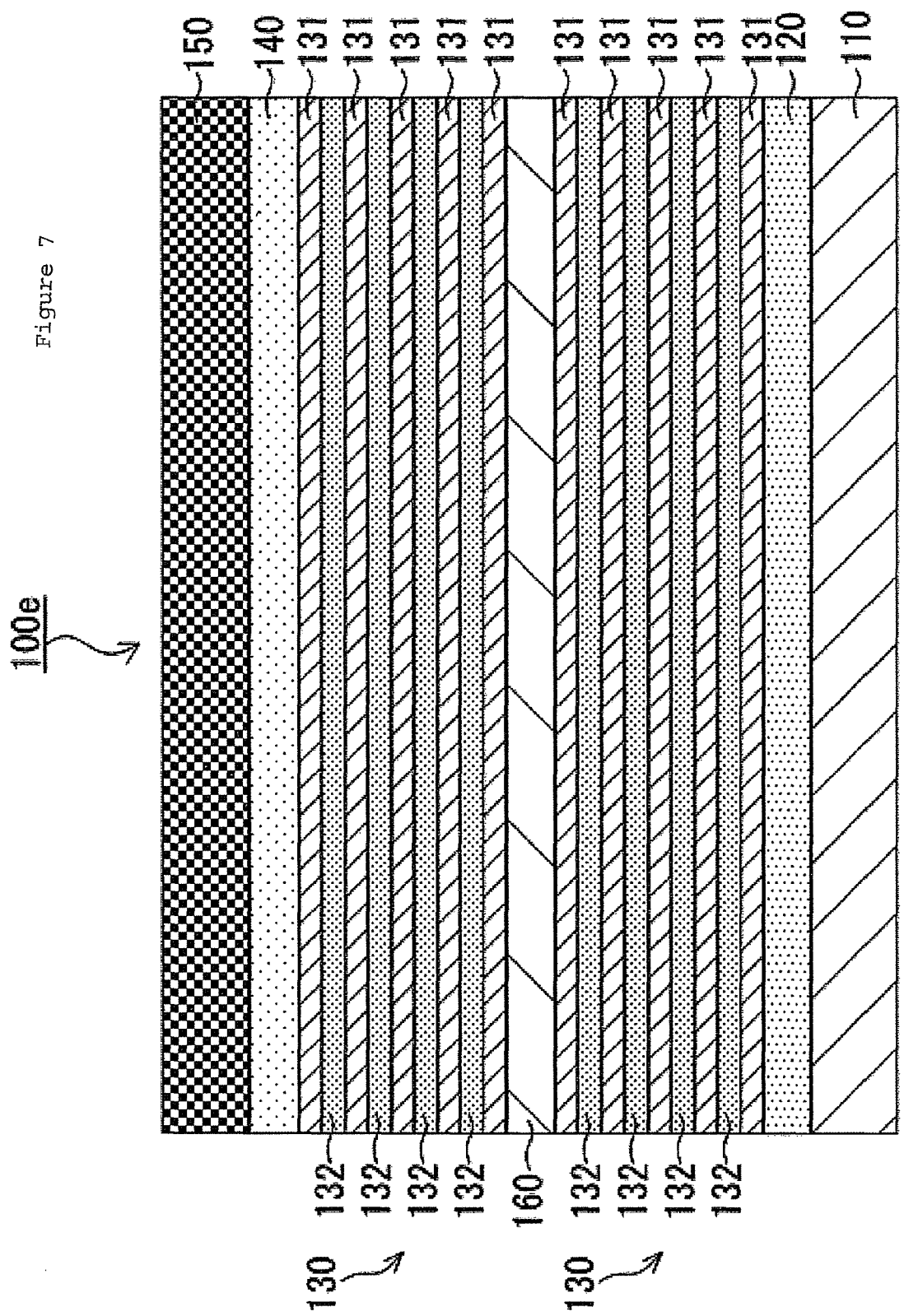
FIG. 7 is a cross-sectional view of a multilayer film according to a modification (E) of the first embodiment of the present invention.

A multilayer film 100e illustrated in FIG. 7 may include a plurality of repeatedly laminated parts 130 and 130, and the oxygen barrier layer 160 arranged between the repeatedly laminated parts 130 and 130. For example, in the case of the multilayer film 100e illustrated in FIG. 7, the total number of laminations of the first layer 131 and the second layer 132 of each repeatedly laminated part 130 is nine layers, where the number of laminations of the first layer 131 is five layers, and that of the second layer 132 is four layers. The numbers of laminations of the first layer 131 and the second layer 132 may be different in the repeatedly laminated parts 130 and 130.

When the multilayer film 100e, is used for the package body 200, for example which packs a hard and sharp content, which easily receives an impact from the outer layer 110 side and the sealing layer 150 side during transport, and which easily receives an impact from the sealing layer 150 side during packaging, the impact can be prevented from reaching the oxygen barrier layer 160 by arranging the oxygen barrier layer 160 between the repeatedly laminated parts 130 and 130. As a result, even if the multilayer film 100e receives an impact from the outer layer 110 side and the sealing layer 150 side, a brittle fracture of the oxygen barrier layer 160 is less likely to occur, and the relaxation effect of the impact to the repeatedly laminated part 130 is easy to maintain.

(F)

Figure 8:
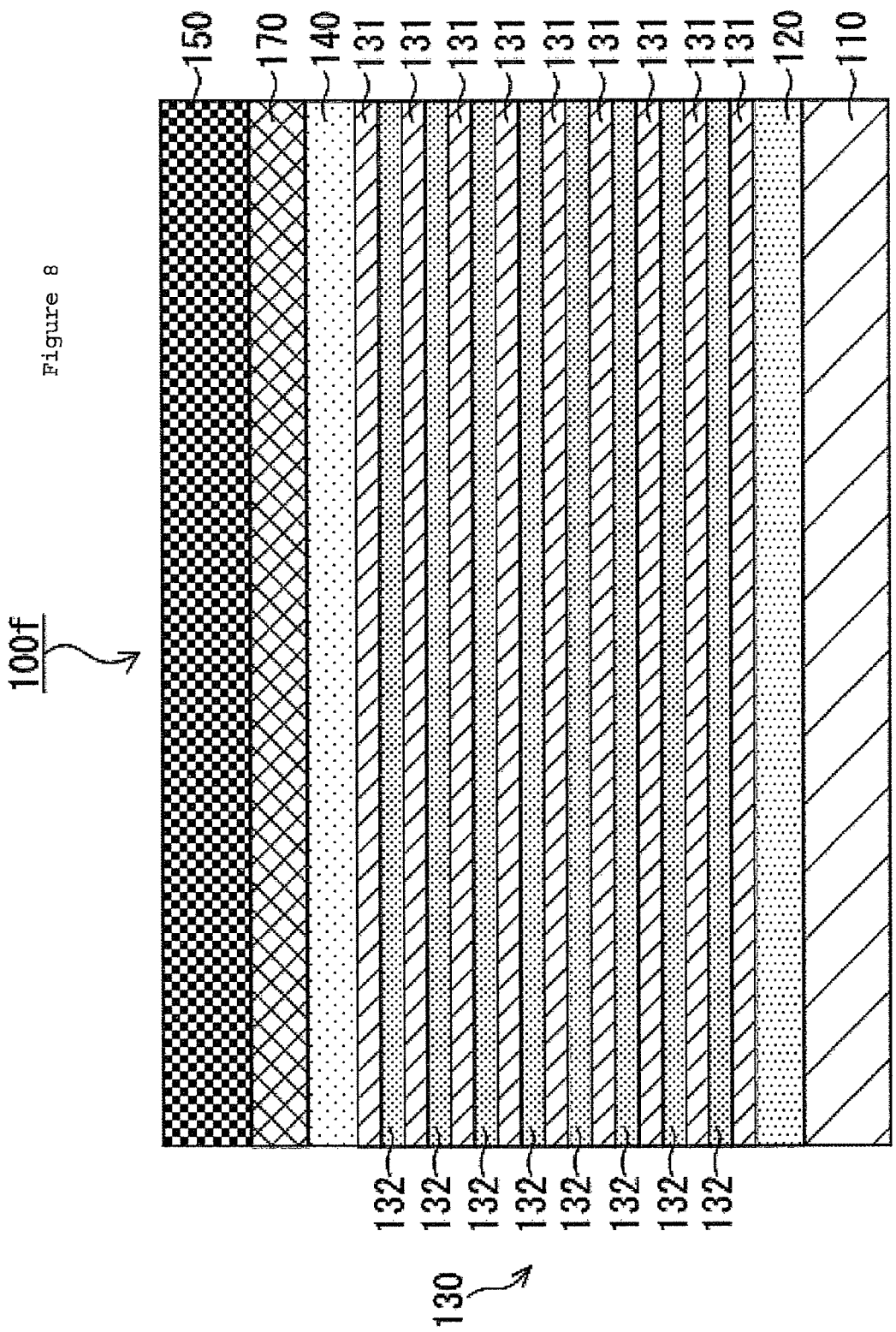
FIG. 8 is a cross-sectional view of a multilayer film according to a modification (F) of the first embodiment of the present invention.

A multilayer film 100f illustrated in FIG. 8 may further include a functional layer 170 between the second adhesion layer 140 and the sealing layer 150. The functional layer 170 is a layer for providing a specific function to the multilayer film 100f. The functional layer 170 is provided in the multilayer film 100f either by adding a layer, or by laminating another film or sheet prepared separately by any lamination method. The repeatedly laminated part 130 is arranged between the outer layer 110 and the sealing layer 150 via the first adhesion layer 120, the second adhesion layer 140, and the functional layer 170. The functional layer 170 may also be provided at a location other than between the second adhesion layer 140 and the sealing layer 150, for example, the functional layer 170 may be provided between the outer layer 110 and the first adhesion layer 120, between the first adhesion layer 120 and the repeatedly laminated part 130, and between the repeatedly laminated part 130 and the second adhesion layer 140. Furthermore, the multilayer film 100f may further include the oxygen barrier layer 160.

By using a polyolefin-based resin as the material of the functional layer 170, the occurrence of pinholes in the multilayer film 100f due to flexing can be prevented. Additionally, when the easy peeling function is provided to the sealing layer 150, the peeling strength of the sealing layer 150 can be made uniform in the multilayer film 100f. Specifically, polyolefin-based resins, such as an LDPE resin, an LLDPE resin, an MDPE resin, an HDPE resin, and a PP resin, and polyolefin-based resins that are ethylene copolymers, such as an EVA resin, an EMMA resin, an EEA resin, an EMA resin, an E-EA-MAH resin, an EAA resin, an EMAA resin, and an ION resin may be used as the material of the functional layer 6.

Particularly, by using an LLDPE resin or an ION resin in the functional layer 170, the anti-pinhole property of the multilayer film 100f can be improved further. The LLDPE resin mentioned here is a resin including a metallocene linear low-density polyethylene resin (mLLDPE resin) manufactured by using a metallocene catalyst. Furthermore, $Na^+$, $Zn^{2+}$, and the like may be used as the metallic cations that crosslink between the molecular chains of an ION resin.

(G)

Figure 9:
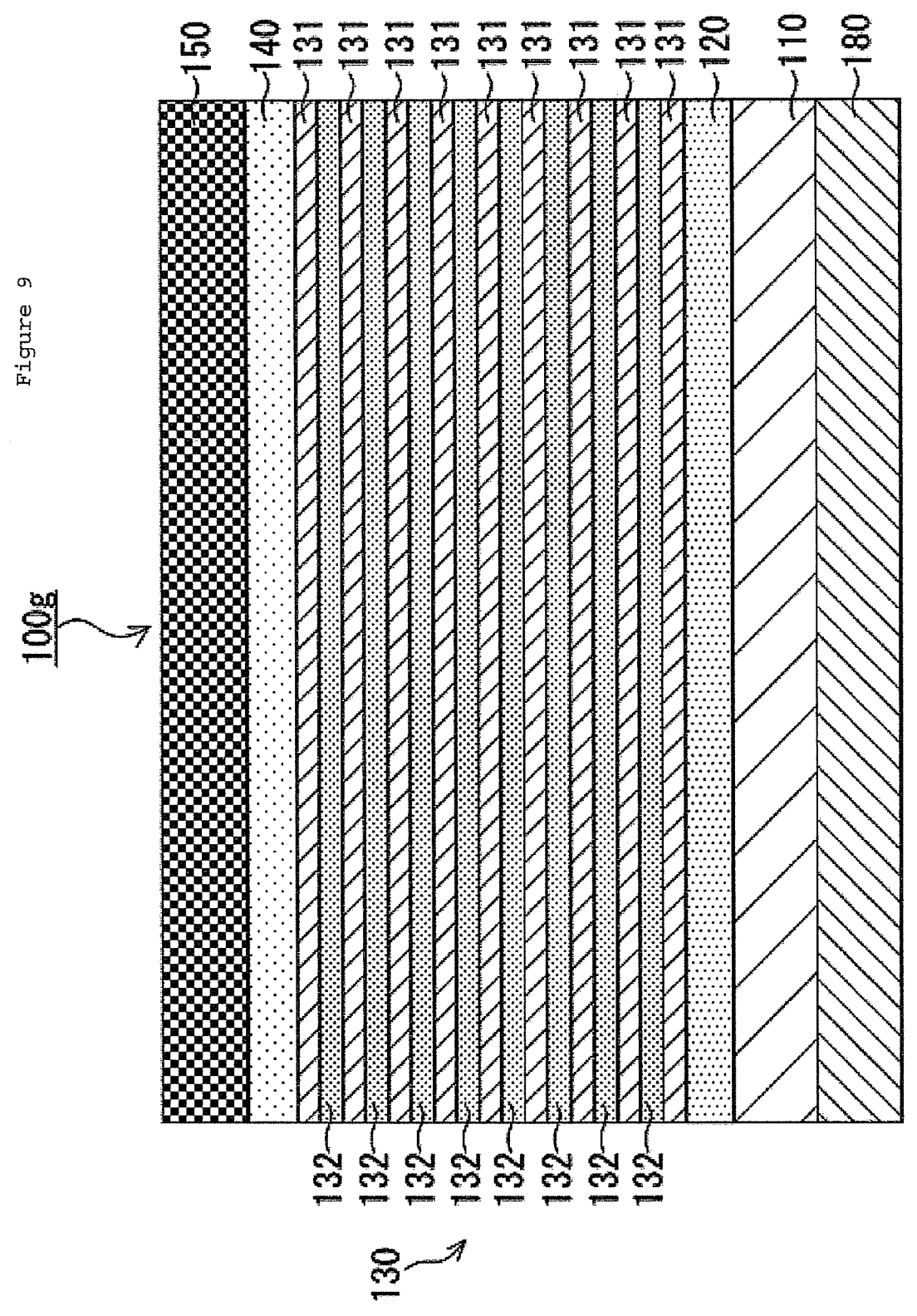

An outermost layer 180 formed by affixing together a biaxially oriented polypropylene film (hereinafter, called "OPP film"), a biaxially oriented polyethylene terephthalate film (hereinafter, called "OPET film"), a biaxially oriented polyamide film (hereinafter, called "ONY film"), a coextruded polypropylene film (hereinafter, called "CPP film"), a polyethylene terephthalate film (hereinafter, called "APET film") and the like to the outer layer 110 by the dry lamination method may be formed on a multilayer film 100g illustrated in FIG. 9. The thickness of the outermost layer 180 preferably is 20 µm, for example.

(H)

The multilayer films 100, 100a, 100b, 100c, 100d, 100e, 100f, and 100g may be used as the lid member 400, or may be used for both the bottom member 300 and the lid member 400.

Second Embodiment

Figure 10:
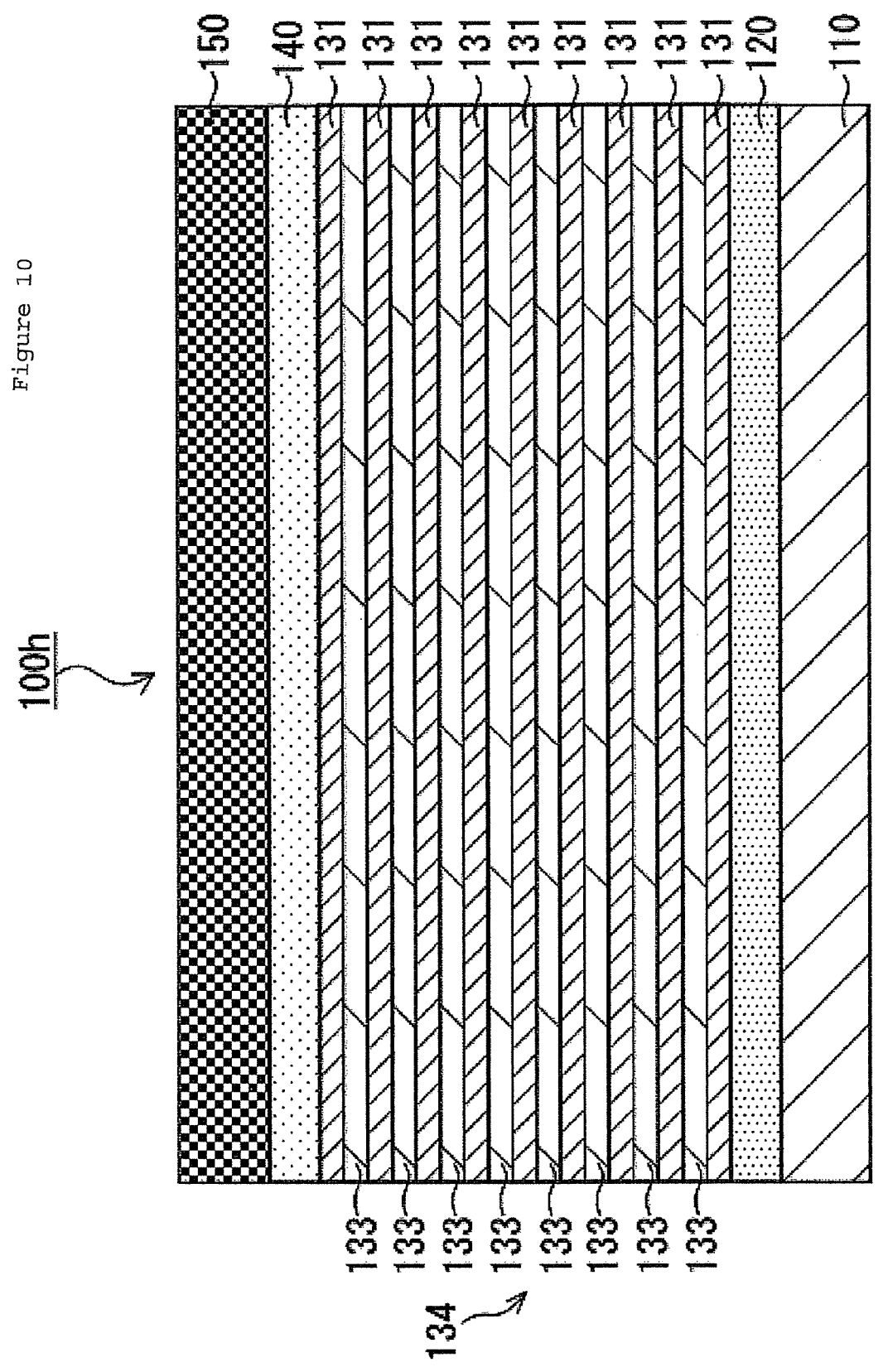

A multilayer film 100h according to a second embodiment of the present invention, as illustrated in FIG. 10, will be described below. The main component of the second layer 132 of the multilayer film 100 according to the aforementioned first embodiment is at least one of an LLDPE-g-MAH, a PP-g-MAH, an EMAA resin, and an ION resin. In contrast, the main component of the second layer 133 of the multilayer film 100h according to the second embodiment is an EVOH resin. In the second embodiment, the same reference signs are applied to the same configuration as that of the first embodiment, and the duplicated description thereof is omitted appropriately.

<Repeatedly Laminated Part>

A repeatedly laminated part 134 is formed by alternately and repeatedly laminating the first layer 131 and the second layer 133. The total number of laminations of the first layer 131 and the second layer 133 of the repeatedly laminated part 134 preferably is not less than 7 and not more than 999, more preferably not less than 11 and not more than 499, and further preferably not less than 17 and not more than 65. For example, in the case of the multilayer film 100h illustrated in FIG. 10, the total number of laminations of the first layer 131 and the second layer 133 of the repeatedly laminated part 134 is 17 layers, where the number of laminations of the first layer 131 is nine layers, and that of the second layer 133 is eight layers. When the total number of laminations of the repeatedly laminated part 134 is not less than seven, the multilayer film 100h has a good anti-pinhole property, and the thickness can be reduced than that of a conventional multilayer film. When the total number of laminations of the repeatedly laminated part 134 is not more than 999, the thickness of each layer of the first layer 131 and the second layer 133 of the multilayer film 100h does not become too less, and the multilayer film 100h has a good appearance.

The repeatedly laminated part 134 is arranged between the outer layer 110 and the sealing layer 150, via the first adhesion layer 120 and the second adhesion layer 140. Both a layer of the repeatedly laminated part 134, said layer being closest to the outer layer 110, and a layer of the repeatedly laminated part 134, said layer being closest to the sealing layer 150, are the first layer 131. Note that only either one of a layer of the repeatedly laminated part 134, said layer being closest to the outer layer 110, and a layer of the repeatedly laminated part 134, said layer being closest to the sealing layer 150, may also be the first layer 131.

Although not particularly limited, the thickness of each layer of the first layer 131 and the second layer 133 preferably is not less than 0.05 µm and not more than 20 µm, more preferably not less than 0.1 µm and not more than 10 µm, and further preferably not less than 0.4 µm and not more than 6

μm. When the thickness of each layer of the first layer 131 and the second layer 133 is not less than 0.05 μm, the multilayer film 100*h* has a good appearance. When the thickness of each layer of the first layer 131 and the second layer 133 is not more than 20 μm, the anti-pinhole property of the multilayer film 100*h* becomes excellent, and the thickness of the multilayer film 100*h* can be reduced than that of a conventional multilayer film.

The copolymer of the olefin-based hydrocarbon and the vinyl group-containing monomer of the second layer 133 is an EVOH resin. The rate of copolymerization of ethylene in the EVOH resin preferably is not less than 20 mol % and not more than 50 mol %, more preferably not less than 30 mol % and not more than 40 mol %, and further preferably not less than 30 mol % and not less than 35 mol %, and most preferably 32 mol %. When an EVOH resin is used as the material of the outer layer 110, the same EVOH resin as the outer layer 110 may be used as the material of the second layer 133.

<Effect of the Present Embodiment>

The multilayer film 100*h*, in which the copolymer of the olefin-based hydrocarbon and the vinyl group-containing monomer of the second layer 133 is the EVOH resin, is imparted with a good impact resistance, flex resistance, anti-pinhole property, and oxygen barrier property. Thus, the thickness of the multilayer film 100*h* can be reduced than that of the conventional multilayer film, while retaining the same impact resistance, flex resistance, and anti-pinhole property as the conventional multilayer film, and further an oxygen barrier property can be exhibited.

<Modification>

(A)

Figure 11:
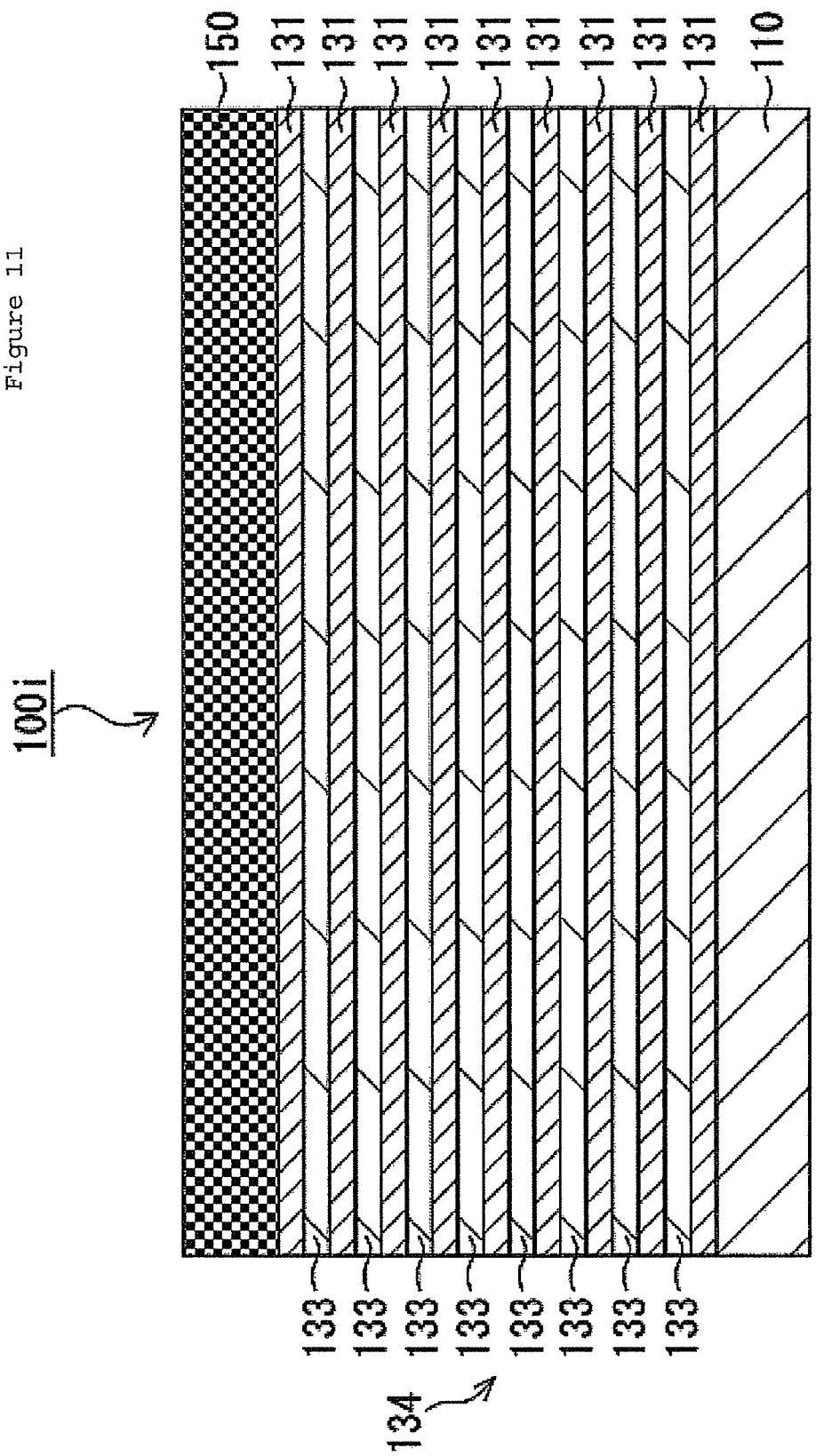
FIG. 11 is a cross-sectional view of a multilayer film according to a modification (A) of the second embodiment of the present invention.

The first adhesion layer 120 and the second adhesion layer 140 may not be provided in a multilayer film 100*i* illustrated in FIG. 11. The repeatedly laminated part 134 is arranged between the outer layer 110 and the sealing layer 150 while being in contact with the outer layer 110 and the sealing layer 150. At least one of the outer layer 110, the first adhesion layer 120, the second adhesion layer 140, and the sealing layer 150 may not be provided.

(B)

Figure 12:
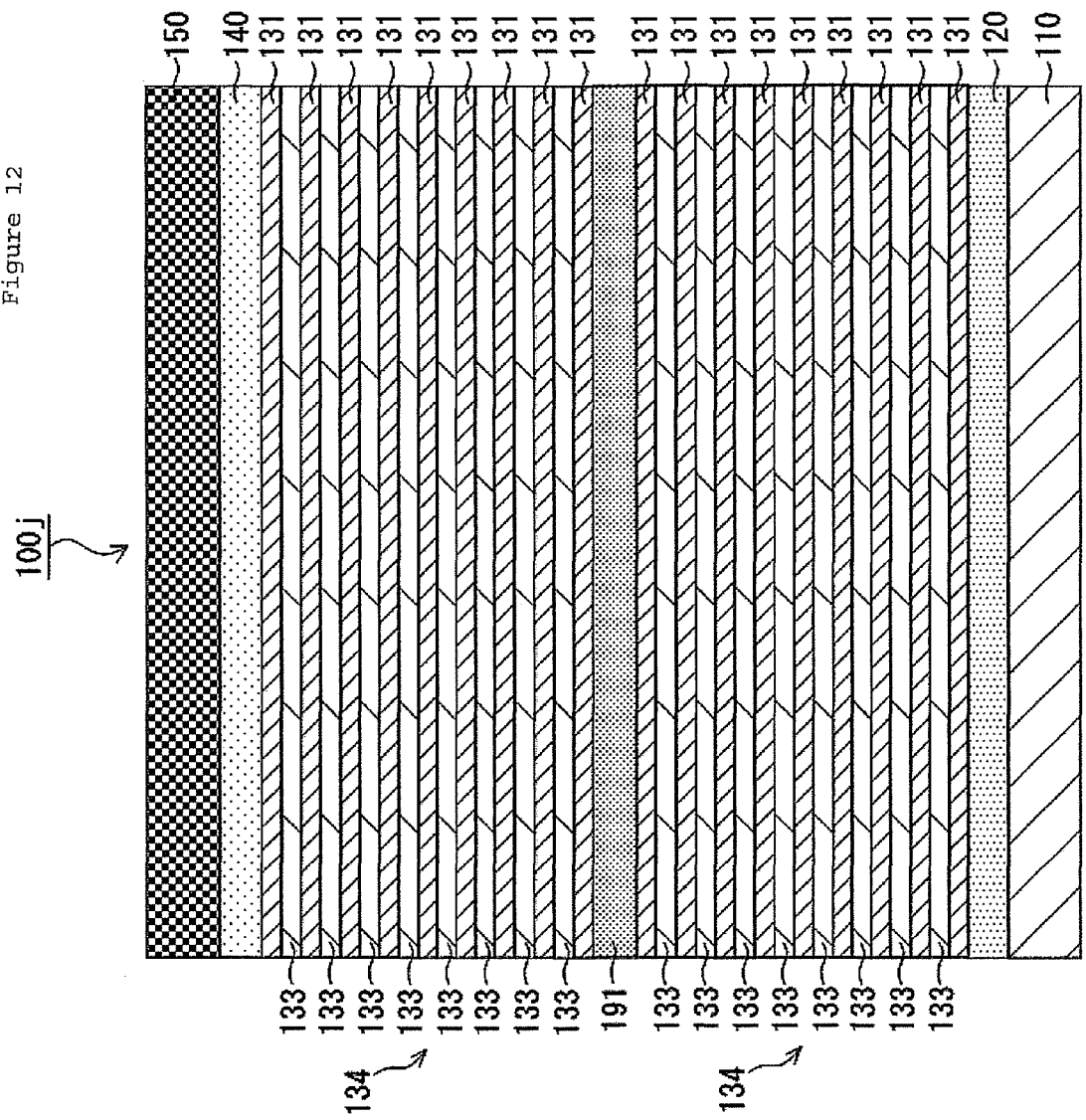
FIG. 12 is a cross-sectional view of a multilayer film according to a modification (B) of the second embodiment of the present invention.

Two repeatedly laminated parts 134 may be provided in a multilayer film 100*j* illustrated in FIG. 12, and an adhesion layer 191 may be provided between the two repeatedly laminated parts 134. Well-known adhesive resins, for example, an adhesive polyolefin-based resin may be used as the material of the adhesion layer 191. The multilayer film 100*j* may also have not less than three repeatedly laminated parts 134. In such a case, the adhesion layer 191 is provided between every two repeatedly laminated parts 134.

(C)

Figure 13:
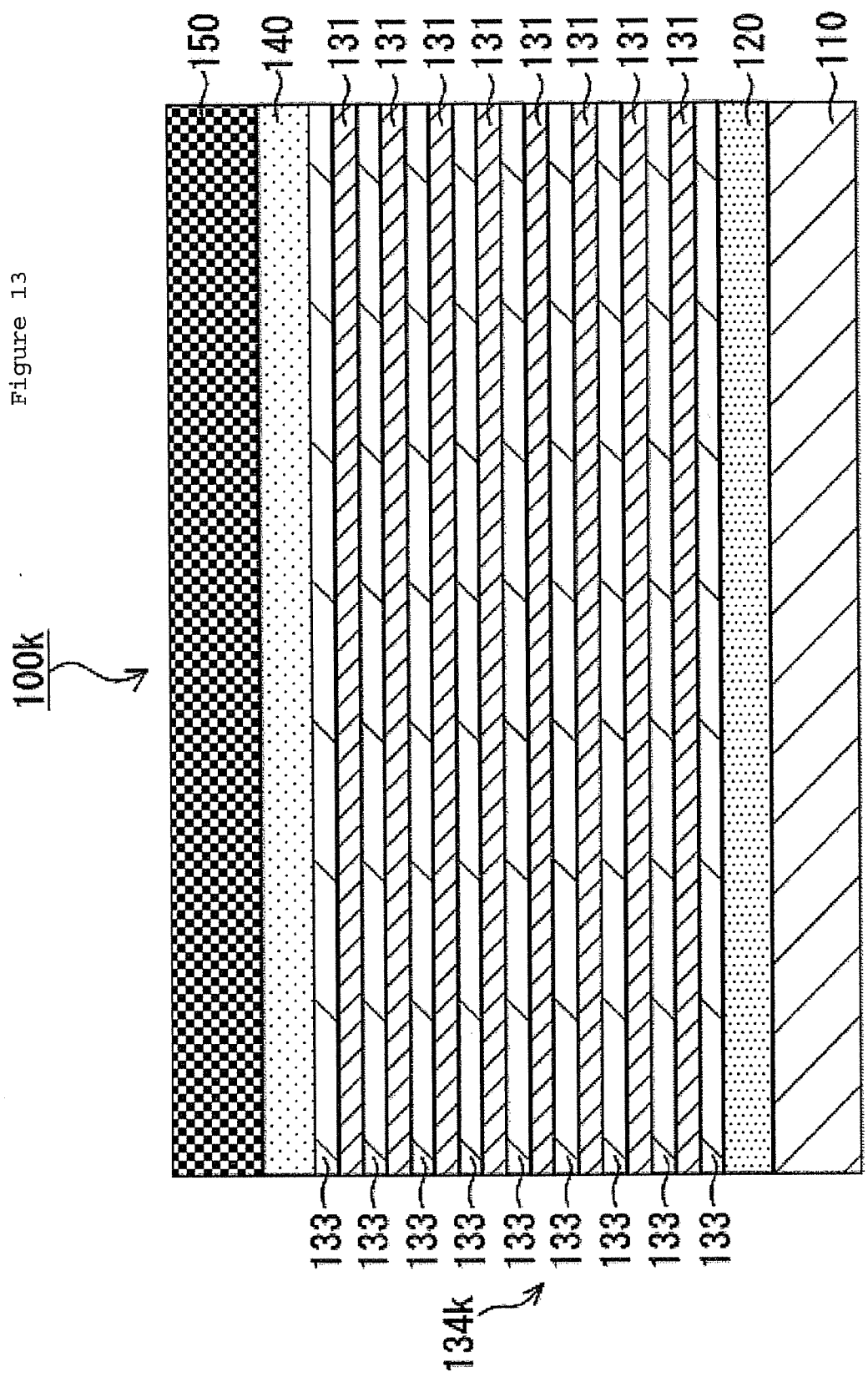
FIG. 13 is a cross-sectional view of a multilayer film according to a modification (C) of the second embodiment of the present invention.

In a multilayer film 100*k* illustrated in FIG. 13, it may be possible that the total number of laminations of the first layer 131 and the second layer 133 of a repeatedly laminated part 134*k* is seventeen layers, where the number of laminations of the first layer 131 is eight layers, and that of the second layer 133 is nine layers. In this case, both the layer of the repeatedly laminated part 134*k*, said layer being closest to the outer layer 110, and the layer of the repeatedly laminated part 134*k*, said layer being closest to the sealing layer 150, are the second layer 133.

(D)

Figure 14:
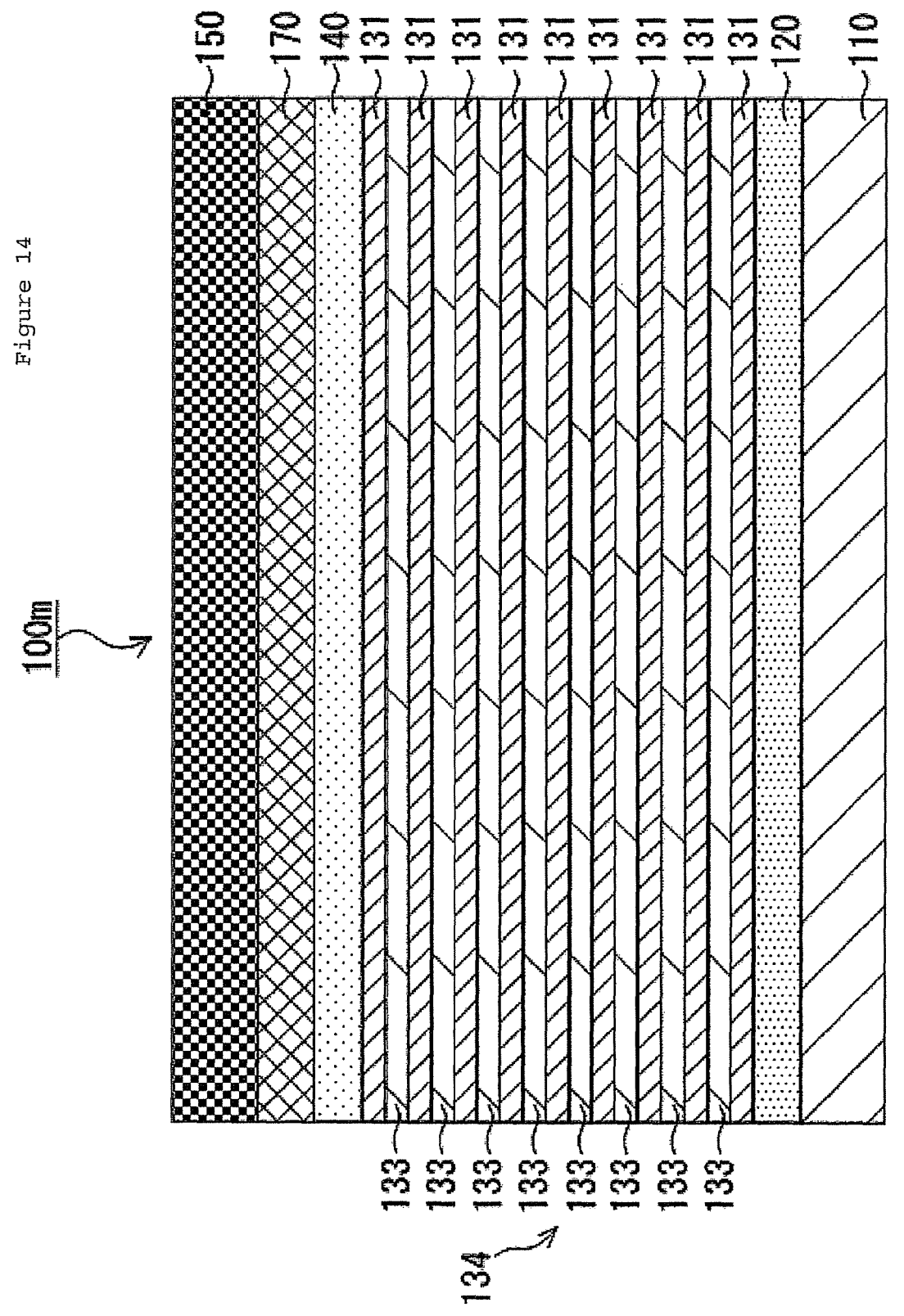

A multilayer film 100*m* illustrated in FIG. 14 may further include the functional layer 170 between the second adhesion layer 140 and the sealing layer 150. The repeatedly laminated part 134 is arranged between the outer layer 110 and the sealing layer 150 via the first adhesion layer 120, the second adhesion layer 140, and the functional layer 170. The functional layer 170 may also be provided at a location other than between the second adhesion layer 140 and the sealing layer 150, for example, the functional layer 170 may be provided between the repeatedly laminated part 134 and the second adhesion layer 140, between the first adhesion layer 120 and the repeatedly laminated part 134, and between the outer layer 110 and the first adhesion layer 120.

(E)

Figure 15:
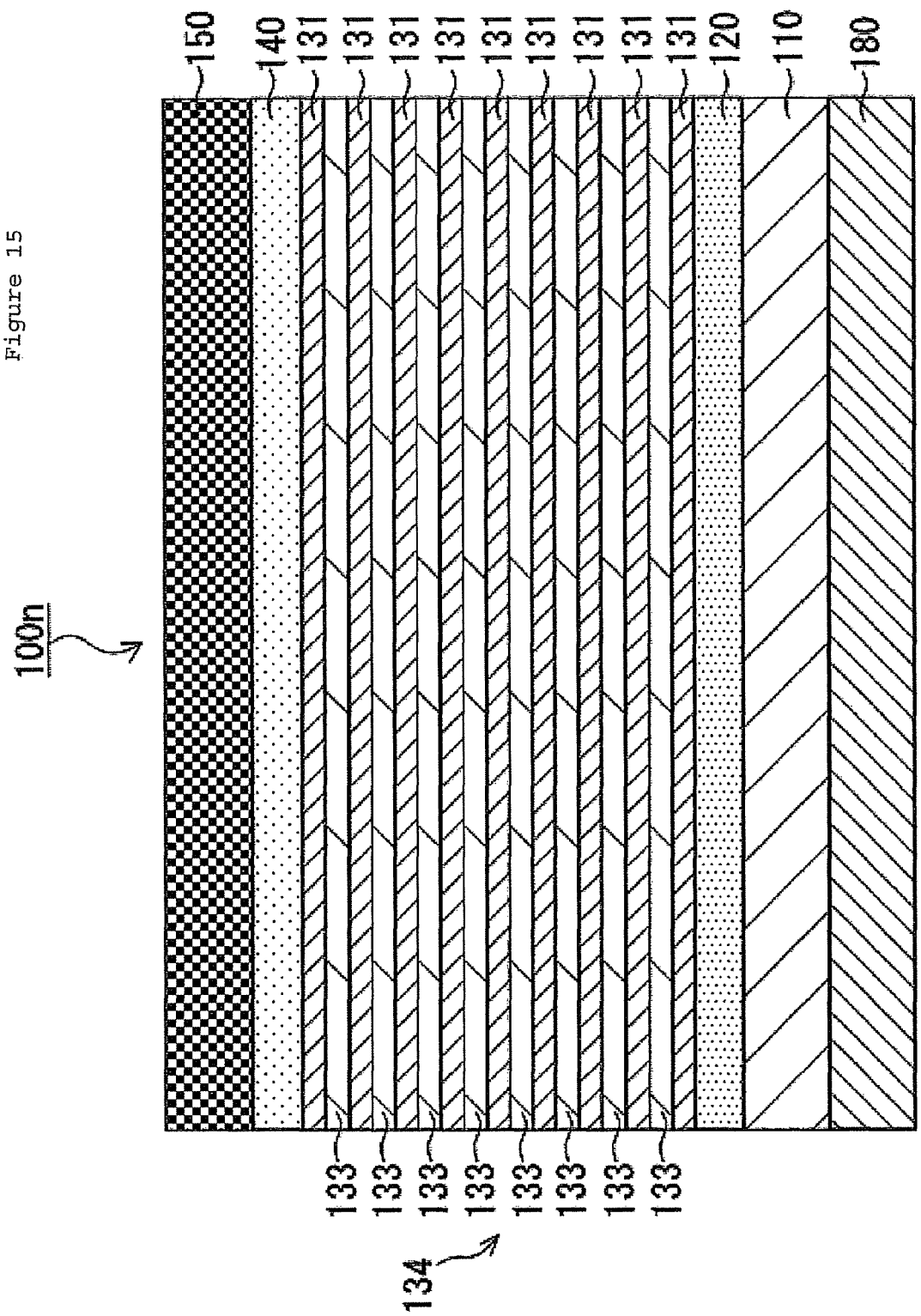
FIG. 15 is a cross-sectional view of a multilayer film according to a modification (E) of the second embodiment of the present invention.

The outermost layer 180 formed by affixing together an OPP film, an OPET film, an ONY film, a CPP film, an APET film, and the like to the outer layer 110 by the dry lamination method may be arranged on a multilayer film 100*n* illustrated in FIG. 15. The thickness of the outermost layer 180 preferably is 20 μm, for example.

(F)

The multilayer films 100*h*, 100*i*, 100*j*, 100*k*, 100*m*, and 100*n* may be used either as the bottom member 300 or the lid member 400, or may be used for both the bottom member 300 and the lid member 400.

EXAMPLE

The examples and comparative examples of the multilayer film or the package body according to the present invention will be described below. The present invention is not limited to these example's in any way.

Example 1

In order to manufacture the multilayer film 100*h* illustrated in FIG. 10, a polypropylene-based resin (product name: FH3315, manufactured by Sumitomo Chemical Co., Ltd.) was prepared as the resin configuring the outer layer 110. An adhesive resin (product name: QB550, manufactured by Mitsui Chemicals, Inc.) was prepared as the resin configuring the first adhesion layer 120. A polyamide resin (product name: 1022B, manufactured by Ube Industries, Ltd.) was prepared as the resin configuring the first layer 131 of the repeatedly laminated part 134. An EVOH resin (product name: J171B, manufactured by Kuraray Co., Ltd.) was prepared as the resin configuring the second layer 133 of the repeatedly laminated part 134. An adhesive resin (product name: NF536, manufactured by Mitsui Chemicals, Inc.) was prepared as the resin configuring the second adhesion layer 140. An LLDPE resin (product name: 1520F, manufactured by Ube-Maruzen Polyethylene Co. Ltd.) was prepared as the resin configuring the sealing layer 150.

The multilayer film 100*h* was manufactured by performing coextrusion of the polypropylene-based resin of the outer layer 110, the adhesive resin of the first adhesion layer 120, the polyamide resin of the first layer 131, the EVOH resin of the second layer 133, the adhesive resin of the second adhesion layer 140, and the LLDPE resin of the sealing layer 150 using a feed block and die.

In the multilayer film 100*h*, the number of laminations of the first layer 131 was nine layers, and that of the second layer 133 was eight layers, such that the total number of laminations of the repeatedly laminated part 134 was seventeen layers. The overall thickness of the multilayer film 100*h* was set to 150 μm. Furthermore, the thickness of the outer layer 110 was set to 10.5 μm, that of the first adhesion layer 120 to 6 μm, the second adhesion layer 140 to 6 μm, and the sealing layer 150 to 52.5 μm. The total thickness of the first layer 131 was set to 60 μm and the total thickness of the second layer 133 was set to 15 μm. The average thickness of each layer of the first layer 131 was 6.67 μm, and the average thickness of each layer of the second layer 133 was 1.88 μm.

<Evaluation of the Tensile-Impact Strength>

In conformance to JIS K7160, the manufactured multilayer film 100h was punched to manufacture a JIS No. 3 specimen (sample) such that the tensile direction during the test was the longitudinal direction (MD direction). The value of the tensile-impact strength of the sample thus obtained was measured in conformance to method A of JIS K7160. The test was performed for each of 10 samples, and the average value of the tensile-impact strength was evaluated.

As a result of performing the measurement of the aforementioned item, the value of the tensile-impact strength of the multilayer film 100h according to the present example was found to be 4388 kJ/m$^2$ (see table 1 below).

<Gelbo Flex Tester Test>

In conformance to ASTMF392, the flex resistance of the multilayer film 100h was measured by a Gelbo flex tester (manufactured by Rigaku Industrial Corporation). The sample of the multilayer film 100h was wound around the two opposing circular plates, having a diameter of 8.8 cm, of the Gelbo flex tester to fix the sample. Flexing process was performed by applying twists to the multilayer film 100h that was now in a cylindrical shape. The flexing process was performed 500 times under a temperature of 23° C. The test was performed for samples, and the number of pinholes generated in each sample was counted. Further, the average number of pinholes generated in one sample was calculated.

As a result of performing the aforementioned test, the average number of generated pinholes was found to be two (see Table 1 below).

Comparative Example 1

Figure 16:
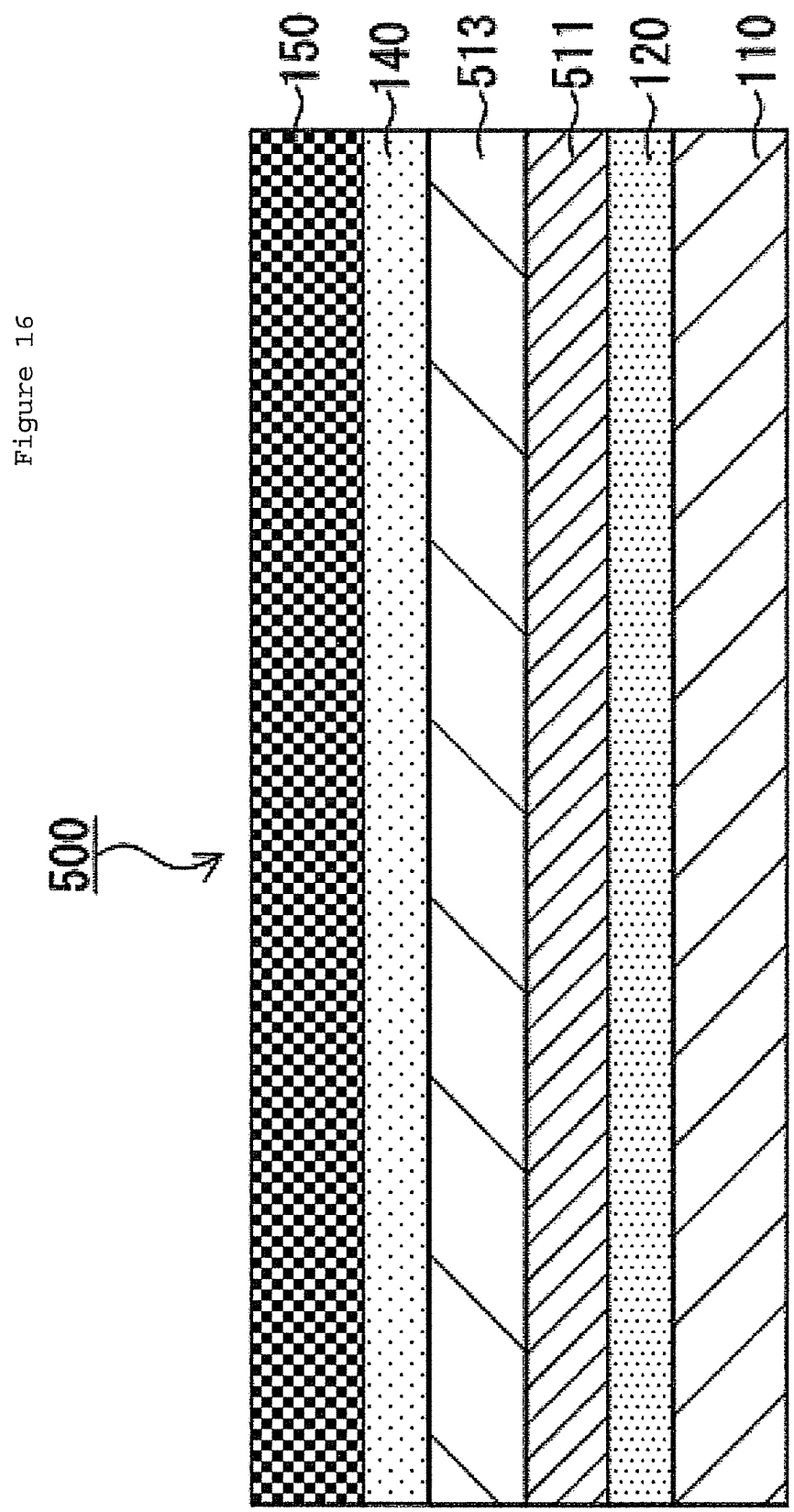
FIG. 16 is a cross-sectional view of a multilayer film used for evaluating a comparative example.

In order to manufacture a multilayer film 500 illustrated in FIG. 16, a polypropylene-based resin (product name: FH3315, manufactured by Sumitomo Chemical Co., Ltd.) was prepared as the resin configuring the outer layer 110. An adhesive resin (product name: QB550, manufactured by Mitsui Chemicals, Inc.) was prepared as the resin configuring the first adhesion layer 120. A polyamide resin (product name: 1022B, manufactured by Ube Industries, Ltd.) was prepared as the resin configuring the polyamide resin layer 511. An EVOH resin (product name: J171B, manufactured by Kuraray Co., Ltd.) was prepared as the resin configuring the EVOH resin layer 513. An adhesive resin LLDPE-g-MAH (product name: NF536, manufactured by Mitsui Chemicals, Inc.) was prepared as the resin configuring the second adhesion layer 140. An LLDPE resin (product name: 1520F, manufactured by Ube-Maruzen Polyethylene Co. Ltd.) was prepared as the resin configuring the sealing layer 150.

The multilayer film 500 was manufactured by performing coextrusion of the polypropylene-based resin of the outer layer 110, the adhesive resin of the first adhesion layer 120, the polyamide resin of the polyamide resin layer 511, the EVOH resin of the EVOH resin layer 513, the adhesive resin of the second adhesion layer 140, and the LLDPE resin of the sealing layer 150 using a feed block and die.

In the multilayer film 500, the overall thickness of the multilayer film 500 was set to 150 μm. Furthermore, the thickness of the outer layer 110 was set to 10.5 μm, that of the first adhesion layer 120 to 6 μm, the second adhesion layer 140 to 6 μm, the sealing layer 150 to 52.5 μm, the polyamide resin layer 511 to 60 μm, and the EVOH resin layer 513 to 15 μm.

As for the multilayer film 500, in the same way as in the example 1, the value of the tensile-impact strength was measured, and the Gelbo flex tester test was performed.

As a result, the value of the tensile-impact strength of the multilayer film 500 according to the present comparative example was found to be 3882 kJ/m$^2$. Furthermore, as a result of the Gelbo flex tester test, the average number of generated pinholes was found to be 11 (see Table 1 below).

Example 2

Except for the description provided below, in the same way as in the example 1, the multilayer film 100 illustrated in FIG. 1 was obtained. An LLDPE-g-MAH (product name: NF536, manufactured by Mitsui Chemicals, Inc.) was prepared as the resin configuring the second layer 132. The thickness of the outer layer 110 was set to 15 μm, that of the first adhesion layer 120 to 7.5 μm, the second adhesion layer 140 to 7.5 μm, the sealing layer 150 to 82.5 μm, the total thickness of the first layer 131 to 30 μm, and the total thickness of the second layer 132 to 7.5 μm. The average thickness of each layer of the first layer 131 was 3.33 μm, and the average thickness of each layer of the second layer 132 was 0.94 μm.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 3830 kJ/m$^2$. Furthermore, as a result of the Gelbo flex tester test, the average number of generated pinholes was found to be zero (see Table 1 below).

Comparative Example 2

Figure 17:
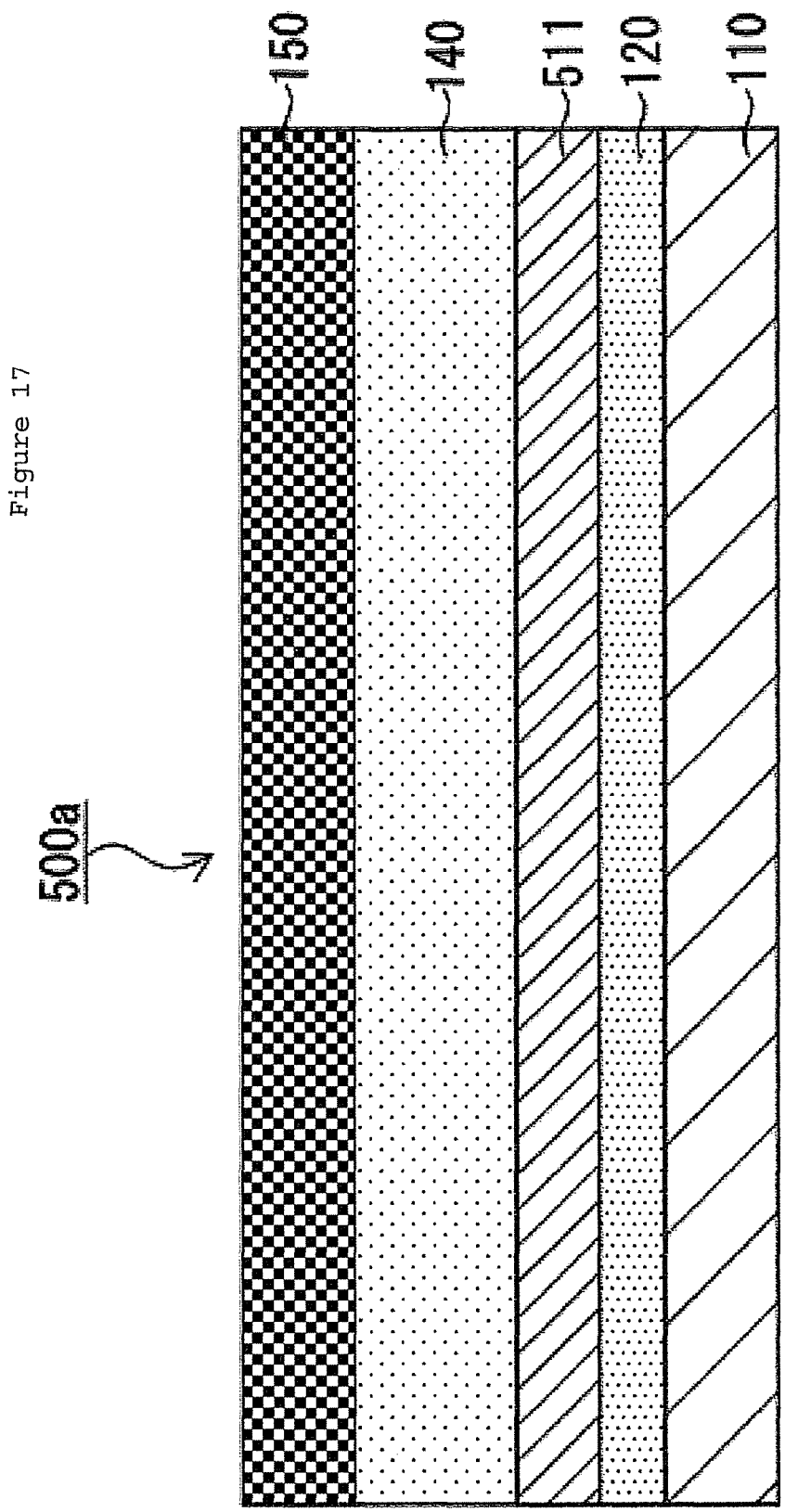
FIG. 17 is a cross-sectional view of a multilayer film used for evaluating a comparative example.

Except for the description provided below, in the same way as in the comparative example 1, a multilayer film 500a illustrated in FIG. 17 was obtained. The EVOH resin layer 513 was omitted. The thickness of the outer layer 110 was set to 15 μm, that of the first adhesion layer 120 to 7.5 μm, the second adhesion layer 140 to 15 μm, the sealing layer 150 to 82.5 μm, and the polyamide resin layer 511 to 30 μm.

As for the multilayer film 500a, in the same way as in the example 1, the value of the tensile-impact strength was measured, and the Gelbo flex tester test was performed.

As a result, the value of the tensile-impact strength of the multilayer film 500a according to the present comparative example was found to be 3599 kJ/m$^2$. Furthermore, as a result of the Gelbo flex tester test, the average number of generated pinholes was found to be three (see Table 1 below).

Example 3

Except for the description provided below, in the same way as in the example 2, the multilayer film 100 was obtained. The overall thickness of the multilayer film 100 was set to 100 μm, the thickness of the outer layer 110 was set to 10 μm, that of the first adhesion layer 120 to 5 μm, the second adhesion layer 140 to 5 μm, the sealing layer 150 to 55 μm, the total thickness of the first layer 131 to 20 μm, and the total thickness of the second layer 132 to 5 μm. The average thickness of each layer of the first layer 131 was 2.22 μm, and the average thickness of each layer of the second layer 132 was 0.63 μm.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 3178 kJ/m$^2$. Furthermore, as a result of the Gelbo flex tester test, the average number of generated pinholes was found to be zero (see Table 1 below).

Comparative Example 3

Except for the description provided below, in the same way as in the comparative example 2, the multilayer film 500a was obtained. The overall thickness of the multilayer film 500a was set to 100 μm, the thickness of the outer layer 110 was set to 10 μm, that of the first adhesion layer 120 to 5 μm, the second adhesion layer 140 to 10 μm, the sealing layer 150 to 55 μm, and the polyamide resin layer 511 to 20 μm.

As for the multilayer film 500a, in the same way as in the example 1, the value of the tensile-impact strength was measured, and the Gelbo flex tester test was performed.

As a result, the value of the tensile-impact strength of the multilayer film 500a according to the present example was found to be 2342 kJ/m². Furthermore, as a result of the Gelbo flex tester test, the average number of generated pinholes was found to be two (see Table 1 below).

Example 4

Except for the description provided below, in the same way as in the example 2, the multilayer film 100 was obtained. The thickness of the outer layer 110 was set to 10.5 μm, that of the first adhesion layer 120 to 6 μm, the second adhesion layer 140 to 6 μm, the sealing layer 150 to 52.5 μm, the total thickness of the first layer 131 to 60 μm, and the total thickness of the second layer 132 to 15 μm. The average thickness of each layer of the first layer 131 was 6.67 μm, and the average thickness of each layer of the second layer 132 was 1.88 μm.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 4171 kJ/m². Furthermore, as a result of the Gelbo flex tester test, the average number of generated pinholes was found to be zero (see Table 1 below).

Comparative Example 4

Except for the description provided below, in the same way as in the comparative example 2, the multilayer film 500a was obtained. The thickness of the outer layer 110 was set to 10.5 μm, that of the first adhesion layer 120 to 6 μm, the second adhesion layer 140 to 21 μm, the sealing layer 150 to 52.5 μm, and the polyamide resin layer 511 to 60 μm.

As for the multilayer film 500a, in the same way as in the example 1, the value of the tensile-impact strength was measured, and the Gelbo flex tester test was performed.

As a result, the value of the tensile-impact strength of the multilayer film 500a according to the present comparative example was found to be 4033 kJ/m². Furthermore, as a result of the Gelbo flex tester test, the average number of generated pinholes was found to be two (see Table 1 below).

Example 5

Except for the description provided below, in the same way as in the example 2, the multilayer film 100 was obtained. The thickness of the sealing layer 150 was set to 60 μm and the total thickness of the second layer 132 was set to 30 μm. The average thickness of each layer of the second layer 132 was 3.75 μm.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 3978 kJ/m². Furthermore, as a result of the Gelbo flex tester test, the average number of generated pinholes was found to be zero (see Table 1 below).

Comparative Example 5

Except for the description provided below, in the same way as in the comparative example 2, the multilayer film 500a was obtained. The thickness of the second adhesion layer 140 was set to 37.5 μm and the thickness of the sealing layer 150 was set to 60 μm.

As for the multilayer film 500a, in the same way as in the example 1, the value of the tensile-impact strength was measured, and the Gelbo flex tester test was performed.

As a result, the value of the tensile-impact strength of the multilayer film 500a according to the present comparative example was found to be 3328 kJ/m². Furthermore, as a result of the Gelbo flex tester test, the average number of generated pinholes was found to be three (see Table 1 below).

Example 6

Except for the description provided below, in the same way as in the example 2, the multilayer film 100 was obtained. An EMMA resin (product name: N0903HC, manufactured by Dupont-Mitsui Polychemicals Co, Ltd.) was prepared as the resin configuring the second layer 132.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 4431 kJ/m². Furthermore, as a result of the Gelbo flex tester test, the average number of generated pinholes was found to be zero (see Table 2 below).

Comparative Example 6

Except for the description provided below, in the same way as in the comparative example 1, the multilayer film 500 was obtained. An EMAA resin layer was provided in place of an EVOH resin layer 513. An EMMA resin (product name: N0903HC, manufactured by Dupont-Mitsui Polychemicals Co, Ltd.) was prepared as the resin configuring the EMMA resin layer. The overall thickness of the multilayer film 500 was set to 150 μm. Furthermore, the thickness of the outer layer 110 was set to 15 μm, that of the first adhesion layer 120 to 7.5 μm, the second adhesion layer 140 to 7.5 μm, the sealing layer 150 to 82.5 μm, the polyamide resin layer 511 to 30 μm, and the EMAA resin layer to 7.5 μm.

As for the multilayer film 500, in the same way as in the example 1, the value of the tensile-impact strength was measured, and the Gelbo flex tester test was performed.

As a result, the value of the tensile-impact strength of the multilayer film 500 according to the present comparative example was found to be 3724 kJ/m². Furthermore, as a result of the Gelbo flex tester test, the average number of generated pinholes was found to be three (see Table 2 below).

Example 7

Except for the description provided below, in the same way as in the example 6, the multilayer film 100 was obtained. The thickness of the sealing layer 150 was set to 45 μm, the total thickness of the first layer 131 to 60 μm, and the total thickness of the second layer 132 was set to 15 μm. The average thickness of each layer of the first layer 131 was 6.67 μm, and the average thickness of each layer of the second layer 132 was 1.88 μm.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 4140 kJ/m². Furthermore, as a result of the Gelbo flex tester test, the average number of generated pinholes was found to be zero (see Table 2 below).

Comparative Example 7

Except for the description provided below, in the same way as in the comparative example 6, and the multilayer film 500 was obtained. The thickness of the sealing layer 150 was set to 45 μm, that of the polyamide resin layer 511 to 60 μm, and the EMAA resin layer to 15 μm.

As for the multilayer film 500, in the same way as in the example 1, the value of the tensile-impact strength was measured, and the Gelbo flex tester test was performed.

As a result, the value of the tensile-impact strength of the multilayer film 500 according to the present comparative example was found to be 3701 kJ/m². Furthermore, as a result of the Gelbo flex tester test, the average number of generated pinholes was found to be three (see Table 2 below).

Example 8

Except for the description provided below, in the same way as in the example 6, the multilayer film 100 was obtained. The overall thickness of the multilayer film 100 was set to 100 μm, the thickness of the outer layer 110 was set to 10 μm, that of the first adhesion layer 120 to 5 μm, the second adhesion layer 140 to 5 μm, the sealing layer 150 to 30 μm, the total thickness of the first layer 131 to 40 μm, and the total thickness of the second layer 132 to 10 μm. The average thickness of each layer of the first layer 131 was 4.44 μm, and the average thickness of each layer of the second layer 132 was 1.25 μm.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 4401 kJ/m². Furthermore, as a result of the Gelbo flex tester test, the average number of generated pinholes was found to be zero (see Table 2 below).

Comparative Example 8

Except for the description provided below, in the same way as in the comparative example 6, and the multilayer film 500 was obtained. The overall thickness of the multilayer film 500 was set to 100 μm, the thickness of the outer layer 110 was set to 10 μm, that of the first adhesion layer 120 to 5 μm, the second adhesion layer 140 to 5 μm, the sealing layer 150 to 30 μm, the polyamide resin layer 511 to 40 μm, and the EMAA resin layer to 10 μm.

As for the multilayer film 500, in the same way as in the example 1, the value of the tensile-impact strength was measured, and the Gelbo flex tester test was performed.

As a result, the value of the tensile-impact strength of the multilayer film 500 according to the present comparative example was found to be 3887 kJ/m². Furthermore, as a result of performing the Gelbo flex tester test, the average number of generated pinholes was found to be two (see Table 2 below).

Example 9

Except for the description provided below, in the same way as in the example 7, the multilayer film 100 was obtained. An ION resin (product number: 1650, manufactured by Dupont-Mitsui Polychemicals Co, Ltd.) was prepared as the resin configuring the second layer 132.

As for the multilayer film 100, in the same way as in the example 1, the value of the tensile-impact strength was measured, and the Gelbo flex tester test was performed.

As a result, the value of the tensile-impact strength of the multilayer film 100 according to the present example was found to be 3855 kJ/m². Furthermore, as a result of the Gelbo flex tester test, the average number of generated pinholes was found to be zero (see Table 2 below).

Comparative Example 9

Except for the description provided below, in the same way as in the comparative example 7, the multilayer film 500 was obtained. An ION resin layer was provided in place of an EMAA resin layer. An ION resin (product number: 1650, manufactured by Dupont-Mitsui Polychemicals Co, Ltd.) was prepared as the resin configuring the ION resin layer.

As for the multilayer film 500, in the same way as in the example 1, the value of the tensile-impact strength was measured, and the Gelbo flex tester test was performed.

As a result, the value of the tensile-impact strength of the multilayer film 500 according to the present comparative example was found to be 3399 kJ/m². Furthermore, as a result of the Gelbo flex tester test, the average number of generated pinholes was found to be one (see Table 2 below).

Example 10

Except for the description provided below, in the same way as in the example 2, the multilayer film 100c illustrated in FIG. 5 was obtained. The oxygen barrier layer 160 was provided between the repeatedly laminated part 130 and the second adhesion layer 140. (Product name: J171B, manufactured by Kuraray Co., Ltd.) was prepared as the resin configuring the oxygen barrier layer 160. The thickness of the outer layer 110 was set to 22.5 μm, that of the first adhesion layer 120 to 7.5 μm, the oxygen barrier layer 160 to 7.5 μm, the second adhesion layer 140 to 7.5 μm, the sealing layer 150 to 30 μm, the total thickness of the first layer 131 to 60 μm, and the total thickness of the second layer 132 to 15 μm. The average thickness of each layer of the first layer 131 was 6.67 μm, and the average thickness of each layer of the second layer 132 was 1.88 μm.

As for the multilayer film 100c, in the same way as in the example 1, the value of the tensile-impact strength was measured, and the Gelbo flex tester test was performed.

As a result, the value of the tensile-impact strength of the multilayer film 100c according to the present example was found to be 4833 kJ/m². Furthermore, as a result of the Gelbo flex tester test, the average number of generated pinholes was found to be zero (see Table 3 below).

Comparative Example 10

Figure 18:
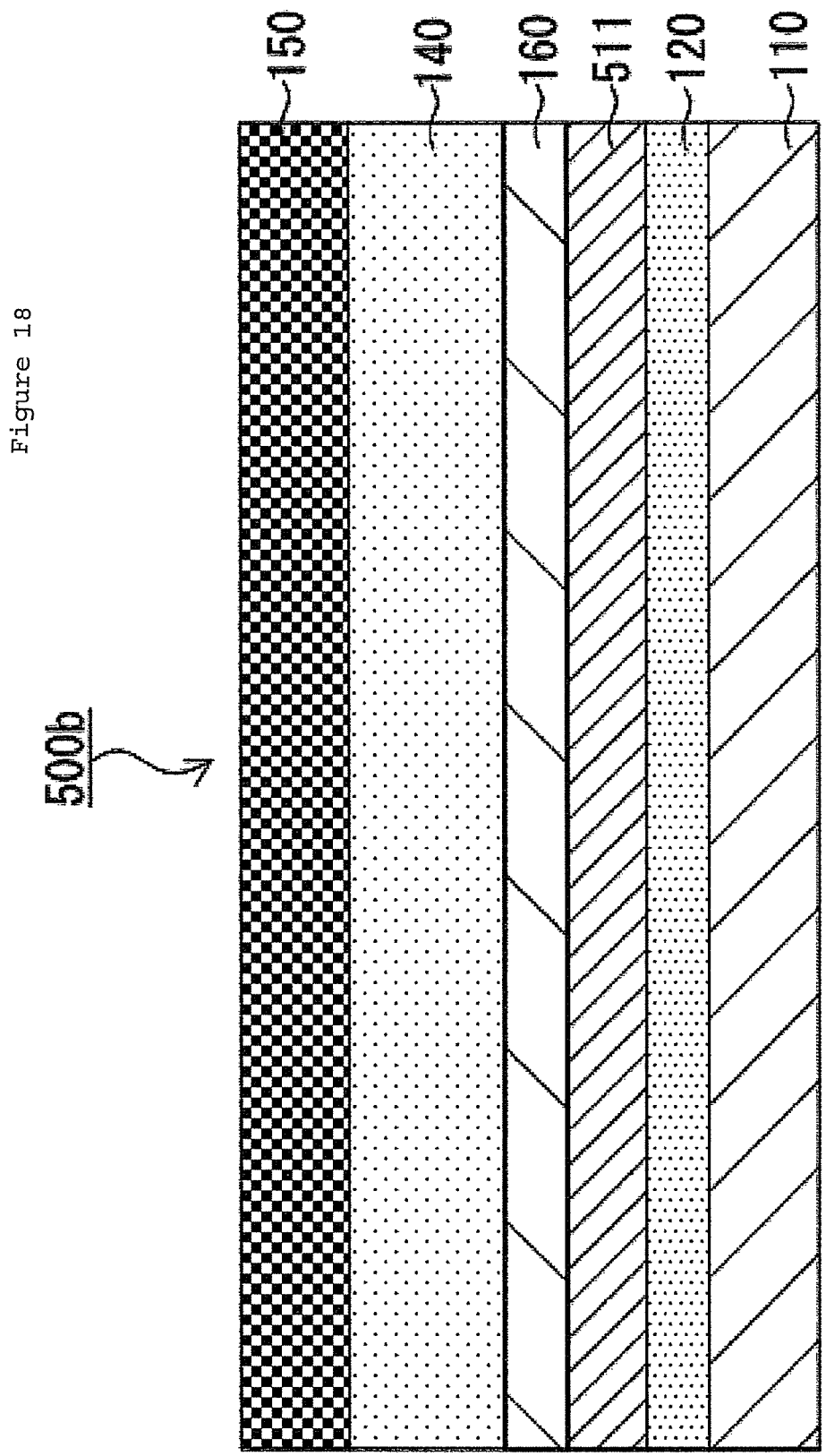
FIG. 18 is a cross-sectional view of a multilayer film used for evaluating a comparative example.

Except for the description provided below, in the same way as in the comparative example 2, a multilayer film 500b illustrated in FIG. 18 was obtained. The oxygen barrier layer 160 was provided between the polyamide resin layer 511 and the second adhesion layer 140. (Product name: J171B, manufactured by Kuraray Co., Ltd.) was prepared as the resin configuring the oxygen barrier layer 160. (Product name: J171B, manufactured by Kuraray Co., Ltd.) was prepared as the resin configuring the oxygen barrier layer. The thickness of the outer layer 110 was set to 22.5 μm, that of the first adhesion layer 120 to 7.5 μm, the oxygen barrier layer 160 to 7.5 μm, the second adhesion layer 140 to 22.5 μm, the sealing layer 150 to 30 μm, and the polyamide resin layer 511 to 60 μm.

As for the multilayer film 500b, in the same way as in the example 1, the value of the tensile-impact strength was measured, and the Gelbo flex tester test was performed.

As a result, the value of the tensile-impact strength of the multilayer film 500b according to the present comparative example was found to be 3810 kJ/m². Furthermore, as a result of the Gelbo flex tester test, the average number of generated pinholes was found to be six (see Table 3 below).

Example 11

Except for the description provided below, in the same way as in the example 2, the multilayer film 100d illustrated in FIG. 6 was obtained. The oxygen barrier layer 160 was provided between the first adhesion layer 120 and the repeatedly laminated part 130. (Product name: J171B, manufactured by Kuraray Co., Ltd.) was prepared as the resin configuring the oxygen barrier layer 160. The thickness of the outer layer 110 was set to 22.5 μm, that of the first adhesion layer 120 to 7.5 μm, the oxygen barrier layer 160 to 7.5 μm, the second adhesion layer 140 to 7.5 μm, the sealing layer 150 to 30 μm, the total thickness of the first layer 131 to 60 μm, and the total thickness of the second layer 132 to 15 μm. The average thickness of each layer of the first layer 131 was 6.67 μm, and the average thickness of each layer of the second layer 132 was 1.88 μm.

As for the multilayer film 100d, in the same way as in the example 1, the value of the tensile-impact strength was measured, and the Gelbo flex tester test was performed.

As a result, the value of the tensile-impact strength of the multilayer film 100d according to the present example was found to be 4800 kJ/m². Furthermore, as a result of the Gelbo flex tester test, the average number of generated pinholes was found to be zero (see Table 4 below).

Comparative Example 11

Figure 19:
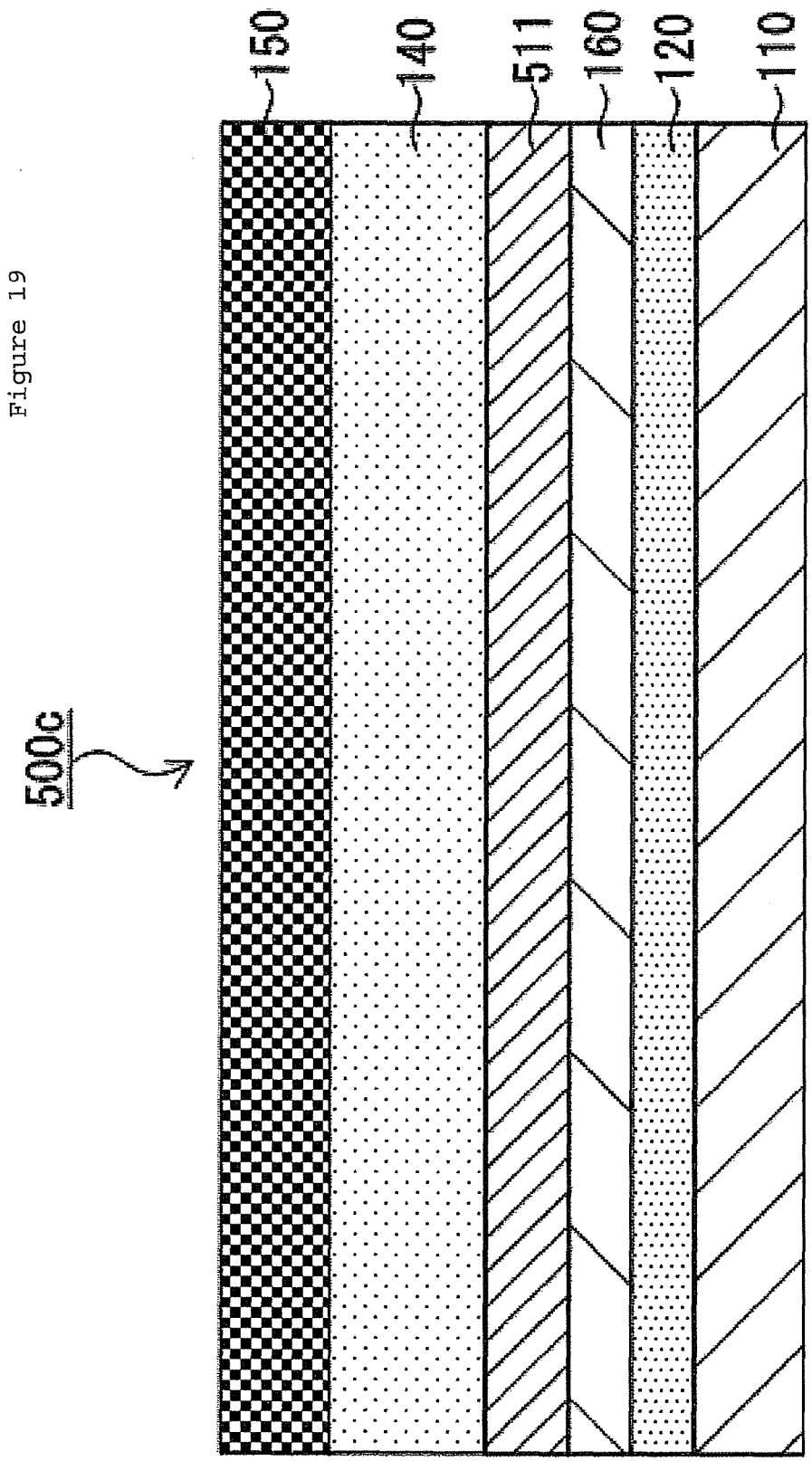
FIG. 19 is a cross-sectional view of a multilayer film used for evaluating a comparative example.

Except for the description provided below, in the same way as in the comparative example 2, and the multilayer film 500c illustrated in FIG. 19 was obtained. The oxygen barrier layer 160 was provided between the first adhesion layer 120 and the polyamide resin layer 511. (Product name: J171B, manufactured by Kuraray Co., Ltd.) was prepared as the resin configuring the oxygen barrier layer 160. The thickness of the outer layer 110 was set to 22.5 μm, that of the first adhesion layer 120 to 7.5 μm, the oxygen barrier layer 160 to 7.5 μm, the second adhesion layer 140 to 22.5 μm, the sealing layer 150 to 30 μm, and the polyamide resin layer 511 to 60 μm.

As for the multilayer film 500c, in the same way as in the example 1, the value of the tensile-impact strength was measured, and the Gelbo flex tester test was performed.

As a result, the value of the tensile-impact strength of the multilayer film 500c according to the present comparative example was found to be 3790 kJ/m². Furthermore, as a result of the Gelbo flex tester test, the average number of generated pinholes was found to be seven (see Table 4 below).

Example 12

Except for the description provided below, in the same way as in the example 2, and the multilayer film 100e illustrated in FIG. 7 was obtained. A plurality of repeatedly laminated parts 130 and 130 was provided in the multilayer film 100e. The oxygen barrier layer 160 was provided between the repeatedly laminated parts 130 and 130. As for each repeatedly laminated part 130, the number of laminations of the first layer 131 was five layers, the total thickness of the first layer 131 was 30 μm, the number of laminations of the second layer 132 was four layers, and the total thickness of the second layer 132 was 7.5 μm. The average thickness of each layer of the first layer 131 was 6.0 μm, and the average thickness of each layer of the second layer 133 was 1.88 μm.

(Product name: J171B, manufactured by Kuraray Co., Ltd.) was prepared as the resin configuring the oxygen barrier layer 160. The thickness of the outer layer 110 was set to 22.5 μm, that of the first adhesion layer 120 to 7.5 μm, the oxygen barrier layer 160 to 7.5 μm, the second adhesion layer 140 to 7.5 μm, and the sealing layer 150 to 30 μm.

As for the multilayer film 100e, in the same way as in the example 1, the value of the tensile-impact strength was measured, and the Gelbo flex tester test was performed.

As a result, the value of the tensile-impact strength of the multilayer film 100e according to the present example was found to be 4850 kJ/m². Furthermore, as a result of the Gelbo flex tester test, the average number of generated pinholes was found to be zero (see Table 5 below).

TABLE 1

|  |  | Grade |  | Ex. 1 | C. Ex. 1 |
|---|---|---|---|---|---|
|  | Outer layer | FH3315 | Thickness (μm) | 10.5 | 10.5 |
|  | First adhesive layer | QB550 | Thickness (μm) | 6 | 6 |
| Repeatedly laminated part | Polyamide resin | 1022B | Thickness of each layer (μm) | 6.67 | 60 |
|  |  |  | The no. of laminations | 9 | 1 |
|  |  |  | Total thickness (μm) | 60 | 60 |
|  | EVOH resin | J171B | Thickness of each layer (μm) | 1.88 | 15 |
|  |  |  | The no. of laminations | 8 | 1 |
|  |  |  | Total thickness (μm) | 15 | 15 |

TABLE 1-continued

| | | | Ex. 2 | C. Ex. 2 |
|---|---|---|---|---|
| Second adhesive layer | NF536 | Thickness (μm) | 6 | 6 |
| Sealing layer | 1520F | Thickness (μm) | 52.5 | 52.5 |
| | | Overall thickness (μm) | 150 | 150 |
| Tensile-impact strength (kJ/m$^2$) | | | 4388 | 3882 |
| Gelbo flex tester test (piece) | | | 2 | 11 |

| | | Grade | | Ex. 2 | C. Ex. 2 | Ex. 3 | C. Ex. 3 |
|---|---|---|---|---|---|---|---|
| Outer layer | | FH3315 | Thickness (μm) | 15 | 15 | 10 | 10 |
| First adhesive layer | | QB550 | Thickness (μm) | 7.5 | 7.5 | 5 | 5 |
| Repeatedly laminated part | Polyamide resin | 1022B | Thickness of each layer (μm) | 3.33 | 30 | 2.22 | 20 |
| | | | The no. of laminations | 9 | 1 | 9 | 1 |
| | | | Total thickness (μm) | 30 | 30 | 20 | 20 |
| | LLDPE-g-MAE | NF536 | Thickness of each layer (μm) | 0.94 | | 0.63 | |
| | | | The no. of laminations | 8 | | 8 | |
| | | | Total thickness (μm) | 7.5 | | 5 | |
| Second adhesive layer | | NF536 | Thickness (μm) | 7.5 | 15 | 5 | 10 |
| Sealing layer | | 1520F | Thickness (μm) | 52.5 | 52.5 | 55 | 55 |
| | | | Overall thickness (μm) | 150 | 150 | 100 | 100 |
| Tensile-impact strength (kJ/m$^2$) | | | | 3830 | 3599 | 3178 | 2342 |
| Gelbo flex tester test (piece) | | | | 0 | 3 | 0 | 2 |

| | | Grade | | Ex. 4 | C. Ex. 4 | Ex. 5 | C. Ex. 5 |
|---|---|---|---|---|---|---|---|
| Outer layer | | FH3315 | Thickness (μm) | 10.5 | 10.5 | 15 | 15 |
| First adhesive layer | | QB550 | Thickness (μm) | 6 | 6 | 7.5 | 7.5 |
| Repeatedly laminated part | Polyamide resin | 1022B | Thickness of each layer (μm) | 6.67 | 60 | 3.33 | 30 |
| | | | The no. of laminations | 9 | 1 | 9 | 1 |
| | | | Total thickness (μm) | 60 | 60 | 30 | 30 |
| | LLDPE-g-MAE | NF536 | Thickness of each layer (μm) | 1.88 | | 3.75 | |
| | | | The no. of laminations | 8 | | 8 | |
| | | | Total thickness (μm) | 15 | | 30 | |
| Second adhesive layer | | NF536 | Thickness (μm) | 6 | 21 | 7.5 | 37.5 |
| Sealing layer | | 1520F | Thickness (μm) | 52.5 | 52.5 | 60 | 60 |
| | | | Overall thickness (μm) | 150 | 150 | 150 | 150 |
| Tensile-impact strength (kJ/m$^2$) | | | | 4171 | 4033 | 3978 | 3328 |
| Gelbo flex tester test (piece) | | | | 0 | 2 | 0 | 3 |

TABLE 2

| | | Grade | | Ex. 6 | C. Ex. 6 | Ex. 7 | C. Ex. 7 | Ex. 8 | C. Ex. 8 |
|---|---|---|---|---|---|---|---|---|---|
| Outer layer | | FH3315 | Thickness (μm) | 15 | 15 | 15 | 15 | 10 | 10 |
| First adhesive layer | | QB550 | Thickness (μm) | 7.5 | 7.5 | 7.5 | 7.5 | 5 | 5 |
| Repeatedly laminated part | Polyamide resin | 1022B | Thickness of each layer (μm) | 3.33 | 30 | 6.67 | 60 | 4.44 | 40 |
| | | | The no. of laminations | 9 | 1 | 9 | 1 | 9 | 1 |
| | | | Total thickness (μm) | 30 | 30 | 60 | 60 | 40 | 40 |
| | EMAA resin | N0903HC | Thickness of each layer (μm) | 0.94 | 7.5 | 1.88 | 15 | 1.25 | 10 |
| | | | The no. of laminations | 8 | 1 | 8 | 1 | 8 | 1 |
| | | | Total thickness (μm) | 7.5 | 7.5 | 15 | 15 | 10 | 10 |
| Second adhesive layer | | NF536 | Thickness (μm) | 7.5 | 7.5 | 7.5 | 7.5 | 5 | 5 |
| Sealing layer | | 1520F | Thickness (μm) | 82.5 | 82.5 | 45 | 45 | 30 | 30 |
| | | | Overall thickness (μm) | 150 | 150 | 150 | 150 | 100 | 100 |

TABLE 2-continued

|  |  |  | 4431 | 3724 | 4140 | 3701 | 4401 | 3887 |
|---|---|---|---|---|---|---|---|---|
| Tensile-impact strength (kJ/m$^2$) | | | | | | | | |
| Gelbo flex tester test (piece) | | | 0 | 3 | 0 | 3 | 0 | 2 |

|  |  |  | Grade |  | Ex. 9 | C. Ex. 9 |
|---|---|---|---|---|---|---|
| | Outer layer | FH3315 | Thickness (μm) | | 15 | 15 |
| | First adhesive layer | QB550 | Thickness (μm) | | 7.5 | 7.5 |
| Repeatedly laminated part | Polyamide resin | 1022B | Thickness of each layer (μm) | | 6.67 | 60 |
| | | | The no. of laminations | | 9 | 1 |
| | | | Total thickness (μm) | | 60 | 60 |
| | | | Thickness of each layer (μm) | | 1.88 | 15 |
| | ION resin | 1650 | The no. of laminations | | 8 | 1 |
| | | | Total thickness (μm) | | 15 | 15 |
| | Second adhesive layer | NF536 | Thickness (μm) | | 7.5 | 7.5 |
| | Sealing layer | 1520F | Thickness (μm) | | 45 | 45 |
| | | | Overall thickness (μm) | | 150 | 150 |
| | | Tensile-impact strength (kJ/m$^2$) | | | 3855 | 3399 |
| | | Gelbo flex tester test | | | 0 | 1 |

TABLE 3

|  |  | Grade |  | Ex. 10 | C. Ex. 1 |
|---|---|---|---|---|---|
| Outer layer | | FH3315 | Thickness (μm) | 22.5 | 22.5 |
| First adhesive layer | | QB550 | Thickness (μm) | 7.5 | 7.5 |
| Repeatedly laminated part | Polyamide resin | 1022B | Thickness of each layer (μm) | 6.67 | 60 |
| | | | The no. of laminations | 9 | 1 |
| | | | Total thickness (μm) | 60 | 60 |
| | LLDPE-g-MAH | NF536 | Thickness of each layer (μm) | 1.88 | |
| | | | The no. of laminations | 8 | |
| | | | Total thickness (μm) | 15 | |
| Oxygen barrier layer | | J171B | Thickness (μm) | 7.5 | 7.5 |
| Second adhesive layer | | NF536 | Thickness (μm) | 7.5 | 22.5 |
| Sealing layer | | 1520F | Thickness (μm) | 30 | 30 |
| | | | Overall thickness (μm) | 150 | 150 |
| Tensile-impact strength (kJ/m$^2$) | | | | 4833 | 3810 |
| Gelbo flex tester test (piece) | | | | 0 | 6 |

TABLE 4

|  |  | Grade |  | Ex. 11 | C. Ex. 10 |
|---|---|---|---|---|---|
| Outer layer | | FH3315 | Thickness (μm) | 22.5 | 22.5 |
| First adhesive layer | | QB550 | Thickness (μm) | 7.5 | 7.5 |
| Oxygen barrier layer | | J171B | Thickness (μm) | 7.5 | 7.5 |
| Repeatedly laminated part | Polyamide resin | 1022B | Thickness of each layer (μm) | 6.67 | 60 |
| | | | The no. of laminations | 9 | 1 |
| | | | Total thickness (μm) | 60 | 60 |
| | LLDPE-g-MAH | NF536 | Thickness of each layer (μm) | 1.88 | |
| | | | The no. of laminations | 8 | |
| | | | Total thickness (μm) | 15 | |
| Second adhesive layer | | NF536 | Thickness (μm) | 7.5 | 22.5 |
| Sealing layer | | 1520F | Thickness (μm) | 30 | 30 |
| | | | Overall thickness (μm) | 150 | 150 |
| Tensile-impact strength (kJ/m$^2$) | | | | 4800 | 3790 |
| Gelbo flex tester test (piece) | | | | 0 | 7 |

TABLE 5

| | Grade | | Ex. 12 |
|---|---|---|---|
| Outer layer | FH3315 | Thickness (μm) | 22.5 |
| First adhesive layer | QB550 | Thickness (μm) | 7.5 |
| Repeatedly laminated part | Polyamide resin 1022B | Thickness of each layer (μm) | 6 |
| | | The no. of laminations | 5 |
| | | Total thickness (μm) | 30 |
| | LLDPE-g-MAH NF536 | Thickness of each layer (μm) | 1.88 |
| | | The no. of laminations | 4 |
| | | Total thickness (μm) | 7.5 |
| Oxygen barrier layer | J171B | Thickness (μm) | 7.5 |
| Repeatedly laminated part | Polyamide resin 1022B | Thickness of each layer (μm) | 6 |
| | | The no. of laminations | 5 |
| | | Total thickness (μm) | 30 |
| | LLDPE-g-MAH NF536 | Thickness of each layer (μm) | 1.88 |
| | | The no. of laminations | 4 |
| | | Total thickness (μm) | 7.5 |
| Second adhesive layer | NF536 | Thickness (μm) | 7.5 |
| Sealing layer | 1520F | Thickness (μm) | 30 |
| | | Overall thickness (μm) | 150 |
| Tensile-impact strength (kJ/m$^2$) | | | 4850 |
| Gelb flex tester test (piece) | | | 0 |

As compared to the multilayer film according to the comparative examples 1 through 11, the multilayer film according to the examples 1 through 12 had a higher value of the tensile-impact strength. Therefore, when comparison was performed with the same thickness, the multilayer film according to the examples 1 through 12 that included a repeatedly laminated part had a better tensile-impact resistance than the multilayer film according to the comparative examples 1 through 11 that did not include a repeatedly laminated part.

Furthermore, in the multilayer film according to the examples 1 through 12, the number of pinholes generated by the Gelbo flex test was less than in the multilayer film according to the comparative examples 1 through 11. Therefore, the multilayer film according to the examples 1 through 12 that included a repeatedly laminated part had a better flex resistance than the multilayer film according to the comparative examples 1 through 11 that did not include a repeatedly laminated part.

Example 13

Manufacturing of the Package Body

Using a deep drawing type fully automatic vacuum packaging machine (product number: FV6300, manufactured by Omori Machinery Co., Ltd.), the pocket 310 having the long side of 100 mm, the short side of 80 mm, and the drawing depth of 15 mm was formed at a forming temperature of 95° C. in the multilayer film 100h obtained in the same way as in the example 1, to obtain the bottom member 300.

Figure 20:
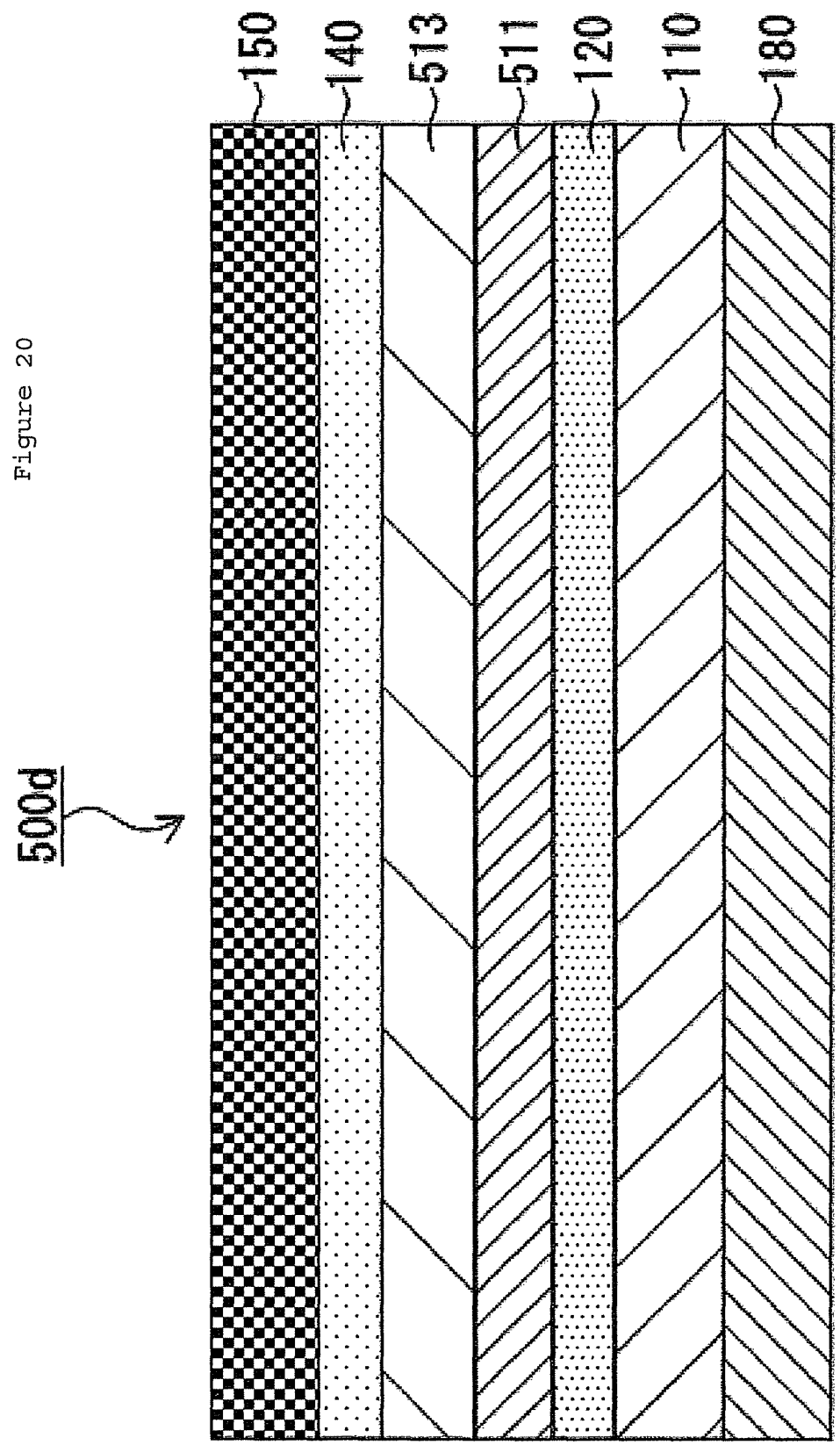
FIG. 20 is a cross-sectional view of a multilayer film used for evaluating an example and a comparative example.

Next, in order to manufacture the multilayer film 500d illustrated in FIG. 20, an OPP film (product name: PA20, manufactured by SunTox Co., Ltd.) configuring the outermost layer 180 was prepared. A polypropylene-based resin (product name: FH3315, manufactured by Sumitomo Chemical Co., Ltd.) was prepared as the resin configuring the outer layer 110. An adhesive resin (product name: QB550, manufactured by Mitsui Chemicals, Inc.) was prepared as the resin configuring the first adhesion layer 120. An EVOH resin (product name: J171B, manufactured by Kuraray Co., Ltd.) was prepared as the resin configuring the EVOH resin layer 513. A polyamide resin (product name: 1022B, manufactured by Ube Industries, Ltd.) was prepared as the resin configuring the polyamide resin layer 511. An adhesive resin (product name: NF536, manufactured by Mitsui Chemicals, Inc.) was prepared as the resin configuring the second adhesion layer 140. An LLDPE resin (product name: 1520F, manufactured by Ube-Maruzen Polyethylene Co. Ltd.) was prepared as the resin configuring the sealing layer 150.

A film was manufactured by performing coextrusion of the polypropylene-based resin of the outer layer 110, the adhesive resin of the first adhesion layer 120, the polyamide resin of the polyamide resin layer 511, the EVOH resin of the EVOH resin layer 513, the adhesive resin of the second adhesion layer 140, and the LLDPE resin of the sealing layer 150 using a feed block and die. The OPP film of the outermost layer 180 was affixed at the outer layer 110 side of the film by the dry lamination method to manufacture the multilayer film 500d.

The overall thickness of the multilayer film 500d was set to 80 μm, the thickness of the outermost layer 180 to 20 μm, that of the outer layer 110 to 12 μm, the first adhesion layer 120 to 4 μm, the second adhesion layer 140 to 4 μm, and the sealing layer 150 to 10 μm. The thickness of the polyamide resin layer 511 was set to 22 μm and the thickness of the EVOH resin layer 513 was set to 8 μm. The multilayer film 500d was used as the lid member 400.

60 g of chicken was filled in the pocket 310 of the bottom member 300, and the lid member 400 and the bottom member 300 were sealed at a sealing temperature of 140° C. to obtain a sample of the package body 200 in which chicken had been filled.

<Evaluation of the Drop Test>

The sample of the package body 200 in which chicken had been filled was passed through heat sterilization by placing in hot water having a temperature of 97° C. for 30 minutes, after which it was frozen and then packed inside a cardboard box. At a temperature of 23° C., the cardboard box was dropped from a height of 1 m. During this operation, each surface of the cardboard box was made to face the ground, and this was performed five times each, i.e., a total of 30 times. After the cardboard box had been dropped, the package body 200 was taken out from the cardboard box, and based on visual observation of the bottom member 300 and the observation of whether or not air bubbles were emerging from the bottom member 300 in the water, it was confirmed as to whether or not pinholes were generated in the bottom member 300. This test was performed for 30 samples, the number of samples in which pinholes were generated were counted, and the rate of generation of pinholes was calculated.

As a result of performing the aforementioned test, it was found that pinholes were generated in zero samples and the rate of generation of pinholes was 0% in the samples of the package body 200 according to the present example, in which chicken had been filled (see Table 6 below).

<Measurement of the Curling Rate and Evaluation of the Curling Property>

In the pocket 310 of the bottom member 300, a cylindrical rubber plate having a diameter of 96 mm and a thickness of 5 mm was filled, the lid member 400 and the bottom member 300 were sealed at a sealing temperature of 140° C., and a sample of the package body 200 for the curling test was obtained. As shown in FIG. 2, the length L1 of the lid member 400 side of the package body 200 was measured. The length L1 of the lid member 400 side of the package body 200 was measured in both the direction of flow (hereinafter, called "MD direction") and the widthwise direction (hereinafter, called "TD direction") of the multilayer film 100*h* of the bottom member 300 respectively.

Figure 21:
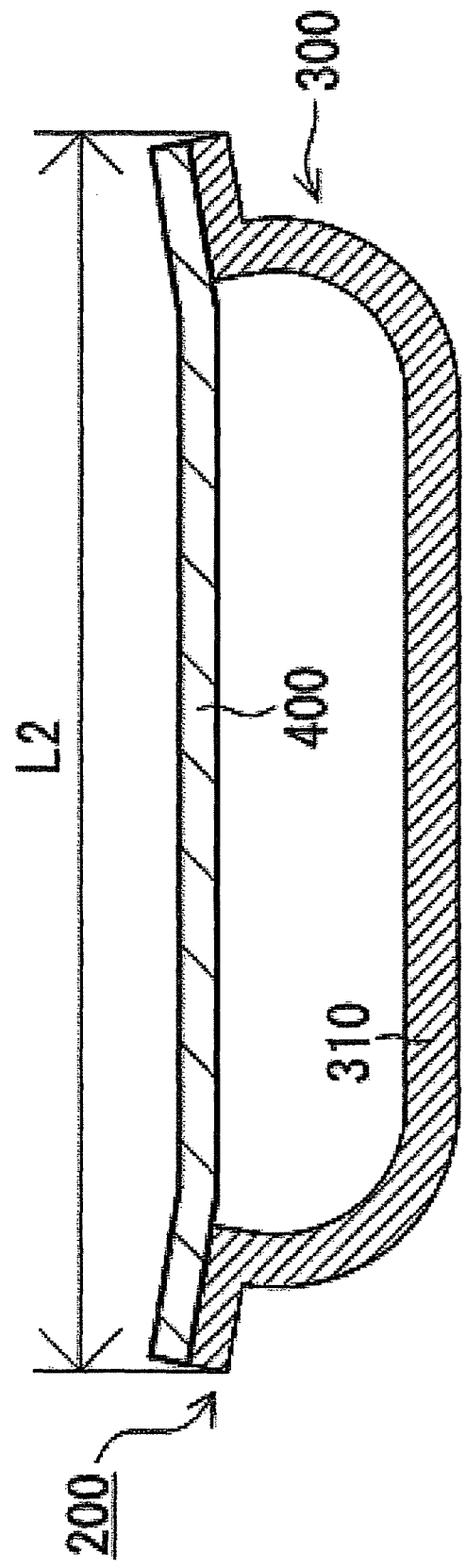
FIG. 21 is a diagram illustrating a state in which a length of a package body is measured after immersing the package body in hot water.

Following this, the package body 200 was immersed in hot water having a temperature of 97° C. for 30 minutes, and then the package body 200 was taken out from the hot water. Then, as shown in FIG. 21, the length L2 of the lid member 400 side of the package body 200 taken out from the hot water was measured. The length L2 of the lid member 400 side of the package body 200 was measured in both the MD direction and the TD direction respectively.

Using the measured value of the length L1 of the package body 200 and the measured value of the length L2 of the package body 200, the curling rate of the package body 200 was calculated from the below-mentioned expression. The curling rate of the package body 200 was calculated for both the MD direction and the TD direction.

Curling rate(%)=(Length *L*2 of package body 200)/
(Length *L*1 of package body 200)×100

As regards the curling property of the package body 200, the package bodies 200' having a curling rate of not less than 98% were evaluated by "O" and the package bodies 200 having a curling rate of less than 98% were evaluated by "x". The evaluation of the curling property was performed in both the MD direction and the TD direction.

As a result of the measurement as described above, the curling rate of the package body 200 in the MD direction according to the present example was found to be 99%, and the curling rate in the TD direction was found to be 100%. The evaluation of the curling property of the package body 200 in the MD direction was "O" and the evaluation of the curling property in the TD direction was "x" (see Table 6 below).

Comparative Example 12

Except that the multilayer film 500 obtained in the same way as in the comparative example 1 was used as the bottom member 300, samples of the package body were obtained in the same way as in the example 13.

In the same way as in the example 13, the evaluation of the drop test, measurement of the curling rate, and evaluation of the curling property were performed for the samples of the package body.

As a result, it was found that pinholes were generated in two samples and the rate of generation of pinholes was 7% in the samples of the package body according to the present comparative example, in which chicken had been filled. The curling rate of the package body in the MD direction was found to be 85%, and the curling rate in the TD direction was found to be 90%. Additionally, the evaluation of the curling property of the package body in the MD direction was "x" and the evaluation of the curling property in the TD direction was also "x" (see Table 6 below).

Example 14

Except for the description provided below, samples of the package body 200 were obtained in the same way as in the example 13. The multilayer film 100 obtained in the same way as in the example 4 was used as the bottom member 300. In addition to the samples of the package body 200 in which chicken had been filled and the samples of the package body 200 in which a rubber plate had been filled, a pocket 310 having the long side of 150 mm, the short side of 100 mm, and the drawing depth of 45 mm was formed in the multilayer film 100, and samples of the package body 200 in which 320 g of roasted pork had been filled in the pocket 310 of the bottom member 300 were manufactured.

In the same way as in the example 13, the evaluation of the drop test, measurement of the curling rate, and evaluation of the curling property were performed for the samples of the package body 200. The drop test was performed for 30 samples of the package boy 200 in which chicken had been filled, and for 10 samples of the package body 200 in which roasted pork had been filled.

As a result, it was found that pinholes were generated in zero samples and the rate of generation of pinholes was 0% in the samples of the package body 200 according to the present example, in which chicken had been filled. Furthermore, it was found that pinholes were generated in zero samples and the rate of generation of pinholes was 0% in the samples in which roasted pork had been filled. The curling rate of the package body 200 in the MD direction was found to be 99%, and the curling rate in the TD direction was found to be 100%. The evaluation of the curling property of the package body 200 in the MD direction was "O" and the evaluation of the curling property in the TD direction was also "O" (see Table 6 below).

Comparative Example 13

Except that the multilayer film 500*a* obtained in the same way as in the comparative example 4 was used as the bottom member 300, samples of the package body in which chicken, roasted pork, or a rubber plate was filled, respectively, were obtained in the same way as in the example 14.

In the same way as in the example 13, the evaluation of the drop test, measurement of the curling rate, and evaluation of the curling property were performed for the samples of the package body.

As a result, it was found that pinholes were generated in zero samples and the rate of generation of pinholes was 0% in the samples of the package body according to the present comparative example, in which chicken had been filled. Furthermore, it was found that pinholes were generated in three samples and the rate of generation of pinholes was 30% in the samples in which roasted pork had been filled. The curling rate of the package body in the MD direction was found to be 83%, and the curling rate thereof in the TD direction was found to be 90%. Additionally, the evaluation of the curling property of the package body in the MD direction was "x" and the evaluation of the curling property in the TD direction was also "x" (see Table 6 below).

Example 15

Except that the multilayer film 100 obtained in the same way as in the example 7 was used as the bottom member 300, samples of the package body 200 in which roasted pork or a rubber plate was filled, respectively, were obtained in the same way as in the example 14.

In the same way as in the example 14, the evaluation of the drop test, measurement of the curling rate, and evaluation of the curling property were performed for the samples of the package body 200.

As a result, it was found that pinholes were generated in zero samples and the rate of generation of pinholes was 0% in the samples of the package body 200 according to the present example, in which roasted pork had been filled. The curling rate of the package body 200 in the MD direction was found to be 98%, and the curling rate thereof in the TD direction was found to be 99%. The evaluation of the curling property of the package body 200 in the MD direction was "O" and the evaluation of the curling property in the TD direction was also "O" (see Table 7 below).

Comparative Example 14

Except that the multilayer film 500a obtained in the same way as in the example 7 was used as the bottom member 300, samples of the package body in which roasted pork or a rubber plate was filled, respectively, were obtained in the same way as in the example 14.

In the same way as in the example 14, the evaluation of the drop test, measurement of the curling rate, and evaluation of the curling property were performed for the samples of the package body.

As a result, it was found that pinholes were generated in two samples and the rate of generation of pinholes was 20% in the samples of the package body according to the present comparative example, in which roasted pork had been filled. The curling rate of the package body in the MD direction was found to be 84%, and the curling rate thereof in the TD direction was found to be 90%. The evaluation of the curling property of the package body in the MD direction was "x" and the evaluation of the curling property in the TD direction was also "x" (see Table 7 below).

Example 16

Except that the multilayer film 100 obtained in the same way as in the example 8 was used as the bottom member 300, samples of the package body 200 in which roasted pork or a rubber plate was filled, respectively, were obtained in the same way as in the example 14.

In the same way as in the example 14, the evaluation of the drop test, measurement of the curling rate, and evaluation of the curling property were performed for the samples of the package body 200.

As a result, it was found that pinholes were generated in two samples and the rate of generation of pinholes was 20% in the samples of the package body 200 according to the present example, in which roasted pork had been filled. The curling rate of the package body 200 in the MD direction was found to be 98%, and the curling rate thereof in the TD direction was found to be 100%. The evaluation of the curling property of the package body 200 in the MD direction was "O" and the evaluation of the curling property in the TD direction was also "O" (see Table 7 below).

Comparative Example 15

Except that the multilayer film 500a obtained in the same way as in the comparative example 8 was used as the bottom member 300, samples of the package body in which roasted pork or a rubber plate was filled, respectively, were obtained in the same way as in the example 14.

In the same way as in the example 14, the evaluation of the drop test, measurement of the curling rate, and evaluation of the curling property were performed for the samples of the package body.

As a result, it was found that pinholes were generated in eight samples and the rate of generation of pinholes was 80% in the samples of the package body according to the present comparative example, in which roasted pork had been filled. The curling rate of the package body in the MD direction was found to be 85%, and the curling rate thereof in the TD direction was found to be 88%. The evaluation of the curling property of the package body in the MD direction was "x" and the evaluation of the curling property in the TD direction was also "x" (see Table 7 below).

Example 17

Except that the multilayer film 100 obtained in the same way as in the example 11 was used as the bottom member 300, samples of the package body 200 in which roasted pork or a rubber plate was filled, respectively, were obtained in the same way as in the example 14. Additionally, a pocket 310 having the long side of 100 mm, the short side of 80 mm, and the drawing depth of 15 mm was formed in the multilayer film 100, and samples of the package body 200 in which 60 g of frozen chicken had been filled in the pocket 310 of the bottom member 300 were manufactured.

In the same way as in the example 14, the evaluation of the drop test, measurement of the curling rate, and evaluation of the curling property were performed for the samples of the package body 200. In order to evaluate the existence of occurrence of pinholes for the frozen contents in the package body 200 according to the present example, after filling frozen chicken, it was verified as to whether or not pinholes were generated in the bottom member 300 of 50 samples when vacuum drawing was performed to seal the lid member 400 and the bottom member 300 at a sealing temperature of 140° C.

As a result, it was found that pinholes were generated in one sample and the rate of generation of pinholes was 10%, in the samples of the package body 200 according to the present example, in which roasted pork had been filled. Furthermore, it was found that pinholes were generated in zero samples and the rate of generation of pinholes was 0% in the samples in which frozen chicken had been filled. The curling rate of the package body 200 in the MD direction was found to be 99%, and the curling rate thereof in the TD direction was found to be 99%. The evaluation of the curling property of the package body 200 in the MD direction was "O" and the evaluation of the curling property in the TD direction was also "O" (see Table 8 below).

Comparative Example 16

Except that the multilayer film 500a obtained in the same way as in the comparative example 11 was used as the bottom member 300, samples of the package body in which roasted pork or a rubber plate was filled, respectively, were obtained in the same way as in the comparative example 13. Additionally, a pocket 310 having the long side of 100 mm, the short side of 80 mm, and the drawing depth of 15 mm was formed in the multilayer film 100, and samples of the package body 200 in which 60 g of frozen chicken had been filled in the pocket 310 of the bottom member 300 were manufactured.

In the same way as in the example 17, the evaluation of the drop test, measurement of the curling rate, and evaluation of the curling property after filling the roasted pork were performed for the samples of the package body 200, and the existence of occurrence of pinholes when the frozen chicken has been filled was evaluated.

As a result, it was found that pinholes were generated in six samples and the rate of generation of pinholes was 60% in the samples of the package body according to the present comparative example, in which roasted pork had been filled. Furthermore, it was found that pinholes were generated in three samples and the rate of generation of pinholes was 6% in the samples in which frozen chicken had been filled. The curling rate of the package body in the MD direction was found to be 83%, and the curling rate in the TD direction was found to be 88%. The evaluation of the curling property of the package body in the MD direction was "x" and the evaluation of the curling property thereof in the TD direction was also "x" (see Table 8 below).

Example 18

Except that the multilayer film 100 obtained in the same way as in the example 10 was used as the bottom member 300, samples of the package body 200 in which frozen chicken, roasted pork, or a rubber plate was filled, respectively, was obtained in the same way as in the example 17.

In the same way as in the example 17, the evaluation of the drop test, measurement of the curling rate, and evaluation of the curling property after filling the roasted pork were performed for the samples of the package body 200, and the existence of occurrence of pinholes when the frozen chicken has been filled was evaluated.

As a result, it was found that pinholes were generated in zero samples and the rate of generation of pinholes was 0% in the samples of the package body 200 according to the present example, in which roasted pork had been filled. Furthermore, it was found that pinholes were generated in one sample and the rate of generation of pinholes was 2% in the samples in which frozen chicken had been filled. The curling rate of the package body 200 in the MD direction was found to be 98%, and the curling rate thereof in the TD direction was found to be 99%. The evaluation of the curling property of the package body 200 in the MD direction was "O" and the evaluation of the curling property in the TD direction was also "O" (see Table 8 below).

Comparative Example 17

Except that the multilayer film 500a obtained in the same way as in the comparative example 10 was used as the bottom member 300, samples of the package body 200 in which frozen chicken, roasted pork, or a rubber plate was filled, respectively, were obtained in the same way as in the comparative example 16.

In the same way as in the example 17, the evaluation of the drop test, measurement of the curling rate, and evaluation of the curling property after filling the roasted pork were performed for the samples of the package body 200, and the existence of occurrence of pinholes when the frozen chicken has been filled was evaluated.

As a result, it was found that pinholes were generated in four samples and the rate of generation of pinholes was 40% in the samples of the package body according to the present comparative example, in which roasted pork had been filled. Furthermore, it was found that pinholes were generated in eight samples and the rate of generation of pinholes was 16% in the samples in which frozen chicken had been filled. The curling rate of the package body in the MD direction was found to be 82%, and the curling rate thereof in the TD direction was found to be 88%. The evaluation of the curling property of the package body in the MD direction was "x" and the evaluation of the curling property thereof in the TD direction was also "x" (see Table 8 below).

Example 19

Except for the description provided below, in the same way as in the example 2, the multilayer film 100c illustrated in FIG. 5 was obtained. The oxygen barrier layer 160 was provided between the repeatedly laminated part 130 and the second adhesion layer 140. (Product name: J171B, manufactured by Kuraray Co., Ltd.) was prepared as the resin configuring the oxygen barrier layer 160. A PP-g-MAH (product name: QB550, manufactured by Mitsui Chemicals, Inc.) was prepared as the resin configuring the second layer 132. The thickness of the outer layer 110 was set to 22.5 µm, that of the first adhesion layer 120 to 7.5 µm, the oxygen barrier layer 160 to 7.5 µm, the second adhesion layer 140 to 7.5 µm, the sealing layer 150 to 30 µm, the total thickness of the first layer 131 to 60 µm, and the total thickness of the second layer 132 to 15 µm. The average thickness of each layer of the first layer 131 was 6.67 µm, and the average thickness of each layer of the second layer 132 was 1.88 µm.

Except that the obtained multilayer film 100c was used as the bottom member 300, samples of the package body 200 in which frozen chicken or roasted pork was filled, respectively, were obtained in the same way as in the example 17.

In the same way as in the example 17, the drop test after filling the roasted pork was evaluated for the samples of the package body 200, and the existence of occurrence of pinholes when frozen chicken has been filled was evaluated.

As a result, it was found that pinholes were generated in zero samples and the rate of generation of pinholes was 0% in the samples of the package body 200 according to the present example, in which roasted pork had been filled. Furthermore, it was found that pinholes were generated in five samples and the rate of generation of pinholes was 10% in the samples in which frozen chicken had been filled (see Table 8 below).

Comparative Example 18

Figure 22:
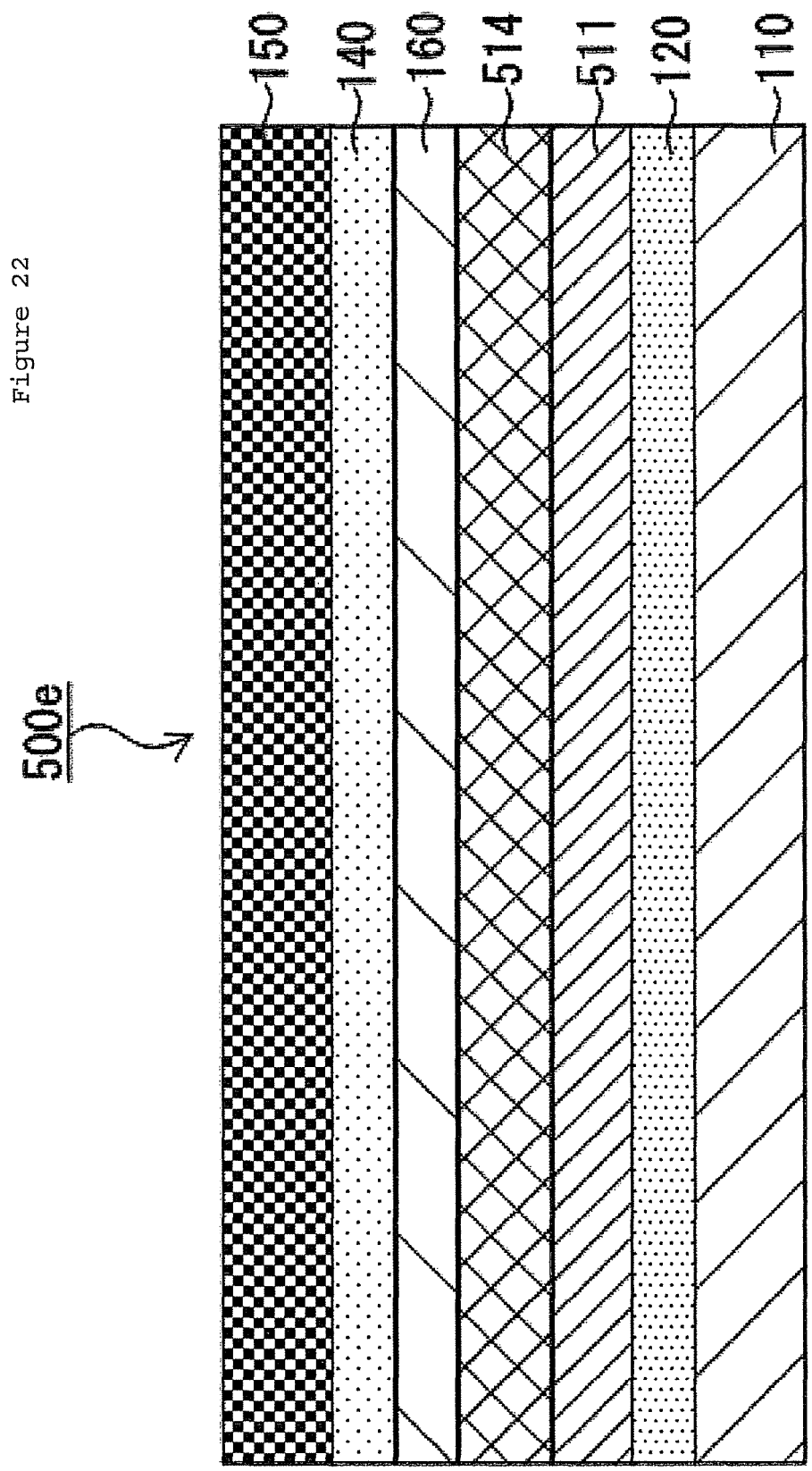
FIG. 22 is a cross-sectional view of a multilayer film used for evaluating a comparative example.

Except for the description provided below, in the same way as in the comparative example 1, and the multilayer film 500e illustrated in FIG. 22 was obtained. A PP-g-MAH layer 514 was provided in place of the EVOH resin layer 513. The oxygen barrier layer 160 was provided between the PP-g-MAH layer 514 and the second adhesion layer 140. (Product name: J171B, manufactured by Kuraray Co., Ltd.) was prepared as the resin configuring the oxygen barrier layer 160. A PP-g-MAH (product name: QB550, manufactured by Mitsui Chemicals, Inc.) was prepared as the resin configuring the PP-g-MAH layer 514. The thickness of the outer layer 110 was set to 22.5 µm, that of the first adhesion layer 120 to 7.5 µm, the oxygen barrier layer to 7.5 µm, the second adhesion layer 140 to 7.5 µm, the sealing layer 150 to 30 µm, the polyamide resin layer 511 to 60 µm, and the PP-g-MAH layer 514 to 15 µm.

Except that the obtained multilayer film 500e was used as the bottom member 300, samples of the package body 200 in which frozen chicken or roasted pork was filled, respectively, were obtained in the same way as in the comparative example 16.

In the same way as in the example 17, the drop test after filling the roasted pork was evaluated for the samples of the package body 200, and the existence of occurrence of pinholes when frozen chicken has been filled was evaluated.

As a result, it was found that pinholes were generated in four samples and the rate of generation of pinholes was 40% in the samples of the package body according to the present comparative example, in which roasted pork had been filled. Furthermore, it was found that pinholes were generated in 12 samples and the rate of generation of pinholes was 24% in the samples in which frozen chicken had been filled (see Table 8 below).

Example 20

Except that the multilayer film 100e obtained in the same way as in the example 12 was used as the bottom member 300, samples of the package body 200 in which frozen chicken or roasted pork was filled, respectively, was obtained in the same way as in the example 17.

In the same way as in the example 17, the drop test after filling the roasted pork was evaluated for the samples of the package body 200, and the existence of occurrence of pinholes when frozen chicken has been filled was evaluated.

As a result, it was found that pinholes were generated in zero samples and the rate of generation of pinholes was 0% in the samples of the package body 200 according to the present example, in which roasted pork had been filled. Furthermore, it was found that pinholes were generated in zero samples and the rate of generation of pinholes was 0% in the samples in which frozen chicken had been filled (see Table 8 below).

Comparative Example 19

Except that the multilayer film 500*b* obtained in the same way as in the comparative example 10 was used as the bottom member 300, samples of the package body 200 in which frozen chicken or roasted pork was filled, respectively, were obtained in the same way as in the comparative example 16.

In the same way as in the example 17, the drop test after filling the roasted pork was evaluated for the samples of the package body 200, and the existence of occurrence of pinholes when frozen chicken has been filled was evaluated.

As a result, it was found that pinholes were generated in four samples and the rate of generation of pinholes was 40% in the samples of the package body according to the present comparative example, in which roasted pork had been filled. Furthermore, it was found that pinholes were generated in two samples and the rate of generation of pinholes was 4% in the samples in which frozen chicken had been filled (see Table 8 below).

TABLE 6

| | | Grade | | Ex. 13 | C. Ex. 11 | | | Grade | | Ex. 14 | C. Ex. 12 |
|---|---|---|---|---|---|---|---|---|---|---|---|
| Outer layer | | FH3315 | Thickness (μm) | 10.5 | 10.5 | Outer layer | | FH3315 | Thickness (μm) | 10.5 | 10.5 |
| First adhesive layer | | QB550 | Thickness (μm) | 6 | 6 | First adhesive layer | | QB550 | Thickness (μm) | 6 | 6 |
| Repeatedly laminated part | Polyamide resin | 1022B | Thickness of each layer (μm) | 6.67 | 60 | Repeatedly laminated part | Polyamide resin | 1022B | Thickness of each layer (μm) | 6.67 | 60 |
| | | | The no. of laminations | 9 | 1 | | | | The no. of laminations | 9 | 1 |
| | | | Total thickness (μm) | 60 | 60 | | | | Total thickness (μm) | 60 | 60 |
| | EVOH resin | J171B | Thickness of each layer (μm) | 1.88 | 15 | | LLDPE-g-MAH | NF536 | Thickness of each layer (μm) | 1.88 | |
| | | | The no. of laminations | 8 | 1 | | | | The no. of laminations | 8 | |
| | | | Total thickness (μm) | 15 | 15 | | | | Total thickness (μm) | 15 | |
| Second adhesive layer | | NF536 | Thickness (μm) | 6 | 6 | Second adhesive layer | | NF536 | Thickness (μm) | 6 | 21 |
| Sealing layer | | 1520F | Thickness (μm) | 52.5 | 52.5 | Sealing layer | | 1520F | Thickness (μm) | 52.5 | 52.5 |
| | | | Overall thickness (μm) | 150 | 150 | | | | Overall thickness (μm) | 150 | 150 |

| | Drawing depth | Contents | | | | | Drawing depth | Contents | | | |
|---|---|---|---|---|---|---|---|---|---|---|---|
| The no. of samples (pieces) in which pinholes are generated | 15 mm | Chicken | 0 | 2 | | The no. of samples (pieces) in which pinholes are generated | 15 mm | Chicken | 0 | 0 | |
| | 45 mm | Roasted pork | | | | | 45 mm | Roasted pork | 0 | 3 | |
| Pinhole generation rate (%) | 15 mm | Chicken | 0 | 7 | | Pinhole generation rate (%) | 15 mm | Chicken | 0 | 0 | |
| | 45 mm | Roasted pork | | | | | 45 mm | Roasted pork | 0 | 30 | |
| Curling rate (%) | | MD | 99 | 85 | | Curling rate (%) | | MD | 99 | 83 | |
| | | TD | 100 | 90 | | | | TD | 100 | 90 | |
| Curling property | | MD | ◯ | X | | Curling property | | MD | ◯ | X | |
| | | TD | ◯ | X | | | | TD | ◯ | X | |

TABLE 7

| | | Grade | | Ex. 15 | C. Ex. 14 | Ex. 16 | C. Ex. 15 |
|---|---|---|---|---|---|---|---|
| Outer layer | | FH3315 | Thickness (μm) | 15 | 15 | 10 | 10 |
| First adhesive layer | | QB550 | Thickness (μm) | 7.5 | 7.5 | 5 | 5 |
| Repeatedly laminated part | Polyamide resin | 1022B | Thickness of each layer (μm) | 6.67 | 60 | 4.44 | 40 |
| | | | The no. of laminations | 9 | 1 | 9 | 1 |
| | | | Total thickness (μm) | 60 | 60 | 40 | 40 |
| | EMAA resin | N0903HC | Thickness of each layer (μm) | 1.88 | 15 | 1.25 | 10 |
| | | | The no. of laminations | 8 | 1 | 8 | 1 |
| | | | Total thickness (μm) | 15 | 15 | 10 | 10 |

TABLE 7-continued

| | Grade | | Ex. 15 | C. Ex. 14 | Ex. 16 | C. Ex. 15 |
|---|---|---|---|---|---|---|
| Second adhesive layer | NF536 | Thickness (μm) | 7.5 | 7.5 | 5 | 5 |
| Sealing layer | 1520F | Thickness (μm) | 45 | 45 | 30 | 30 |
| | | Overall thickness (μm) | 150 | 150 | 100 | 100 |

| | Drawing depth | Contents | | | | |
|---|---|---|---|---|---|---|
| The no. of samples (pieces) in which pinholes are generated | 15 mm | Chicken | 0 | 2 | 2 | 8 |
| | 45 mm | Roasted pork | | | | |
| Pinhole generation rate (%) | 15 mm | Chicken | 0 | 20 | 20 | 80 |
| | 45 mm | Roasted pork | | | | |
| Curling rate (%) | | MD | 98 | 84 | 98 | 85 |
| | | TD | 99 | 90 | 100 | 88 |
| Curling property | | MD | ○ | X | ○ | X |
| | | TD | ○ | X | ○ | X |

TABLE 8

| | | Grade | | Ex. 17 | C. Ex. 16 |
|---|---|---|---|---|---|
| Outer layer | | FH3315 | Thickness (μm) | 22.5 | 22.5 |
| First adhesive layer | | Q5550 | Thickness (μm) | 7.5 | 7.5 |
| Oxygen barrier layer | | J171B | Thickness (μm) | 7.5 | 7.5 |
| Repeatedly laminated part | Polyamide resin | 1022B | Thickness of each layer (μm) | 6.67 | 60 |
| | | | The no. of laminations | 9 | 1 |
| | | | Total thickness (μm) | 60 | 60 |
| | LLDPE-g-HAH | NF536 | Thickness of each layer (μm) | 1.85 | |
| | | | The no. of laminations | 8 | |
| | | | Total thickness (μm) | 15 | |
| Second adhesive layer | | NF536 | Thickness (μm) | 7.5 | 22.5 |
| Sealing layer | | 1520F | Thickness (μm) | 30 | 30 |
| | | | Overall thickness (μm) | 150 | 150 |

| | Drawing depth | Contents | | |
|---|---|---|---|---|
| The no. of samples (pieces) in which pinholes are generated | 15 mm | Frozen chicken | 0 | 3 |
| | 45 mm | Roasted pork | 1 | 6 |
| Pinholes generation rate (%) | 15 mm | Frozen chicken | 0 | 6 |
| | 45 mm | Roasted pork | 10 | 60 |
| Curling rate (%) | | HD | 99 | 53 |
| | | TD | 99 | 88 |
| Curling property | | HD | ○ | X |
| | | TD | ○ | X |

| | | Grade | | Ex. 18 | C. Ex. 17 |
|---|---|---|---|---|---|
| Outer layer | | FH3315 | Thickness (μm) | 22.5 | 22.5 |
| First adhesive layer | | Q5550 | Thickness (μm) | 7.5 | 7.5 |
| Repeatedly laminated part | Polyamide resin | 1022B | Thickness of each layer (μm) | 6.67 | 60 |
| | | | The no. of laminations | 9 | 1 |
| | | | Total thickness (μm) | 60 | 60 |
| | LLDPE-g-HAH | NF536 | Thickness of each layer (μm) | 1.88 | |
| | | | The no. of laminations | 8 | |
| | | | Total thickness (μm) | 15 | |
| Oxygen barrier layer | | J171B | Thickness (μm) | 7.5 | 7.5 |
| Second adhesive layer | | NF536 | Thickness (μm) | 7.5 | 22.5 |
| Sealing layer | | 1520F | Thickness (μm) | 30 | 30 |
| | | | Overall thickness (μm) | 150 | 150 |

| | Drawing depth | Contents | | |
|---|---|---|---|---|
| The no. of samples (pieces) in which pinholes are generated | 15 mm | Frozen chicken | 1 | 8 |
| | 45 mm | Roasted pork | 0 | 4 |
| Pinholes generation rate (%) | 15 mm | Frozen chicken | 2 | 16 |
| | 45 mm | Roasted pork | 0 | 40 |
| Curling rate (%) | | HD | 96 | 82 |
| | | TD | 99 | 88 |
| Curling property | | HD | ○ | X |
| | | TD | ○ | X |

| | | Grade | | Ex. 19 | C. Ex. 18 |
|---|---|---|---|---|---|
| Outer layer | | FH3315 | Thickness (μm) | 22.5 | 22.5 |
| First adhesive layer | | Q5550 | Thickness (μm) | 7.5 | 7.5 |
| Repeatedly laminated part | Polyamide resin | 1022B | Thickness of each layer (μm) | 6.67 | 60 |
| | | | The no. of laminations | 9 | 1 |
| | | | Total thickness (μm) | 60 | 60 |
| | PP-g-HAH | Q5550 | Thickness of each layer (μm) | 1.88 | 15 |
| | | | The no. of laminations | 8 | 1 |
| | | | Total thickness (μm) | 15 | 15 |
| Oxygen barrier layer | | J171B | Thickness (μm) | 7.5 | 7.5 |
| Second adhesive layer | | NF536 | Thickness (μm) | 7.5 | 7.5 |
| Sealing layer | | 1520F | Thickness (μm) | 30 | 30 |
| | | | Overall thickness (μm) | 150 | 150 |

| | Drawing depth | Contents | | |
|---|---|---|---|---|
| The no. of samples (pieces) in which pinholes are generated | 15 mm | Frozen chicken | 5 | 12 |
| | 45 mm | Roasted pork | 0 | 4 |
| Pinholes generation rate (%) | 15 mm | Frozen chicken | 10 | 24 |
| | 45 mm | Roasted pork | 0 | 40 |

TABLE 8-continued

| | Grade | | Ex. 20 | C. Ex. 19 |
|---|---|---|---|---|
| Outer layer | FH3315 | Thickness (μm) | 22.5 | 22.5 |
| First adhesive layer | Q5550 | Thickness (μm) | 7.5 | 7.5 |
| Repeatedly laminated part | Polyamide resin | 1022B | Thickness of each layer (μm) | 6 | 60 |
| | | | The no. of laminations | 5 | 1 |
| | | | Total thickness (μm) | 30 | 60 |
| | LLCPE-g-HAH | HF536 | Thickness of each layer (μm) | 1.86 | |
| | | | The no. of laminations | 4 | |
| | | | Total thickness (μm) | 7.5 | |
| Oxygen barrier layer | J171B | Thickness (μm) | 7.5 | 7.5 |
| Repeatedly laminated part | Polyamide resin | 1022B | Thickness of each layer (μm) | 6 | |
| | | | The no. of laminations | 5 | |
| | | | Total thickness (μm) | 30 | |
| | LLDPE-g-HAH | HF536 | Thickness of each layer (μm) | 1.88 | |
| | | | The no. of laminations | 4 | |
| | | | Total thickness (μm) | 7.5 | |
| Second adhesive layer | HF536 | Thickness (μm) | 7.5 | 22.5 |
| Sealing layer | 1520F | Thickness (μm) | 30 | 30 |
| | | Overall thickness (μm) | 150 | 150 |

| | Drawing depth | Contents | | |
|---|---|---|---|---|
| The no. of samples (pieces) in which pinholes are generated | 15 mm | Frozen chicken | 0 | 2 |
| | 45 mm | Roasted pork | 0 | 4 |
| Pinholes generation rate (%) | 15 mm | Frozen chicken | 0 | 4 |
| | 45 mm | Roasted pork | 0 | 40 |

As compared to the package body according to each of the corresponding comparative examples 12 through 19, the package body according to the examples 13 through 20 had a lower rate of generation of pinholes. Therefore, when comparison was performed with the same thickness, the package body according to the examples 13 through 20 that included a repeatedly laminated part had a better anti-pinhole property than the multilayer film according to the comparative examples 12 through 19 that did not include a repeatedly laminated part. Furthermore, of the package bodies according to the examples 17 through 20 that included the oxygen barrier layer 160, the package body according to the example 20 had the best anti-pinhole property.

Furthermore, the curling property of the package body according to the examples 13 through 18, was evaluated as "O". In contrast, the curling property of the package body according to the comparative examples 12 through 17 was evaluated as "x". Therefore, the package body according to the examples 13 through 18 had a better curling property than the package body according to the comparative examples 12 through 17.

Example 21

In order to manufacture the multilayer film 100h illustrated in FIG. 10, a polypropylene-based resin (product name: FH3315, manufactured by Sumitomo Chemical Co., Ltd.) was prepared as the resin configuring the outer layer 110. An adhesive resin (product name: QB550, manufactured by Mitsui Chemicals, Inc.) was prepared as the resin configuring the first adhesion layer 120. A polyamide resin (product name: 1022B, manufactured by Ube Industries, Ltd.) was prepared as the resin configuring the first layer 131 of the repeatedly laminated part 134. An EVOH resin (product name: J171B, manufactured by Kuraray Co., Ltd.) was prepared as the resin configuring the second layer 133 of the repeatedly laminated part 134. An adhesive resin (product name: NF536, manufactured by Mitsui Chemicals, Inc.) was prepared as the resin configuring the second adhesion layer 140. An LLDPE resin (product name: 1520F, manufactured by Ube-Maruzen Polyethylene Co. Ltd.) was prepared as the resin configuring the sealing layer 150.

The multilayer film 100h was manufactured by performing coextrusion of the polypropylene-based resin of the outer layer 110, the adhesive resin of the first adhesion layer 120, the polyamide resin of the first layer 131, the EVOH resin of the second layer 133, the adhesive resin of the second adhesion layer 140, and the LLDPE resin of the sealing layer 150 using a feed block and die. In the multilayer film 100h, the number of laminations of the first layer 131 was nine layers, and that of the second layer 133 was eight layers, such that the total number of laminations of the repeatedly laminated part 134 was 17 layers.

The overall thickness of the multilayer film 100h was set to 100 μm. Furthermore, the thickness of the outer layer 110 was set to 20 μm, that of the first adhesion layer 120 to 5 μm, the second adhesion layer 140 to 5 μm, and the sealing layer 150 to 32 μm. The total thickness of the first layer 131 was set to 30 μm and the total thickness of the second layer 133 was set to 8 μm. The average thickness of each layer of the first layer 131 was 3.3 μm, and the average thickness of each layer of the second layer 133 was 1.0 μm.

<Evaluation of the Impact Resistance>

Samples were prepared by cutting the manufactured multilayer film 100h into a width of 100 mm and a length of 100 mm. These samples thus prepared were set in a drop hammer impact testing machine (manufactured by Instron). Furthermore, a test was performed by making a striker with a diameter of 10 mm collide with the sealing layer 150 side of the multilayer film 100h at a drop speed of 1.8 m/second, and it was checked as to whether or not holes were formed in the multilayer film 100h. This test was performed for each of 20 samples, and the evaluation was based on the following standard:

O: Of the 20 samples, there were zero samples in which a hole was formed.

x: Of the 20 samples, there was at least one sample in which a hole was formed.

<Evaluation of the Die-Cuttability>

The surfaces at the sealing layer 150 side of the manufactured multilayer film 100h were overlapped and sealed at a sealing temperature of 140° C. to prepare samples. A test was performed to check if the samples could be punched with a punching blade. This test was performed for each of 20 samples, and the evaluation was based on the following standard:

O: Of the 20 samples, there were no problematic samples; all of the sides of the samples were punched and cut appropriately.

x: Of the 20 samples, there was at least one sample in which at least one side could not be punched and remained uncut.

As a result of evaluating each of the aforementioned items, the impact resistance of the multilayer film 100h according to the present example was evaluated as "O", and the die-cuttability of the multilayer film 100h was evaluated as "O" (see Table 9 below).

Example 22

Except for the description provided below, the multilayer film 100h was obtained in the same way as in the example 21. A polyamide resin (product name: 5023B, manufactured by Ube Industries Ltd.) was prepared as the resin configuring the first layer 131 of the repeatedly laminated part 134.

In the same way as in the example 21, each item was evaluated for the multilayer film 100h.

As a result, the impact resistance of the multilayer film 100h according to the present example was evaluated as "O", and the die-cuttability of the multilayer film 100h was evaluated as "O" (see Table 9 below).

Example 23

Except for the description provided below, the multilayer film 100k illustrated in FIG. 13 was obtained in the same way as in the example 21. The number of laminations of the first layer 131 was eight layers, and that of the second layer 133 was nine layers, such that the total number of laminations of the repeatedly laminated part 134k was 17 layers. The total thickness of the first layer 131 was set to 30 µm and the total thickness of the second layer 133 was set to 8 µm. The average thickness of each layer of the first layer 131 was 3.8 µm, and the average thickness of each layer of the second layer 133 was 0.9 µm.

In the same way as in the example 21, each item was evaluated for the multilayer film 100k.

As a result, the impact resistance of the multilayer film 100k according to the present example was evaluated as "O", and the die-cuttability of the multilayer film 100k was evaluated as "O" (see Table 9 below).

Comparative Example 20

In order to manufacture a multilayer film 500 illustrated in FIG. 16, a polypropylene-based resin (product name: FH3315, manufactured by Sumitomo Chemical Co., Ltd.) was prepared as the resin configuring the outer layer 110. An adhesive resin (product name: QB550, manufactured by Mitsui Chemicals, Inc.) was prepared as the resin configuring the first adhesion layer 120. A polyamide resin (product name: 1022B, manufactured by Ube Industries, Ltd.) was prepared as the resin configuring the polyamide resin layer 511. An EVOH resin (product name: J171B, manufactured by Kuraray Co., Ltd.) was prepared as the resin configuring the EVOH resin layer 513. An adhesive resin (product name: NF536, manufactured by Mitsui Chemicals, Inc.) was prepared as the resin configuring the second adhesion layer 140. An LLDPE resin (product name: 1520F, manufactured by Ube-Maruzen Polyethylene Co. Ltd.) was prepared as the resin configuring the sealing layer 150.

The multilayer film 500 was manufactured by performing coextrusion of the polypropylene-based resin of the outer layer 110, the adhesive resin of the first adhesion layer 120, the EVOH resin of the EVOH resin layer 513, the polyamide resin of the polyamide resin layer 511, the adhesive resin of the second adhesion layer 140, and the LLDPE resin of the sealing layer 150 using a feed block and die.

The overall thickness of the multilayer film 500 was set to 100 µm. Furthermore, the thickness of the outer layer 110 was set to 20 µm, that of the first adhesion layer 120 to 5 µm, the second adhesion layer 140 to 5 µm, the sealing layer 150 to 32 µm, the polyamide resin layer 511 to 30 µm, and the EVOH resin layer 513 to 8 µm.

In the same way as in the example 21, each item was evaluated for the multilayer film 500.

As a result, the impact resistance of the multilayer film 500 according to the present comparative example was evaluated as "x", and the die-cuttability of the multilayer film 500 was evaluated as "O" (see Table 9 below).

Comparative Example 21

Except for the description provided below, the multilayer film 500 was obtained in the same way as in the comparative example 20. The overall thickness of the multilayer film 500 was set to 150 µm, the thickness of the outer layer 110 was set to 30 µm, that of the first adhesion layer 120 to 7.5 µm, the second adhesion layer 140 to 7.5 µm, the sealing layer 150 to 48 µm, the polyamide resin layer 511 to 45 µm, and the EVOH resin layer 513 to 12 µm.

In the same way as in the example 21, each item was evaluated for the multilayer film 500.

As a result, the impact resistance of the multilayer film 500 according to the present comparative example was evaluated as "O", and the die-cuttability of the multilayer film 500 was evaluated as "x" (see Table 9 below).

Example 24

Except for the description provided below, the multilayer film 100h was obtained in the same way as in the example 21. The overall thickness of the multilayer film 100h was set to 150 µm, the thickness of the outer layer 110 was set to 30 µm, that of the first adhesion layer 120 to 7.5 µm, the second adhesion layer 140 to 7.5 µm, the sealing layer 150 to 48 µm, the total thickness of the first layer 131 to 45 µm, and the total thickness of the second layer 133 to 12 µm. The average thickness of each layer of the first layer 131 was 5.0 µm, and the average thickness of each layer of the second layer 133 was 1.5 µm.

Except that drop speed of the striker was set to 2.2 m/second, each item was evaluated for the multilayer film 100h in the same way as in the example 21.

As a result, the impact resistance of the multilayer film 100h according to the present example was evaluated as "O", and the die-cuttability of the multilayer film 100h was evaluated as "O" (see Table 9 below).

Comparative Example 22

The multilayer film 500 was obtained in the same way as in the comparative example 21. In the same way as in the example 24, each item was evaluated for the multilayer film 500.

As a result, the impact resistance of the multilayer film 500 according to the present comparative example was evaluated as "x", and the die-cuttability of the multilayer film 500 was evaluated as "x" (see Table 9 below).

Example 25

Except for the description provided below, the multilayer film 100h was obtained in the same way as in the example 24. The number of laminations of the first layer 131 was 33 layers, the total thickness of the first layer 131 was 45 µm, the number of laminations of the second layer 133 was 32 layers, and the total thickness of the second layer 133 was 12 µm. The average thickness of each layer of the first layer 131 was 1.7 µm, and the average thickness of each layer of the second layer 133 was 0.4 µm.

Except that drop speed of the striker was set to 2.6 m/second, each item was evaluated for the multilayer film 100h in the same way as in the example 21.

As a result, the impact resistance of the multilayer film 100h according to the present example was evaluated as "O", and the die-cuttability of the multilayer film 100h was evaluated as "O" (see Table 9 below).

Example 26

Except for the description provided below, the multilayer film 100h was obtained in the same way as in the example 21. A polyester-based resin (product name: GN071, manufactured by Eastman Chemical Japan Ltd.) was prepared as the resin configuring the outer layer 110, and an adhesive resin (product name: SF741, manufactured by Mitsui Chemicals, Inc.) was prepared as the resin configuring the first adhesion layer 120.

In the same way as in the example 21, each item was evaluated for the multilayer film 100h.

As a result, the impact resistance of the multilayer film 100h according to the present example was evaluated as "O", and the die-cuttability of the multilayer film 100h was evaluated as "O" (see Table 9 below).

Comparative Example 23

Except for the description provided below, the multilayer film 500 was obtained in the same way as in the example 26. Rather than providing the repeatedly laminated part 130, the polyamide resin layer 511 having a thickness of 30 μm and the EVOH resin layer 513 having a thickness of 8 μm were provided.

In the same way as in the example 21, each item was evaluated for the multilayer film 500.

As a result, the impact resistance of the multilayer film 500 according to the present comparative example was evaluated as "x", and the die-cuttability of the multilayer film 500 was evaluated as "O" (see Table 9 below).

Example 27

Except for the description provided below, the multilayer film 100h was obtained in the same way as in the example 21. An EVOH resin (product name: J1713, manufactured by Kuraray Co., Ltd.) was prepared as the resin configuring the outer layer 110, an adhesive resin (product name: NF536, manufactured by Mitsui Chemicals, Inc.) was prepared as the resin configuring the first adhesion layer 120, and an EVA resin (product name: V961RC, manufactured by Dupont-Mitsui Polychemicals Co, Ltd.) was prepared as the resin configuring the sealing layer 150. The overall thickness of the multilayer film 100h was set to 200 μm, the thickness of the outer layer 110 was set to 40 μm, that of the first adhesion layer 120 to 10 μm, the second adhesion layer 140 to 10 μm, the sealing layer 150 to 78 μm, the total thickness of the first layer 131 to 50 μm, and the total thickness of the second layer 133 to 12 μm. The average thickness of each layer of the first layer 131 was 5.6 μm, and the average thickness of each layer of the second layer 132 was 1.5 μm.

In the same way as in the example 25, each item was evaluated for the multilayer film 100h.

As a result, the impact resistance of the multilayer film 100h according to the present example was evaluated as "O", and the die-cuttability of the multilayer film 100 was evaluated as "O" (see Table 9 below).

Comparative Example 24

Except for the description provided below, the multilayer film 500 was obtained in the same way as in the example 27. Rather than providing the repeatedly laminated part 134, the polyamide resin layer 511 having a thickness of 50 μm and the EVOH resin layer 513 having a thickness of 12 μm were provided.

In the same way as in the example 25, each item was evaluated for the multilayer film 500.

As a result, the impact resistance of the multilayer film 500 according to the present comparative example was evaluated as "x", and the die-cuttability of the multilayer film 500 was evaluated as "O" (see Table 9 below).

TABLE 9

| | | Grade | | Ex. 21 | Ex. 22 | Ex. 23 | C. Ex. 20 | C. Ex. 21 | Ex. 24 | C. Ex. 22 | Ex. 25 | Ex. 26 | C. Ex. 23 | Ex. 27 | C. Ex. 24 |
|---|---|---|---|---|---|---|---|---|---|---|---|---|---|---|---|
| Outer layer | Polypropylene-based | FH3315 | Thickness (μm) | 20 | 20 | 20 | 20 | 30 | 30 | 30 | 30 | | | | |
| | Polyester-based resin | GN071 | Thickness (μm) | | | | | | | | | 20 | 20 | | |
| | EVOH resin | J171B | Thickness (μm) | | | | | | | | | | | 40 | 40 |
| First adhesive layer | Adhesive resin | QB550 | Thickness (μm) | 5 | 5 | 5 | 5 | 7.5 | 7.5 | 7.5 | 7.5 | | | | |
| | | SF741 | Thickness (μm) | | | | | | | | | 5 | 5 | | |
| | | NF536 | Thickness (μm) | | | | | | | | | | | 10 | 10 |
| Repeatedly laminated part | Polyamide resin | 1022B | Thickness of each layer (μm) | 3.3 | | 3.8 | 30 | 45 | 5.0 | 45 | 1.7 | 3.3 | 30 | 5.6 | 50 |
| | | 5023B | Thickness of each layer (μm) | | 3.3 | | | | | | | | | | |
| | | | The no. of laminations | 9 | 9 | 8 | 1 | 1 | 9 | 1 | 33 | 9 | 1 | 9 | 1 |
| | | | Total thickness (μm) | 30 | 30 | 30 | 30 | 45 | 45 | 45 | 45 | 30 | 30 | 50 | 50 |
| | EVOH resin | J171B | Thickness of each layer (μm) | 1.0 | 1.0 | 0.9 | 8.0 | 12.0 | 1.5 | 12.0 | 0.4 | 1.0 | 8.0 | 1.5 | 12.0 |
| | | | The no. of laminations | 8 | 8 | 9 | 1 | 1 | 8 | 1 | 32 | 8 | 1 | 8 | 1 |
| | | | Thickness (μm) | 8 | 8 | 8 | 8 | 12 | 12 | 12 | 12 | 8 | 8 | 12 | 12 |
| Second adhesive layer | Adhesive resin | NF536 | Thickness (μm) | 5 | 5 | 5 | 5 | 7.5 | 7.5 | 7.5 | 7.5 | 5 | 5 | 10 | 10 |
| Sealing layer | LLDPE resin | 1520F | Thickness (μm) | 32 | 32 | 32 | 32 | 48 | 48 | 48 | 48 | 32 | 32 | | |

TABLE 9-continued

| | Grade | | Ex. 21 | Ex. 22 | Ex. 23 | C. Ex. 20 | C. Ex. 21 | Ex. 24 | C. Ex. 22 | Ex. 25 | Ex. 26 | C. Ex. 23 | Ex. 27 | C. Ex. 24 |
|---|---|---|---|---|---|---|---|---|---|---|---|---|---|---|
| EVA resin | V961RC | Thickness (μm) | | | | | | | | | | | 78 | 78 |
| | | Overall thickness (μm) | 100 | 100 | 100 | 100 | 150 | 150 | 150 | 150 | 100 | 100 | 200 | 200 |
| | Striker speed (m/s) | | 1.8 | 1.8 | 1.8 | 1.8 | 1.8 | 2.2 | 2.2 | 2.6 | 1.8 | 1.8 | 2.6 | 2.6 |
| | Impact resistance | | O | O | O | X | O | O | X | O | O | X | O | X |
| | Die-cuttability | | O | O | O | O | X | O | X | O | O | O | O | O |

In the package body according to the examples 21 through 27, both the impact resistance and the die-cuttability were evaluated as "O". On the contrary, in the package body according to the comparative examples 20 through 24, at least one of the impact resistance and the die-cuttability was evaluated as "x". Therefore, the package body according to the examples 21 through 27 had a better impact resistance and die-cuttability than the package body according to the comparative examples 20 through 24.

Example 28

Manufacturing of the Bottom Member

Using a deep drawing type fully automatic vacuum packaging machine (product number: FV6300, manufactured by Omori Machinery Co., Ltd.), a pocket 310 having the long side of 150 mm, the short side of 100 mm, and the drawing depth of 30 mm was formed at a forming temperature of 95° C. in the multilayer film 100h obtained in the same way as in the example 21, to obtain the bottom member 300.

<Manufacturing of the Lid Member>

In order to manufacture the multilayer film 100n illustrated in FIG. 15, an OPP film (product name: PA20, manufactured by SunTox Co., Ltd.) configuring the outermost layer 180 was prepared. A polyamide resin (product name: 1022B, manufactured by Ube Industries, Ltd.) was prepared as the resin configuring the outer layer 110. An adhesive resin (product name: NF536, manufactured by Mitsui Chemicals, Inc.) was prepared as the resin configuring the first adhesion layer 120. A polyamide resin (product name: 1022B, manufactured by Ube Industries, Ltd.) was prepared as the resin configuring the first layer 131 of the repeatedly laminated part 134. An EVOH resin (product name: J171B, manufactured by Kuraray Co., Ltd.) was prepared as the resin configuring the second layer 133 of the repeatedly laminated part 134. An adhesive resin (product name: NF536, manufactured by Mitsui Chemicals, Inc.) was prepared as the resin configuring the second adhesion layer 140. An LLDPE resin (product name: 1520F, manufactured by Ube-Maruzen Polyethylene Co. Ltd.) was prepared as the resin configuring the sealing layer 150.

A film was manufactured by performing coextrusion of the polyamide resin of the outer layer 110, the adhesive resin of the first adhesion layer 120, the polyamide resin of the first layer 131, the EVOH resin of the second layer 133, the adhesive resin of the second adhesion layer 140, and the LLDPE resin of the sealing layer 150 using a feed block and die. The OPP film of the outermost layer 180 was affixed at the outer layer 110 side of the film by the dry lamination method to manufacture the multilayer film 100n. The multilayer film 100n was used as the lid member 400.

In the multilayer film 100n, the number of laminations of the first layer 131 was nine layers, and that of the second layer 133 was eight layers, such that the total number of laminations of the repeatedly laminated part 134 was 17 layers. The overall thickness of the multilayer film 100m was set to 80 μm, that of the outermost layer 180 to 20 μm, the outer layer 110 to 12 μm, the first adhesion layer 120 to 4 μm, the second adhesion layer 140 to 4 μm, and the sealing layer 150 to 10 μm. The total thickness of the first layer 131 was set to 22 μm and the total thickness of the second layer 133 was set to 8 μm. The average thickness of each layer of the first layer 131 was 2.4 μm, and the average thickness of each layer of the second layer 133 was 1.0 μm.

<Manufacturing of the Package Body>

180 g of roasted pork was filled in the pocket 310 of the bottom member 300, and the lid member 400 and bottom member 300 were sealed at a sealing temperature of 140° C. to obtain a sample of the package body 200 in which the roasted pork had been filled.

<Evaluation of the Anti-Pinhole Property>

The package body 200 in which the roasted pork had been filled was passed through heat sterilization by placing in hot water having a temperature of 97° C. for 30 minutes, after which it was frozen and then packed inside a cardboard box. At a temperature of 23° C., the cardboard box was dropped 50 times from a height of 1 m. After the cardboard box had been dropped, the package body 200 was taken out from the cardboard box, and based on visual observation of the bottom member 300 and the observation of whether or not air bubbles were emerging from the bottom member 300 in the water, it was confirmed as to whether or not pinholes were generated in the bottom member 300. This test was performed for each of 20 samples, and the evaluation was based on the following standard:

O: Of the 20 samples, there were zero samples in which a pinhole occurred.

x: Of the 20 samples, there was at least one sample in which a pinhole occurred.

As a result of evaluating the aforementioned item, the anti-pinhole property of the package body 200 according to the present example was evaluated as "O" (see Table 10 below).

<Evaluation of the Die-Cuttability>

In the samples of the package body 200 that was in the process of being manufactured, a test was performed to verify whether or not the unformed portion of the multilayer film 100g of the bottom member 300 could be punched in the widthwise direction using a punching blade. This test was performed for each of 20 samples, and the evaluation was based on the following standard:

O: Of the 20 samples, there were no problematic samples; all of the sides of the samples were punched and cut appropriately.

x: Of the 20 samples, there was, at least one sample in which at least one side could not be punched and remained uncut.

As a result of evaluating the aforementioned item, the die-cuttability in the package body 200 according to the present example was evaluated as "O" (see Table 10 below).

<Evaluation of the Curling Property>

In the pocket 310 of the bottom member 300, a cylindrical rubber plate having a diameter of 96 mm and a thickness of 5 mm was filled, the lid member 400 and the bottom member 300 were sealed at a sealing temperature of 140° C., and a sample of the package body 200 for the curling test was obtained. As shown in FIG. 2, the length L1 of the lid member 400 side of the package body 200 was measured.

Following this, the package body 200 was immersed in hot water having a temperature of 97° C. for 30 minutes, and then the package body 200 was taken out from the hot water. Then, as shown in FIG. 21, the length L2 of the lid member 400 side of the package body 200 taken out from the hot water was measured.

Using the measured value of the length L1 of the package body 200 and the measured value of the length L2 of the package body 200, the curling rate of the package body 200 was calculated from the below-mentioned expression.

Curling rate(%)=(Length $L2$ of package body 200)/(Length $L1$ of package body 200)×100

As regards the curling rate of the package body 200, the package bodies 200 having a curling rate of not less than 98% were evaluated as "O" and the package bodies 200 having a curling rate of less than 98% were evaluated as "x".

As a result of performing the aforementioned evaluation, the curling property of the package body 200 was evaluated as "O" (see table 10 below).

Example 29

Except for the description provided below, the package body 200 was obtained in the same way as in the example 28. The multilayer film 100 obtained in the same way as in the example 22 was used as the bottom member 300.

In the same way as in the example 28, the evaluation of the anti-pinhole property, the die-cuttability, and the curling property was performed for the package body 200.

As a result, in the package body 200 according to the present example, the anti-pinhole property was evaluated as "O", the die-cuttability as "O", and the curling property as "O" (see Table 10 below).

Example 30

Except for the description provided below, the package body 200 was obtained in the same way as in the example 28. The multilayer film 100k obtained in the same way as in the example 23 was used as the bottom member 300.

In the same way as in the example 28, the evaluation of the anti-pinhole property, the die-cuttability, and the curling property was performed for the package body 200.

As a result, in the package body 200 according to the present example, the anti-pinhole property was evaluated as "O", the die-cuttability as "O", and the curling property as "O" (see Table 10 below).

Comparative Example 25

The multilayer film 100 obtained in the same way as in the comparative example 20 was used as the bottom member 300.

Except for the description provided below, the multilayer film 500d illustrated in FIG. 20 was obtained in the same way as in the example 28. A polyamide resin layer 511 and an EVOH resin layer 513 were provided in place of the repeatedly laminated part 130. The thickness of the polyamide resin layer 511 was set to 22 µm, and that of the EVOH resin layer 513 to 8 µm. The multilayer film 500d was used as the lid member 400. Other than these, a package body was obtained in the same way as in the example 28.

In the same way as in the example 28, the evaluation of the anti-pinhole property, the die-cuttability, and the curling property was performed for the package body.

As a result, in the package body according to the present comparative example, the anti-pinhole property was evaluated as "x", the die-cuttability as "O", and the curling property as "x" (see Table 10 below).

Comparative Example 26

Except for the description provided below, a package body was obtained in the same way as in the comparative example 25. The multilayer film 500 obtained in the same way as in the comparative example 21 was used as the bottom member 300.

In the same way as in the example 28, the evaluation of the anti-pinhole property, the die-cuttability, and the curling property was performed for the package body.

As a result, in the package body according to the present comparative example, the anti-pinhole property was evaluated as "O", the die-cuttability as "x", and the curling property as "x" (see Table 10 below).

TABLE 10

| | | | Grade | | Ex. 28 | Ex. 29 | Ex. 30 | C. Ex. 25 | C. Ex. 26 |
|---|---|---|---|---|---|---|---|---|---|
| Multilayer film (for bottom member) | Outer layer | Polypropylene-based resin | FH3315 | Thickness (µm) | 20 | 20 | 20 | 20 | 30 |
| | First adhesive layer | Adhesive resin | QB550 | Thickness (µm) | 5 | 5 | 5 | 5 | 7.5 |
| | Repeatedly laminated part | Polyamide resin | 1022B | Thickness of each layer (µm) | 3.3 | | 3.8 | 30 | 45 |
| | | | 5023B | Thickness of each layer (µm) | | 3.3 | | | |
| | | | | The no. of laminations | 9 | 9 | 8 | 1 | 1 |
| | | | | Total thickness (µm) | 30 | 30 | 30 | 30 | 45 |
| | | EVOH resin | J171B | Thickness of each layer (µm) | 1.0 | 1.0 | 0.9 | 8.0 | 12.0 |
| | | | | The no. of | 8 | 8 | 9 | 1 | 1 |

TABLE 10-continued

| | | Grade | | Ex. 28 | Ex. 29 | Ex. 30 | C. Ex. 25 | C. Ex. 26 |
|---|---|---|---|---|---|---|---|---|
| | | | laminations | | | | | |
| | | | Total thickness (μm) | 8 | 8 | 8 | 8 | 12 |
| Second adhesive layer | Adhesive resin | NF536 | Thickness (μm) | 5 | 5 | 5 | 5 | 7.5 |
| Sealing layer | LLDPE resin | 1520F | Thickness (μm) | 32 | 32 | 32 | 32 | 48 |
| | | | Overall thickness (μm) | 100 | 100 | 100 | 100 | 150 |
| Multilayer film (for lid member) Outermost layer | Biaxially oriented polypropylene resin | PA20 | Thickness (μm) | 20 | 20 | 20 | 20 | 20 |
| Outer layer | Polyamide resin | 1022B | Thickness (μm) | 12 | 12 | 12 | 12 | 12 |
| First adhesive layer | Adhesive resin | NF536 | Thickness (μm) | 4 | 4 | 4 | 4 | 4 |
| Repeatedly laminated part | Polyamide resin | 1022B | Thickness of each layer (μm) | 2.4 | 2.4 | 2.4 | 22.0 | 22.0 |
| | | | The no. of laminations | 9 | 9 | 9 | 1 | 1 |
| | | | Total thickness (μm) | 22 | 22 | 22 | 22 | 22 |
| | EVOH resin | J171B | Thickness of each layer (μm) | 1.0 | 1.0 | 1.0 | 8.0 | 8.0 |
| | | | The no. of laminations | 8 | 8 | 8 | 1 | 1 |
| | | | Total thickness (μm) | 8 | 8 | 8 | 8 | 8 |
| Second adhesive layer | Adhesive resin | NF536 | Thickness (μm) | 4 | 4 | 4 | 4 | 4 |
| Sealing layer | LLDPE resin | 1520F | Thickness (μm) | 10 | 10 | 10 | 10 | 10 |
| | | | Overall thickness (μm) | 80 | 80 | 80 | 80 | 80 |
| | | | Anti-pinhole property | ○ | ○ | ○ | X | ○ |
| | | | Die-cuttability | ○ | ○ | ○ | ○ | X |
| | | | Curling property | ○ | ○ | ○ | X | X |

In the package body according to the examples 28 through 30, the anti-pinhole property, the die-cuttability, and the curling property were evaluated as "O". In contrast, at least two from among the impact resistance, the die-cuttability, and the curling property were evaluated as "x" in the package body according to the comparative examples 25 and 26. Therefore, the package body according to the examples 28 through 30 had a better impact resistance, die-cuttability, and curling property than the package body according to the comparative examples 25 and 26.

Example 31

A polyester-based resin (product name: GN071, manufactured by Eastman Chemical Japan Ltd.) was prepared as the resin configuring the outer layer 110. An adhesive resin (product name: SF741, manufactured by Mitsui Chemicals, Inc.) was prepared as the resin configuring the first adhesion layer 120. An adhesive resin (product name: NF536, manufactured by Mitsui Chemicals, Inc.) was prepared as the resin configuring the second adhesion layer 140. A polyamide resin (product name: 1022B, manufactured by Ube Industries, Ltd.) was prepared as the resin configuring the first layer 131. An EVOH resin (product name: J171B, manufactured by Kuraray Co., Ltd.) was prepared as the resin configuring the second layer 133. An LLDPE resin (product name: 1520F, manufactured by Ube-Maruzen Polyethylene Co. Ltd.) was prepared as the resin configuring the sealing layer 150.

The multilayer film 100h was manufactured by performing coextrusion of the polypropylene-based resin of the outer layer 110, the adhesive resin of the first adhesion layer 120, the polyamide resin of the first layer 131, the EVOH resin of the second layer 133, the adhesive resin of the second adhesion layer 140, and the LLDPE resin of the sealing layer 150 using a feed block and die. In the multilayer film 100h, the number of laminations of the first layer 131 was nine layers, and that of the second layer 133 was eight layers, such that the total number of laminations of the repeatedly laminated part 134 was 17 layers. The overall thickness of the multilayer film 100h was set to 50 μm. Furthermore, the thickness of the outer layer 110 was set to 10 μm, that of the first adhesion layer 120 to 5 μm, the second adhesion layer 140 to 5 μm, and the sealing layer 150 to 12 μm. The thickness of the first layer 131 was set to 10 μm and the total thickness of each layer of the second layer 133 was set to 8 μm. The average thickness of each layer of the first layer 131 was 1.1 μm, and the average thickness of each layer of the second layer 133 was 1.0 μm.

<Manufacturing of the Bottom Member>

Using a deep drawing type fully automatic vacuum packaging machine (product number: FV6300, manufactured by Omori Machinery Co., Ltd.), a pocket 310 having the long side of 100 mm, the short side of 80 mm, and the drawing depth of 5 mm was formed at a forming temperature of 90° C. in the multilayer film 100h to obtain the bottom member 300.

<Manufacturing of the Lid Member>

Figure 23:
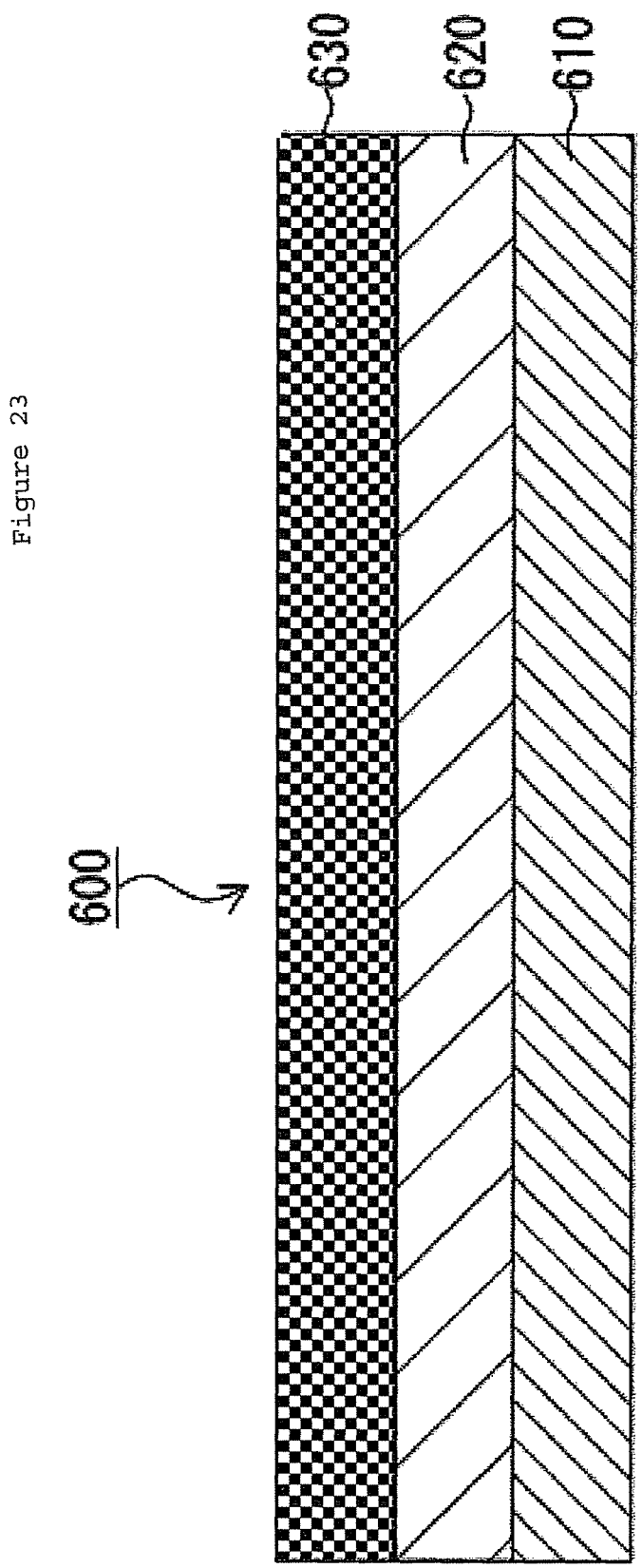
FIG. 23 is a cross-sectional view of a multilayer film used for evaluating an example and a comparative example.

As illustrated in FIG. 23, the multilayer film 600 was manufactured by affixing together an OPP film having a thickness of 30 μm, a biaxially oriented polyethylene terephthalate film (VM-PET film) having a thickness of 12 μm on which aluminum evaporation had been performed, and an LLDPE film having a thickness of 30 μm that is formed by performing the T die extrusion method on an LLDPE resin (product name: 1520F, manufactured by Ube-Maruzen Polyethylene Co. Ltd.), by the dry lamination method. The multilayer film 600 was used as the lid member 400.

<Manufacturing of the Package Body>

30 g of bacon was filled in the pocket 310 of the bottom member 300, and the lid member 400 and bottom member 300 were sealed at a sealing temperature of 140° C. to obtain a sample of the package body 200 in which the bacon had been filled. The test for the anti-pinhole property of the package body 200 was performed in the same way as in the example 28 except that the heat sterilization process was not performed.

The anti-pinhole property and the die-cuttability of the package body 200 were evaluated in the same way as in the example 28.

As a result of evaluating the aforementioned items, the anti-pinhole property of the package body 200 according to the present example was evaluated as "O" and the die-cuttability was also evaluated as "O" (see Table 11 below).

Comparative Example 27

Except for the description provided below, the multilayer film 500 illustrated in FIG. 16 was obtained in the same way as in the example 31. Rather than providing the repeatedly laminated part 134, the polyamide resin layer 511 and the EVOH resin layer 513 were provided. The thickness of the polyamide resin layer 511 was set to 10 μm and that of the EVOH resin layer 513 was set to 8.0 μm. The multilayer film 500 was used as the bottom member 300. Other than these, a package body was obtained in the same way as in the example 31.

The anti-pinhole property and the die-cuttability of the package body were evaluated in the same way as in the example 31.

As a result, the anti-pinhole property of the package body according to the present comparative example was evaluated as "x", and the die-cuttability was also evaluated as "x" (see Table 11 below).

industrial parts, and electronic material that requires impact resistance, flex resistance, and anti-pinhole property. Furthermore, the multilayer film can be applied in packaging films used as an inner bag of a bag-in-box in which mostly a substance with a high flowability, such as a fluid, is filled in, or in packaging films used in pillow packing, vacuum forming packing, or the like, for packing processed meats, processed marine products, and electronic material. Particularly, such a multilayer film can be used optimally as a packaging film for electronic parts such as capacitors having sharp corners, and as packaging films for meat with bones, foods that include a variety of spices, and foods such as sea shells having an unfixed shape and hard portions.

The invention claimed is:

1. A multilayer film, characterized by comprising:
    an outer layer;
    a sealing layer;
    a repeatedly laminated part arranged between the outer layer and the sealing layer and formed by alternately and repeatedly laminating a first layer that consists mainly of a polyamide resin (excluding an elastomer) and a second layer that consists mainly of a copolymer of an olefin-based hydrocarbon having carbon number of 2 to 4 and a vinyl group-containing monomer,
    wherein the first layer is at least one of: a layer of said repeatedly laminated part closest to said outer layer and a layer of said repeatedly laminated part closest to said sealing layer.

2. The multilayer film according to claim 1, wherein the total number of laminations of said first layer and said second layer of said repeatedly laminated part is not less than 7 and not more than 999.

TABLE 11

|  |  | Grade |  | Ex. 31 | C. Ex. 27 |
| --- | --- | --- | --- | --- | --- |
| Outer layer | Polyester-based resin | GN071 | Thickness (μm) | 10 | 10 |
| First adhesive layer | Adhesive resin | SF741 | Thickness (μm) | 5 | 5 |
| Repeatedly laminated part | Polyamide resin | 1022B | Thickness of each layer (μm) | 1.1 | 10 |
|  |  |  | The no. of laminations | 9 | 1 |
|  |  |  | Total thickness (μm) | 10 | 10 |
|  | EVOH resin | J171B | Thickness of each layer (μm) | 1.0 | 8.0 |
|  |  |  | The no. of laminations | 8 | 1 |
|  |  |  | total thickness (μm) | 8 | 8 |
| Second adhesive layer | Adhesive resin | NF536 | Thickness (μm) | 5 | 5 |
| Sealing layer | LLDPE resin | 1520F | Thickness (μm) | 12 | 12 |
|  |  |  | Overall thickness (μm) | 50 | 50 |
| Anti-pinhole property |  |  |  | o | x |
| Die-cuttability |  |  |  | o | x |

In the package body according to the example 31, both the anti-pinhole property and the die-cuttability were evaluated as "O". On the contrary, in the package body according to the comparative example 27, both the impact resistance and the die-cuttability were evaluated as "x". Therefore, the package body according to the example 31 had a better anti-pinhole property and die-cuttability than the package body according to the comparative example 27.

INDUSTRIAL APPLICABILITY

The multilayer film according to the present invention is used, for example, for packing foods, medicinal products, 3. The multilayer film according to claim 1, wherein said copolymer of an olefin-based hydrocarbon and a vinyl group-containing monomer of said second layer is at least one of a maleic anhydride grafted linear low density polyethylene, a maleic anhydride grafted polypropylene, an ethylene-methacrylic acid copolymer, and an ionomer.

4. The multilayer film according to claim 1, wherein said copolymer of an olefin-based hydrocarbon and a vinyl group-containing monomer of said second layer is an ethylene-vinylalcohol copolymer.

5. The multilayer film according to claim 1, further comprising an oxygen barrier layer.

6. The multilayer film according to claim 1, further comprising: an oxygen barrier layer, wherein
said oxygen barrier layer is arranged between said repeatedly laminated part and said sealing layer.

7. The multilayer film according to claim 1, further comprising: an oxygen barrier layer, wherein
said oxygen barrier layer is arranged between said repeatedly laminated part and said outer layer.

8. The multilayer film according to claim 1, wherein
a plurality of repeatedly laminated parts are provided,
an oxygen barrier layer is further provided, and
said plurality of repeatedly laminated parts are arranged between said outer layer and said sealing layer, and
said oxygen barrier layer is arranged between said repeatedly laminated parts.

9. The multilayer film according to claim 1, wherein
said outer layer includes at least one of a polypropylene-based resin, a polyester-based resin, a polyamide resin, and an ethylene-vinylalcohol copolymer.

10. The multilayer film according to claim 1, wherein said sealing layer has an easy peeling function.

11. A package body manufactured by using the multilayer film according to claim 1.

* * * * *

UNITED STATES PATENT AND TRADEMARK OFFICE
CERTIFICATE OF CORRECTION

PATENT NO.         : 8,551,590 B2                                    Page 1 of 1
APPLICATION NO.    : 13/696604
DATED              : October 8, 2013
INVENTOR(S)        : Yohei Nakashima and Shinichi Maesowa It is certified that error appears in the above-identified patent and that said Letters Patent is hereby corrected as shown below:

Title Page, Item (54) and in the Specification, Column 1, Line 1, Title:

MULTILAYER FILM AND PACKAGING MATERIAL should read:

MULTILAYER FILM AND PACKAGE BODY

Signed and Sealed this
Seventeenth Day of December, 2013

Margaret A. Focarino
*Commissioner for Patents of the United States Patent and Trademark Office*